United States Patent
Pillai et al.

(10) Patent No.: US 11,748,746 B2
(45) Date of Patent: *Sep. 5, 2023

(54) MULTI-PATH COMMUNICATION OF ELECTRONIC DEVICE SECURE ELEMENT DATA FOR ONLINE PAYMENTS

(71) Applicant: Apple Inc., Cupertino, CA (US)

(72) Inventors: Manoj K. Thulaseedharan Pillai, Cupertino, CA (US); Ahmer A. Khan, Cupertino, CA (US); Thomas Elliott, Cupertino, CA (US); Timothy S. Hurley, Cupertino, CA (US); Jennifer J. Bailey, Cupertino, CA (US); David E. Brudnicki, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/274,841

(22) Filed: Sep. 23, 2016

(65) Prior Publication Data

US 2017/0011395 A1    Jan. 12, 2017

Related U.S. Application Data

(63) Continuation-in-part of application No. 14/481,526, filed on Sep. 9, 2014, now abandoned.
(Continued)

(51) Int. Cl.
    *G06Q 20/38*    (2012.01)
    *H04L 9/08*     (2006.01)
    (Continued)

(52) U.S. Cl.
    CPC ......... *G06Q 20/3829* (2013.01); *G06Q 20/12* (2013.01); *G06Q 20/325* (2013.01);
    (Continued)

(58) Field of Classification Search
    CPC .................................................... G06Q 20/027
    (Continued)

(56) References Cited

U.S. PATENT DOCUMENTS 7,333,615 B1    2/2008    Jarboe et al.
7,376,629 B1    5/2008    McIsaac et al.
(Continued)

FOREIGN PATENT DOCUMENTS

CN    101295384 A    10/2008
CN    102057386       5/2011
(Continued)

OTHER PUBLICATIONS

Chinese Office Action dated Sep. 25, 2019 from Chinese Patent Application No. 201480049141.0, 22 pages including English language translation.
(Continued)

*Primary Examiner* — Chinedu C Agwumezie
(74) *Attorney, Agent, or Firm* — BAKERHOSTETLER

(57) ABSTRACT

Systems, methods, and computer-readable media for communicating electronic device secure element data over multiple paths for online payments are provided. In one example embodiment, a method includes, inter alia, at a commercial entity subsystem, receiving, from an electronic device, device transaction data that includes credential data indicative of a payment credential on the electronic device for funding a transaction with a merchant subsystem, accessing a transaction identifier, deriving a transaction key based on transaction key data that includes the accessed transaction identifier, transmitting, to one of the merchant subsystem and the electronic device, merchant payment data that includes a first portion of the credential data and the accessed transaction identifier, and sharing, with a financial institution subsystem using the transaction key, commercial (Continued)

payment data that includes a second portion of the credential data that is different than the first portion of the credential data. Additional embodiments are also provided.

29 Claims, 16 Drawing Sheets

Related U.S. Application Data

(60) Provisional application No. 62/348,956, filed on Jun. 12, 2016, provisional application No. 62/234,929, filed on Sep. 30, 2015, provisional application No. 62/004,182, filed on May 28, 2014, provisional application No. 62/002,721, filed on May 23, 2014, provisional application No. 61/989,107, filed on May 6, 2014, provisional application No. 61/884,926, filed on Sep. 30, 2013.

(51) Int. Cl.
*G06Q 20/32* (2012.01)
*G06Q 20/40* (2012.01)
*G06Q 20/12* (2012.01)

(52) U.S. Cl.
CPC ..... *G06Q 20/3227* (2013.01); *G06Q 20/3278* (2013.01); *G06Q 20/382* (2013.01); *G06Q 20/3823* (2013.01); *G06Q 20/40* (2013.01); *H04L 9/0861* (2013.01); *G06Q 2220/00* (2013.01); *H04L 2209/24* (2013.01)

(58) Field of Classification Search
USPC .............................................. 705/77, 79, 71
See application file for complete search history.

(56) References Cited

U.S. PATENT DOCUMENTS

| | | | |
|---|---|---|---|
| 7,908,216 B1 | 3/2011 | Davis | |
| 8,214,298 B2* | 7/2012 | McCown | G06Q 20/3227 705/64 |
| 8,571,995 B2* | 10/2013 | Spies | G06Q 20/20 380/278 |
| 8,581,995 B2* | 11/2013 | Lin | H04N 5/2628 348/252 |
| 10,878,414 B2* | 12/2020 | Pillai | H04W 12/069 |
| 2008/0319914 A1 | 12/2008 | Carrott | |
| 2010/0250390 A1 | 9/2010 | Song et al. | |
| 2010/0318468 A1* | 12/2010 | Carr | G06Q 20/40 705/79 |
| 2011/0161671 A1 | 6/2011 | Whitehouse | |
| 2012/0124378 A1* | 5/2012 | Chang | H04L 9/3234 713/172 |
| 2012/0130839 A1 | 5/2012 | Koh et al. | |
| 2012/0143770 A1 | 6/2012 | Pauker et al. | |
| 2012/0215693 A1 | 8/2012 | Faith et al. | |
| 2012/0284187 A1 | 11/2012 | Hammad et al. | |
| 2012/0300932 A1 | 11/2012 | Cambridge et al. | |
| 2013/0054473 A1 | 2/2013 | Jan et al. | |
| 2013/0212026 A1 | 8/2013 | Powell | |
| 2013/0263215 A1* | 10/2013 | Ekdahl | G06F 21/74 726/2 |
| 2014/0019367 A1 | 1/2014 | Khan et al. | |
| 2014/0052553 A1 | 2/2014 | Uzo | |
| 2014/0108172 A1* | 4/2014 | Weber | G06Q 30/00 705/17 |
| 2014/0310183 A1* | 10/2014 | Weber | G06Q 20/3829 705/71 |

FOREIGN PATENT DOCUMENTS

| | | |
|---|---|---|
| CN | 102609837 A | 7/2012 |
| CN | 103123708 | 5/2013 |
| KR | 10-2004-0091063 | 10/2004 |
| KR | 2011-0083193 | 7/2011 |
| KR | 10-2012-0108599 | 10/2012 |
| KR | 10-2013-0082656 | 7/2013 |
| KR | 10-2013-0100872 | 9/2013 |
| TW | M418352 | 12/2011 |
| TW | 201227557 | 7/2012 |
| TW | 201241769 | 10/2012 |
| WO | 00/79367 A1 | 12/2000 |
| WO | 01/59731 | 8/2001 |
| WO | 2013/067521 | 5/2013 |

OTHER PUBLICATIONS

Korean Office Action from Korean Patent Application No. 2018-7003517, dated Nov. 20, 2019, 13 pages including English language translation.

* cited by examiner

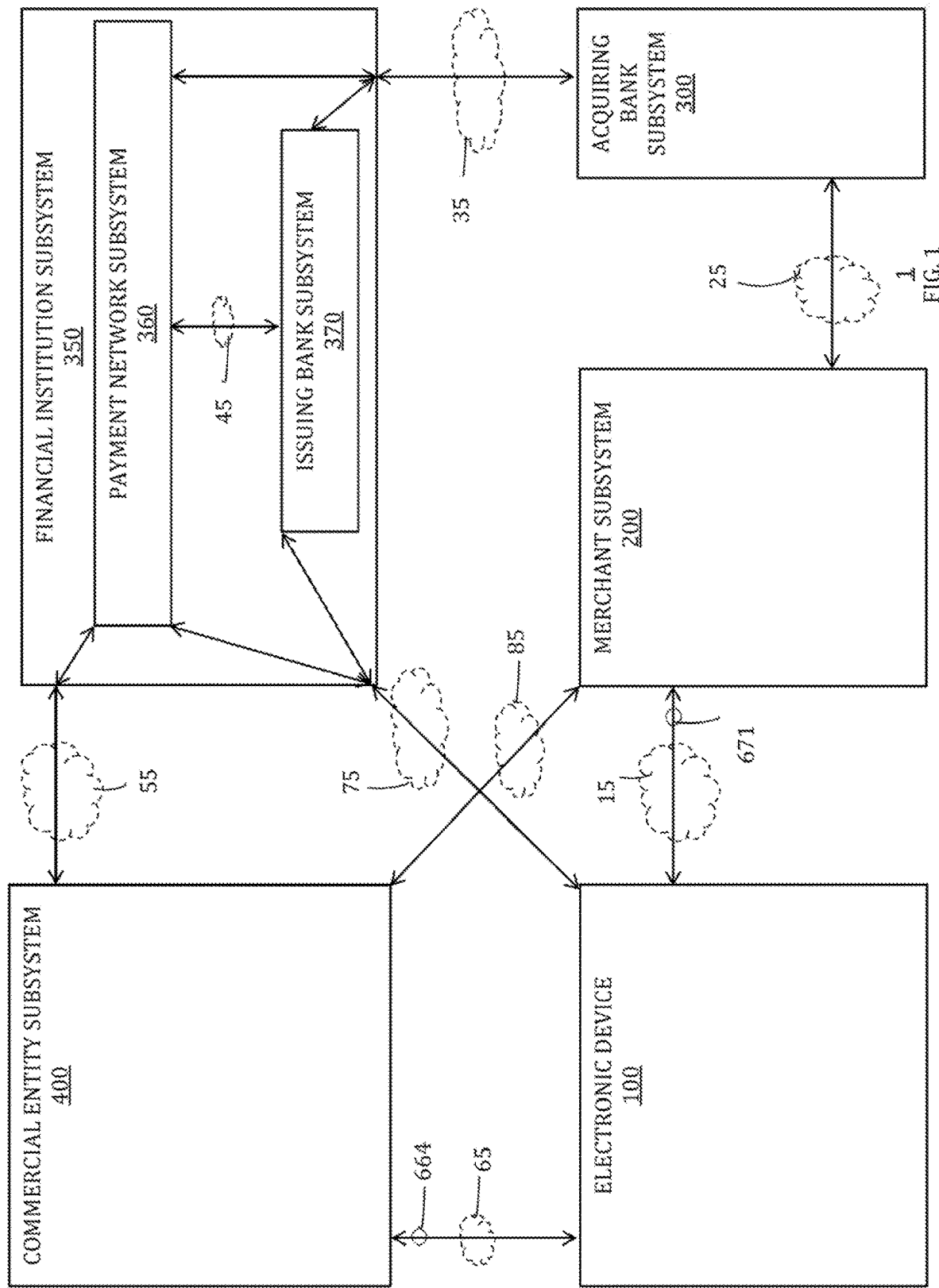

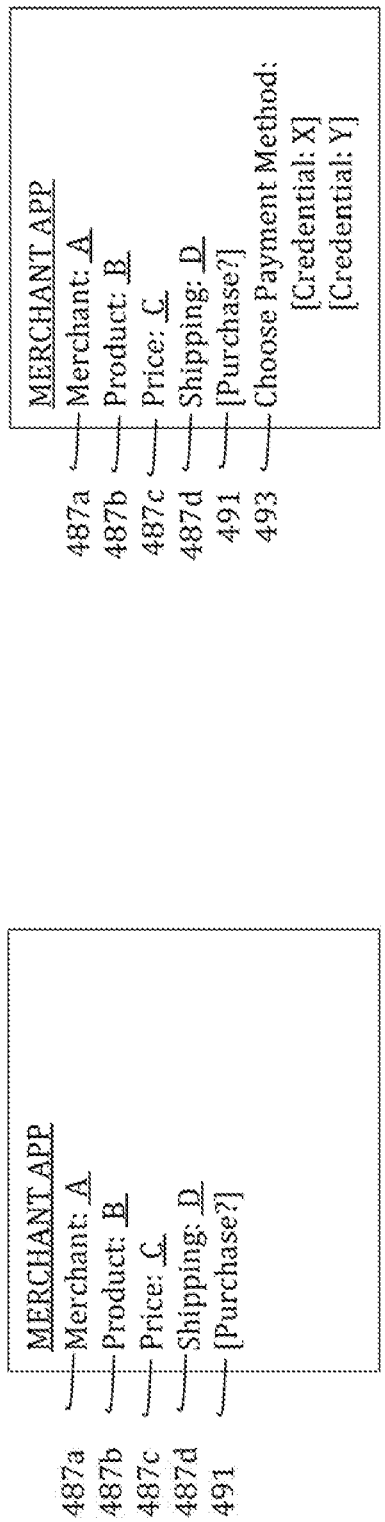

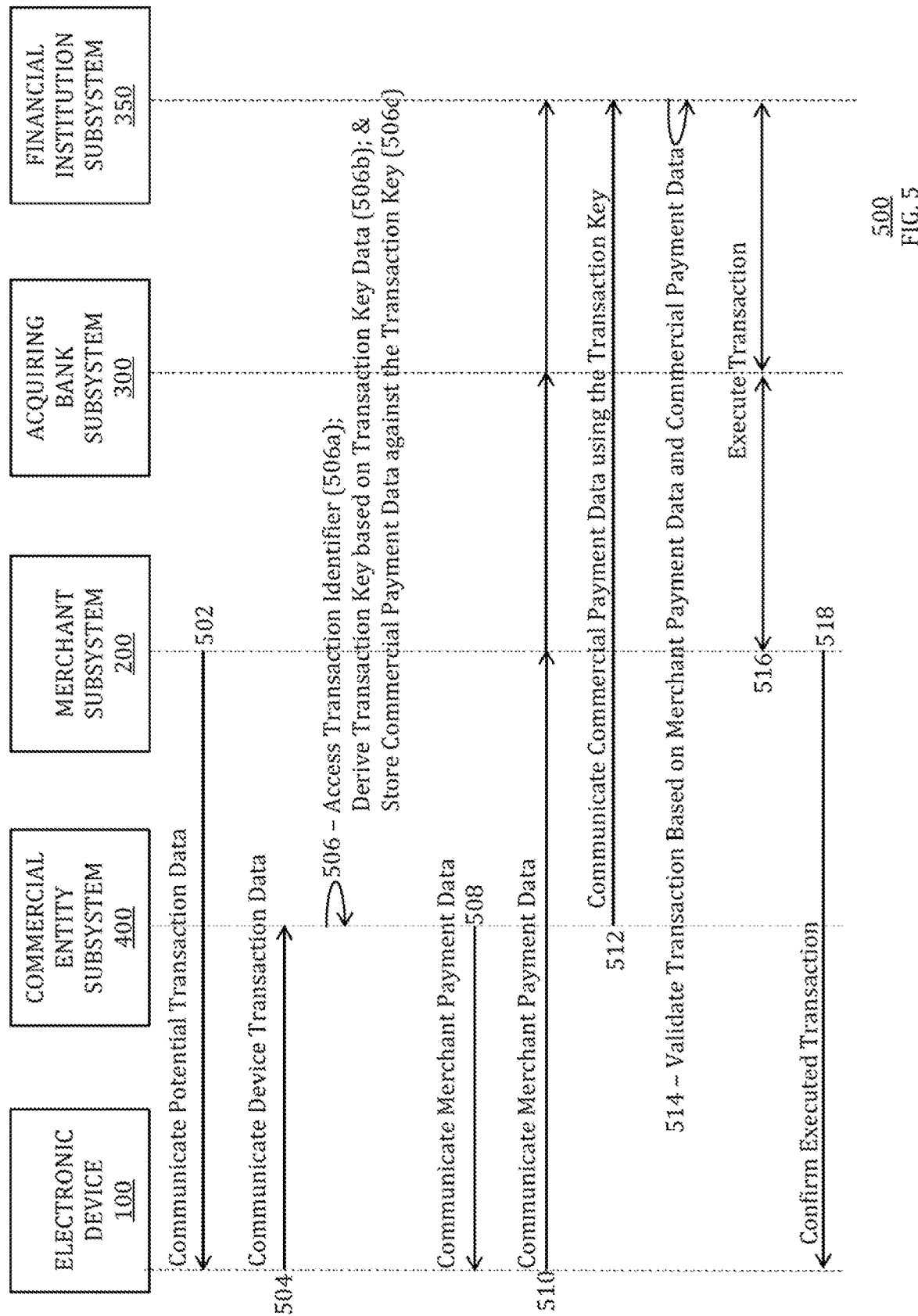

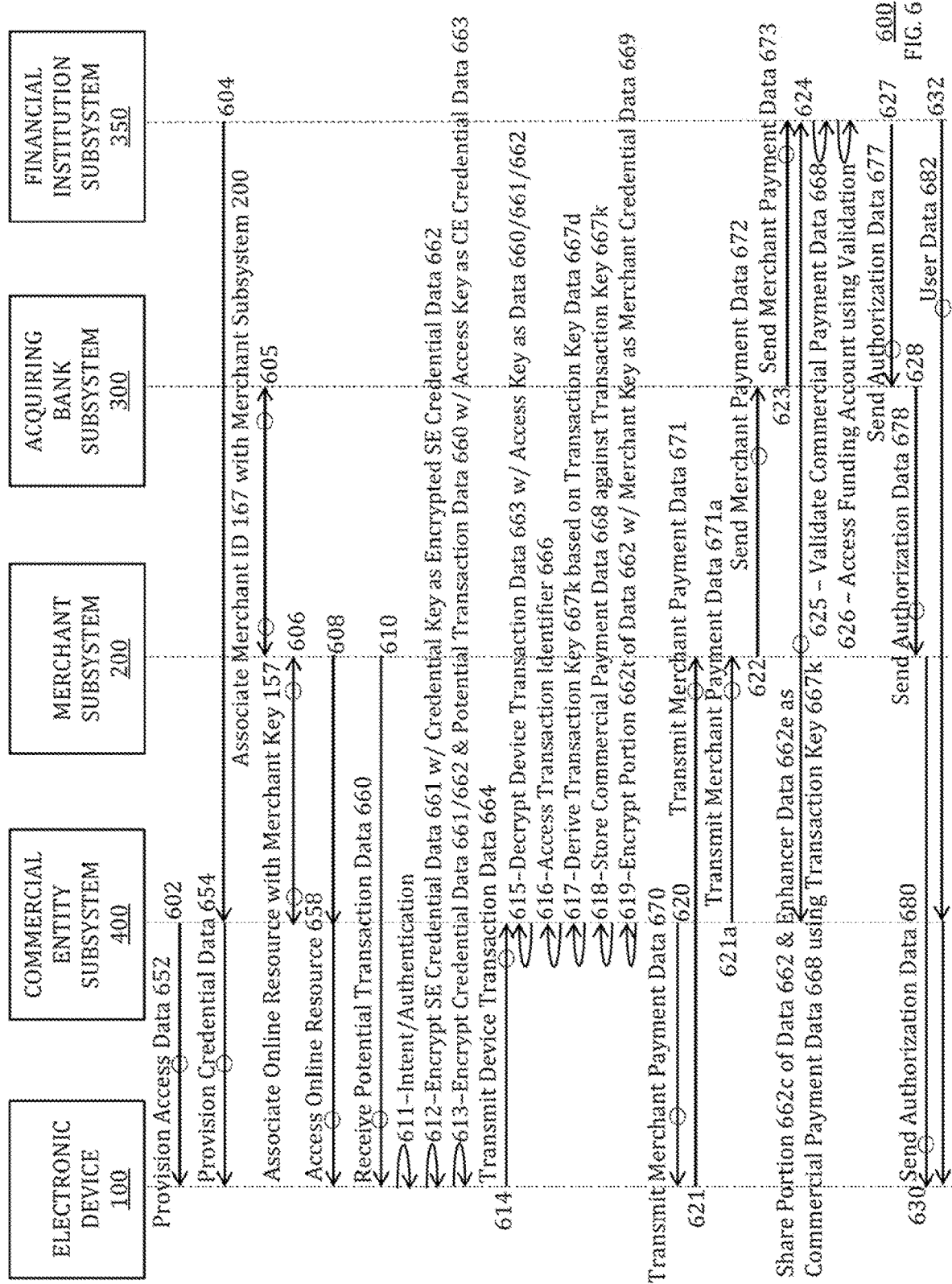

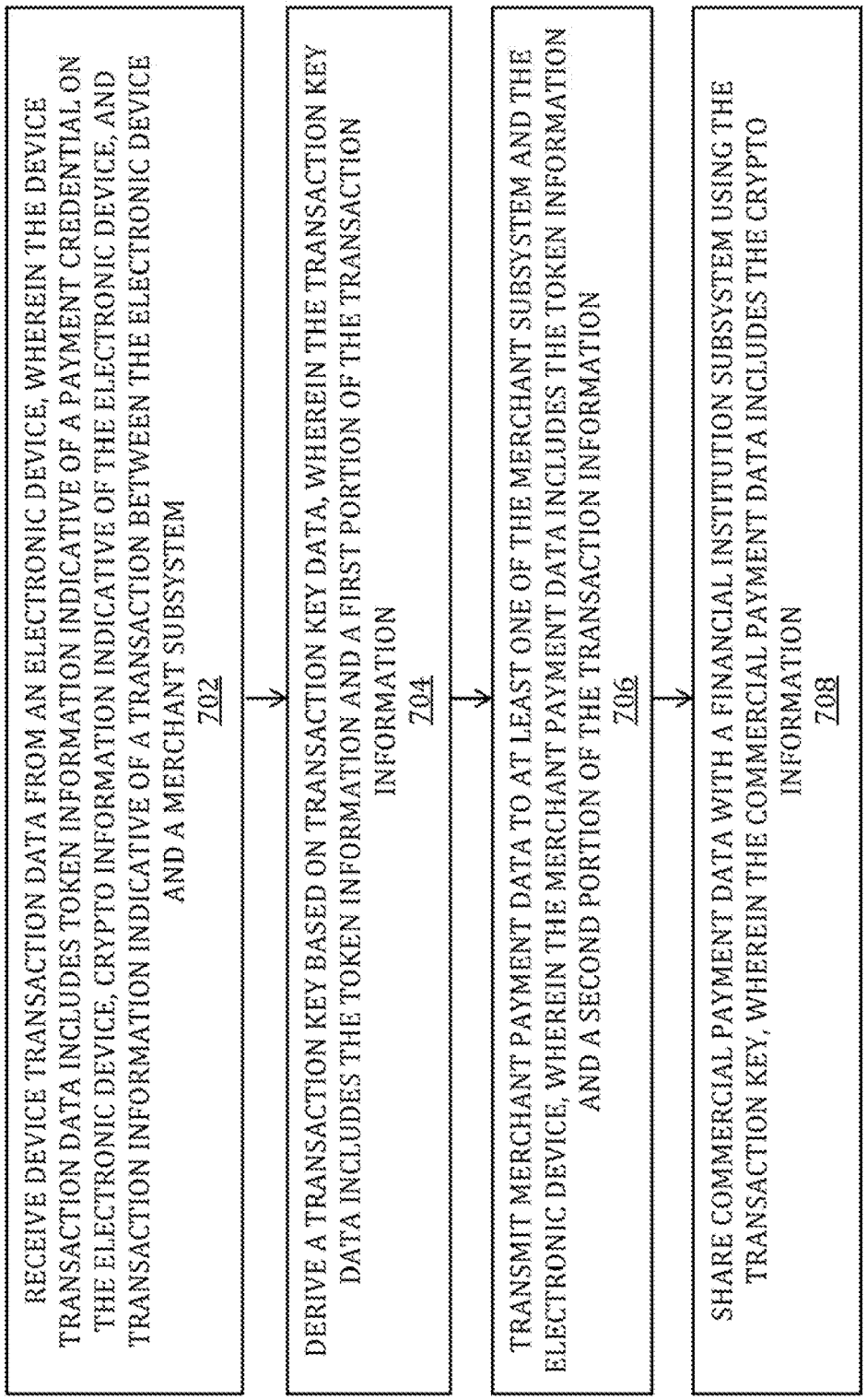

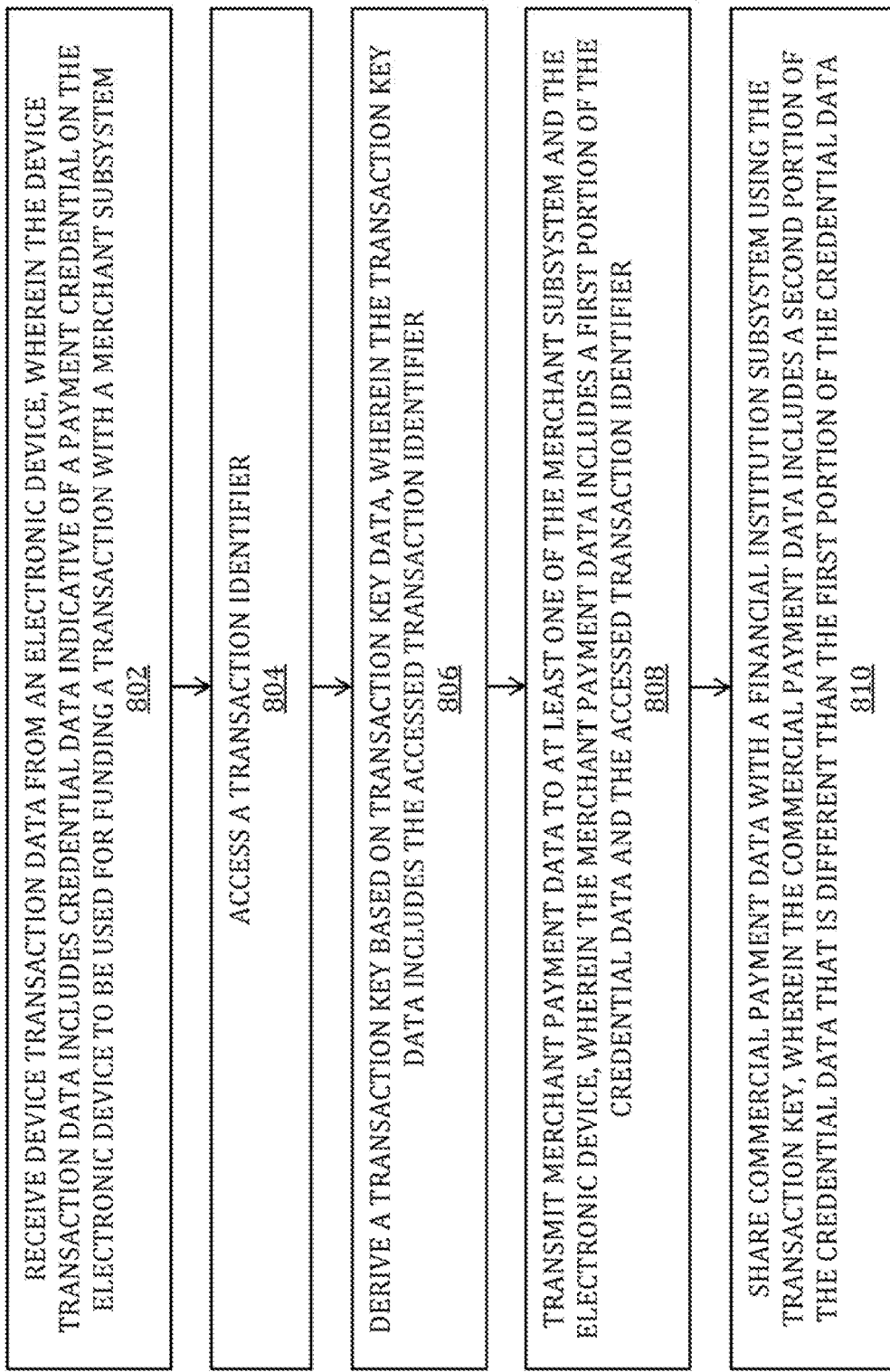

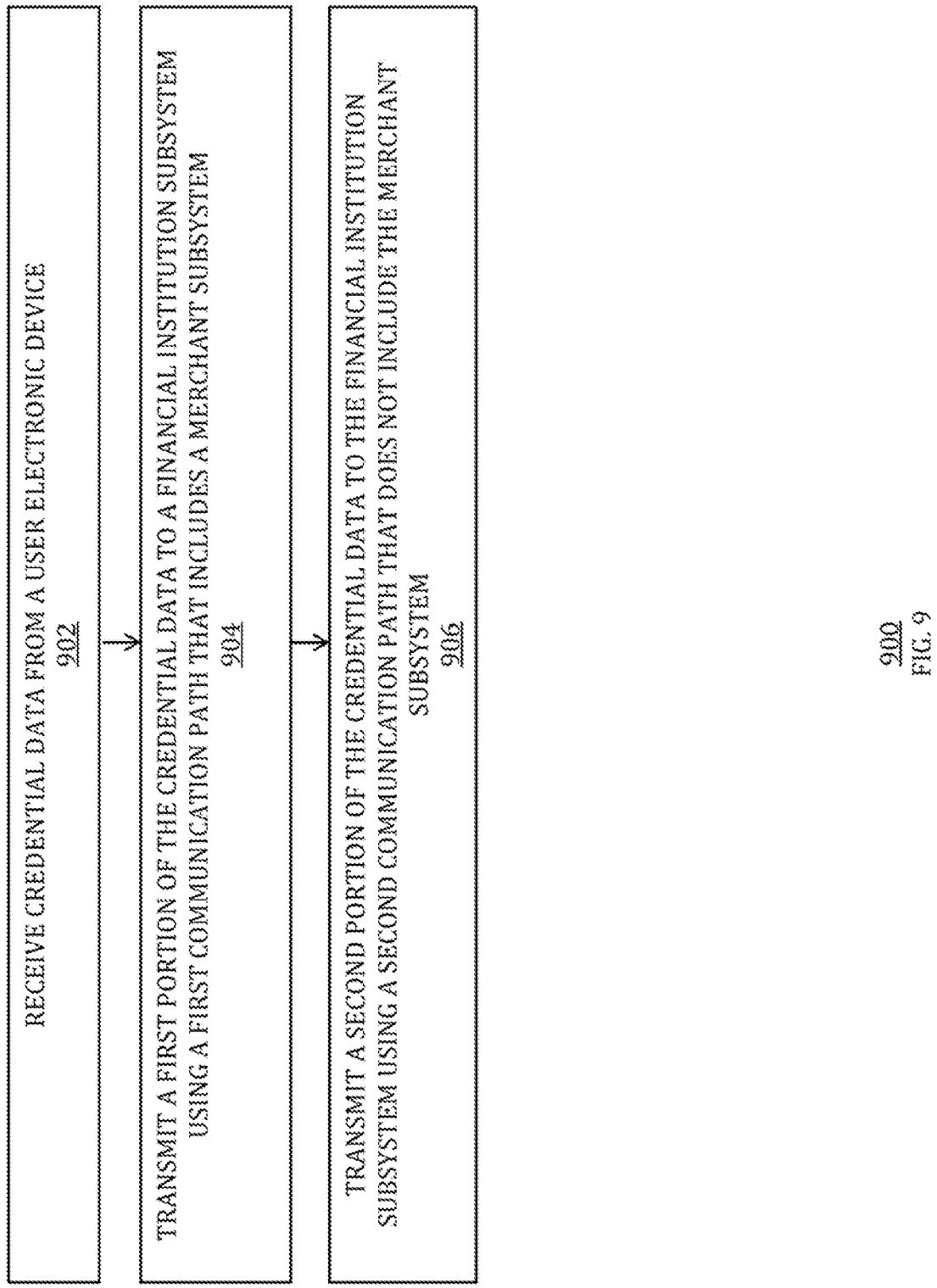

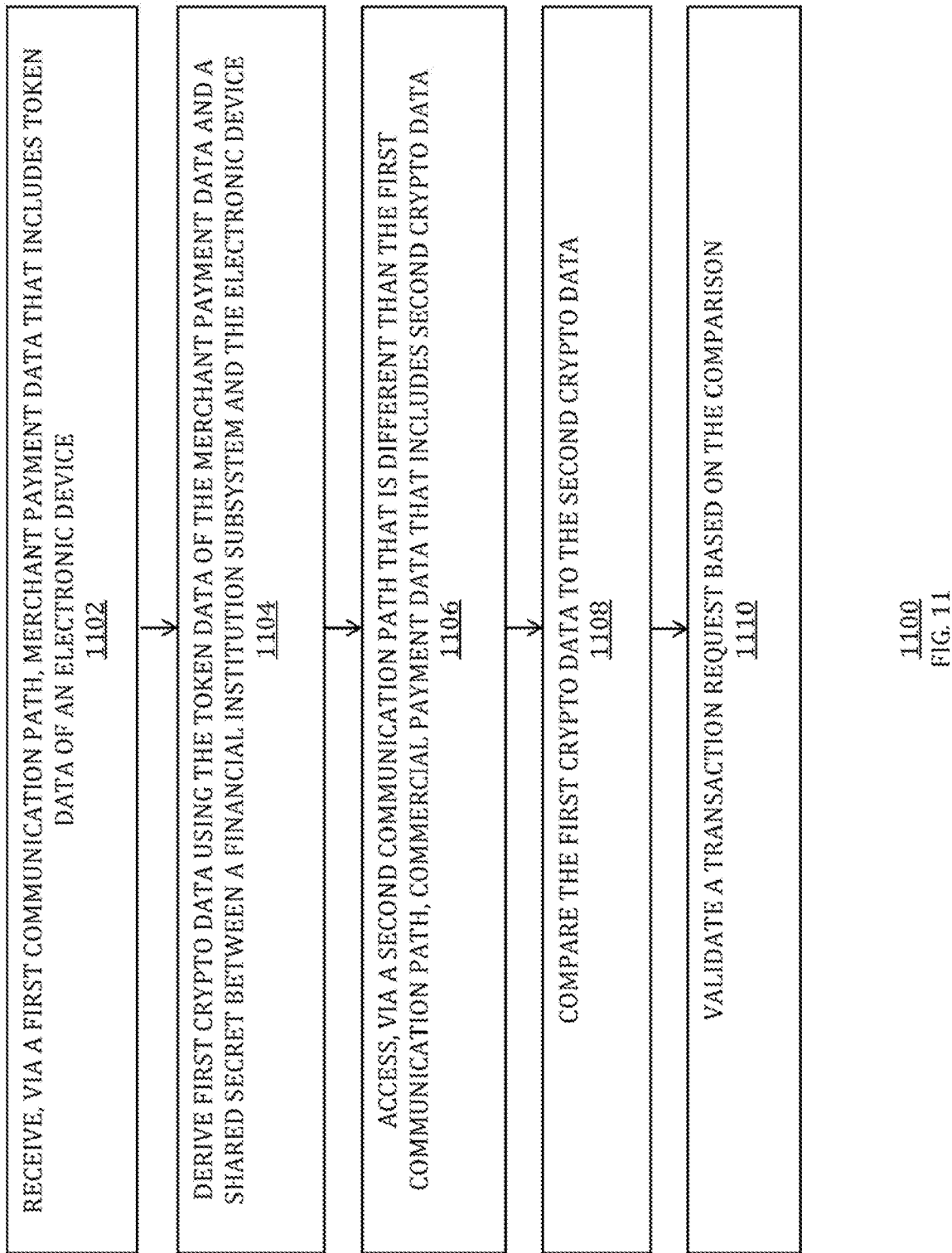

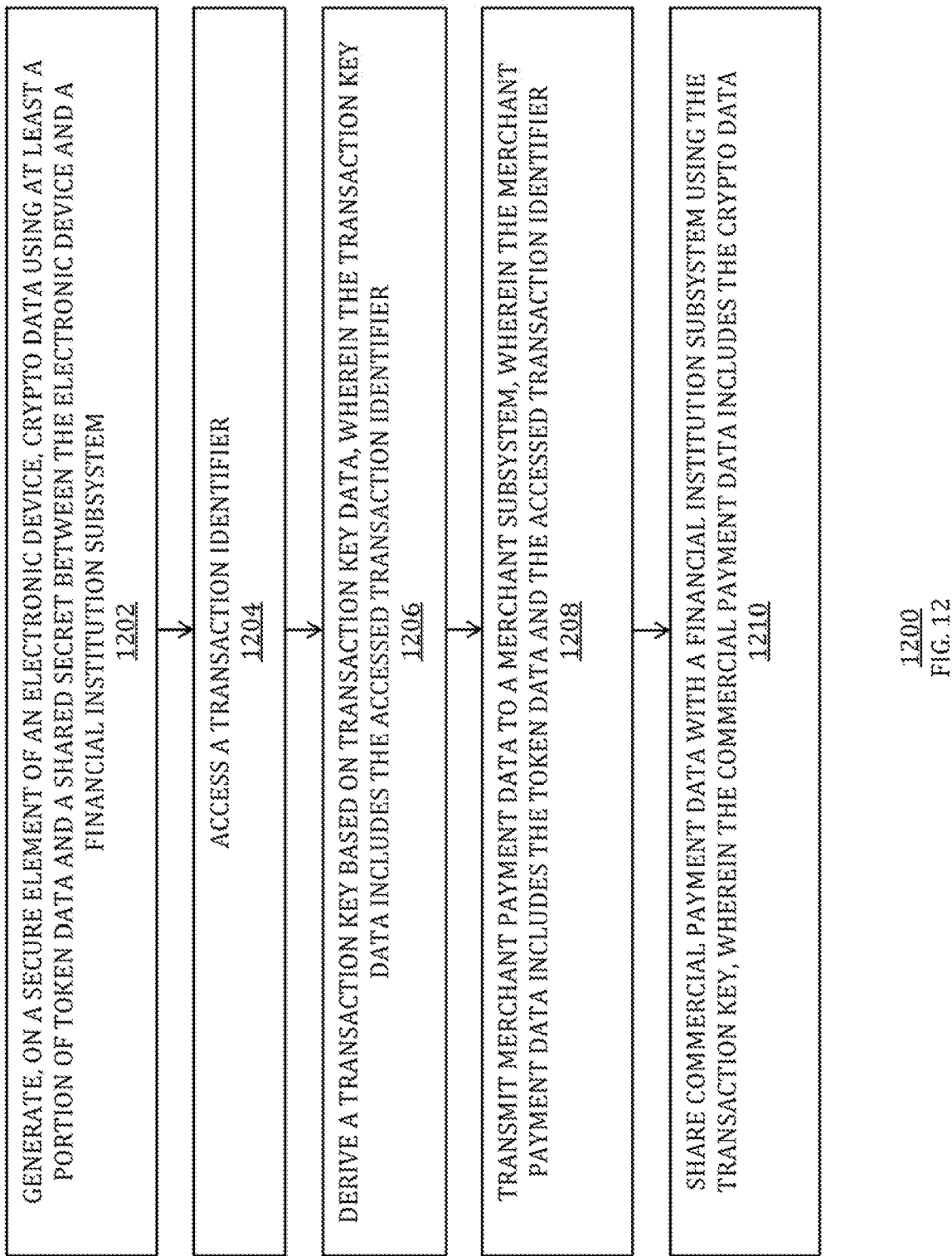

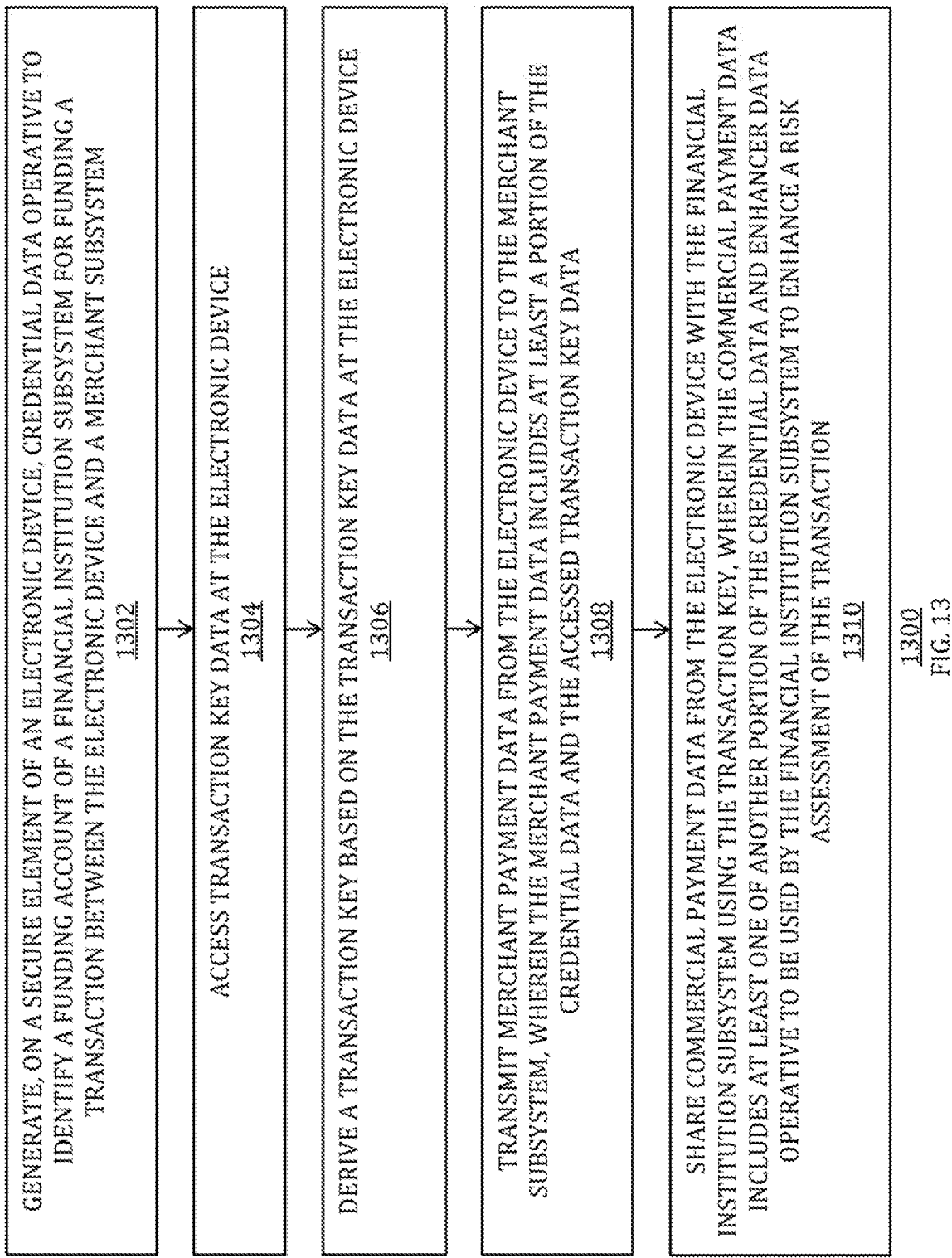

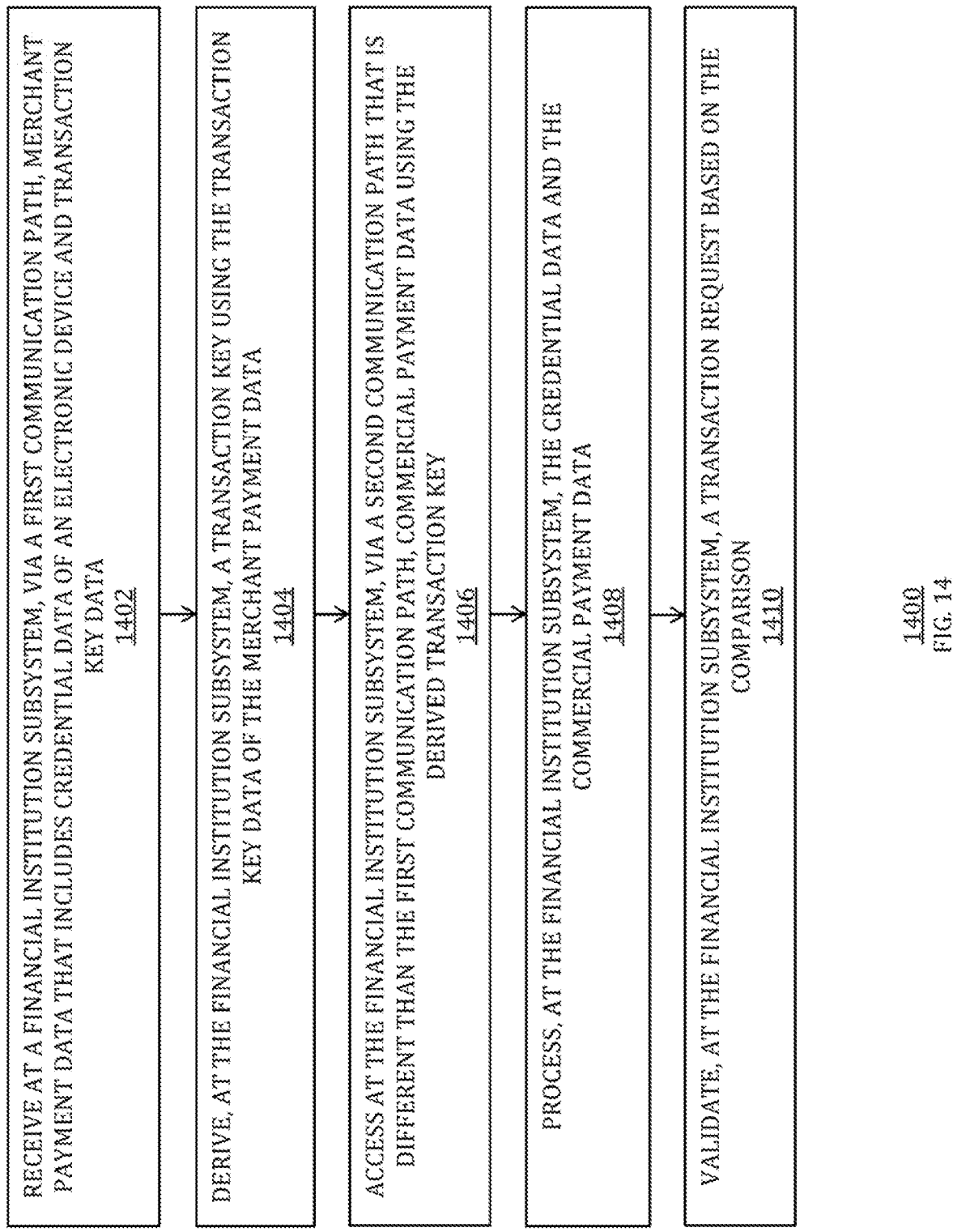

MULTI-PATH COMMUNICATION OF ELECTRONIC DEVICE SECURE ELEMENT DATA FOR ONLINE PAYMENTS

CROSS-REFERENCE TO RELATED APPLICATION(S)

This application claims the benefit of prior filed U.S. Provisional Patent Application No. 62/234,929, filed Sep. 30, 2015, and of prior filed U.S. Provisional Patent Application No. 62/348,956, filed Jun. 12, 2016, each of which is hereby incorporated by reference herein in its entirety. This application is also a continuation-in-part of U.S. Nonprovisional patent application Ser. No. 14/481,526, filed Sep. 9, 2014, which claims the benefit of prior filed U.S. Provisional Patent Application No. 61/884,926, filed Sep. 30, 2013, of prior filed U.S. Provisional Patent Application No. 61/989,107, filed May 6, 2014, of prior filed U.S. Provisional Patent Application No. 62/002,721, filed May 23, 2014, and of prior filed U.S. Provisional Patent Application No. 62/004,182, filed May 28, 2014, each of which is hereby incorporated by reference herein in its entirety.

TECHNICAL FIELD

This disclosure relates to multi-path communication of electronic device secure element data for online payments.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential, with the other entity in a contactless proximity-based communication. However, secure use of such a commerce credential by the electronic device for an online transaction has often been inefficient.

SUMMARY OF THE DISCLOSURE

This document describes systems, methods, and computer-readable media for communicating electronic device secure element data over multiple paths for online payments.

As an example, a method, at a commercial entity subsystem, may include receiving device transaction data from an electronic device, wherein the device transaction data may include token information indicative of a payment credential on the electronic device, crypto information indicative of the electronic device, and transaction information indicative of a transaction between the electronic device and a merchant subsystem, deriving a transaction key based on transaction key data, wherein the transaction key data may include the token information and a first portion of the transaction information, transmitting merchant payment data to at least one of the merchant subsystem and the electronic device, wherein the merchant payment data may include the token information and a second portion of the transaction information, and sharing commercial payment data with a financial institution subsystem using the transaction key, wherein the commercial payment data may include the crypto information.

As another example, a method, at a commercial entity subsystem, may include receiving device transaction data from an electronic device, wherein the device transaction data may include credential data indicative of a payment credential on the electronic device to be used for funding a transaction with a merchant subsystem, accessing a transaction identifier, deriving a transaction key based on transaction key data, wherein the transaction key data may include the accessed transaction identifier, transmitting merchant payment data to at least one of the merchant subsystem and the electronic device, wherein the merchant payment data may include a first portion of the credential data and the accessed transaction identifier, and sharing commercial payment data with a financial institution subsystem using the transaction key, wherein the commercial payment data may include a second portion of the credential data that is different than the first portion of the credential data.

As another example, a product may include a non-transitory computer-readable medium and computer-readable instructions, stored on the computer-readable medium, that, when executed, are effective to cause a computer to receive credential data from a user electronic device, transmit a first portion of the credential data from the computer to a financial institution subsystem using a first communication path that includes a merchant subsystem, and transmit a second portion of the credential data from the computer to the financial institution subsystem using a second communication path that does not include the merchant subsystem.

As yet another example, a method, at an electronic device, may include receiving, from a merchant subsystem via an online resource, potential transaction data, generating, on a secure element of the electronic device, crypto data using at least a portion of token data and a shared secret between the electronic device and a financial institution subsystem, transmitting, to a commercial entity subsystem, device transaction data that may include the crypto data, receiving, from the commercial entity subsystem, first merchant payment data that may include a transaction identifier associated with the device transaction data, and transmitting, to the merchant subsystem via the online resource, second merchant payment data that may include the transaction identifier and the token data.

As yet another example, a method, at a financial institution subsystem, may include receiving, via a first communication path, merchant payment data that may include token data of an electronic device, deriving first crypto data using the token data of the merchant payment data and a shared secret between the financial institution subsystem and the electronic device, accessing, via a second communication path that is different than the first communication path, commercial payment data that may include second crypto data, comparing the first crypto data to the second crypto data, and validating a transaction request based on the comparing.

As yet another example, a method, at an electronic device, may include generating, on a secure element of the electronic device, crypto data using at least a portion of token data and a shared secret between the electronic device and a financial institution subsystem, accessing a transaction identifier, deriving a transaction key based on transaction key data, wherein the transaction key data includes the accessed transaction identifier, transmitting merchant payment data to a merchant subsystem, wherein the merchant payment data includes the token data and the accessed transaction identifier, and sharing commercial payment data with a financial institution subsystem using the transaction key, wherein the commercial payment data includes the crypto data.

As yet another example, a method, at an electronic device, may include generating, on a secure element of the electronic device, credential data operative to identify a funding account of a financial institution subsystem for funding a transaction between the electronic device and a merchant subsystem, accessing transaction key data, deriving a transaction key based on the transaction key data, transmitting merchant payment data to the merchant subsystem, wherein the merchant payment data includes at least a portion of the credential data and the accessed transaction key data, and sharing commercial payment data with the financial institution subsystem using the transaction key, wherein the commercial payment data includes at least one of another portion of the credential data and enhancer data operative to be used by the financial institution subsystem to enhance a risk assessment of the transaction.

As yet another example, a method, at a financial institution subsystem, may include receiving, via a first communication path, merchant payment data that includes credential data of an electronic device and transaction key data, deriving a transaction key using the transaction key data of the merchant payment data, accessing, via a second communication path that is different than the first communication path, commercial payment data using the derived transaction key, processing the credential data and the commercial payment data, and validating a transaction request based on the processing.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1 is a schematic view of an illustrative system for using a secure element of an electronic device for online payments;

FIGS. 4A-4D are front views of screens of a graphical user interface of the electronic device of FIGS. 1-4 illustrating processes for conducting online payments; and FIGS. 5-14 are flowcharts of illustrative processes for conducting online payments.

DETAILED DESCRIPTION OF THE DISCLOSURE

Figure 1A:
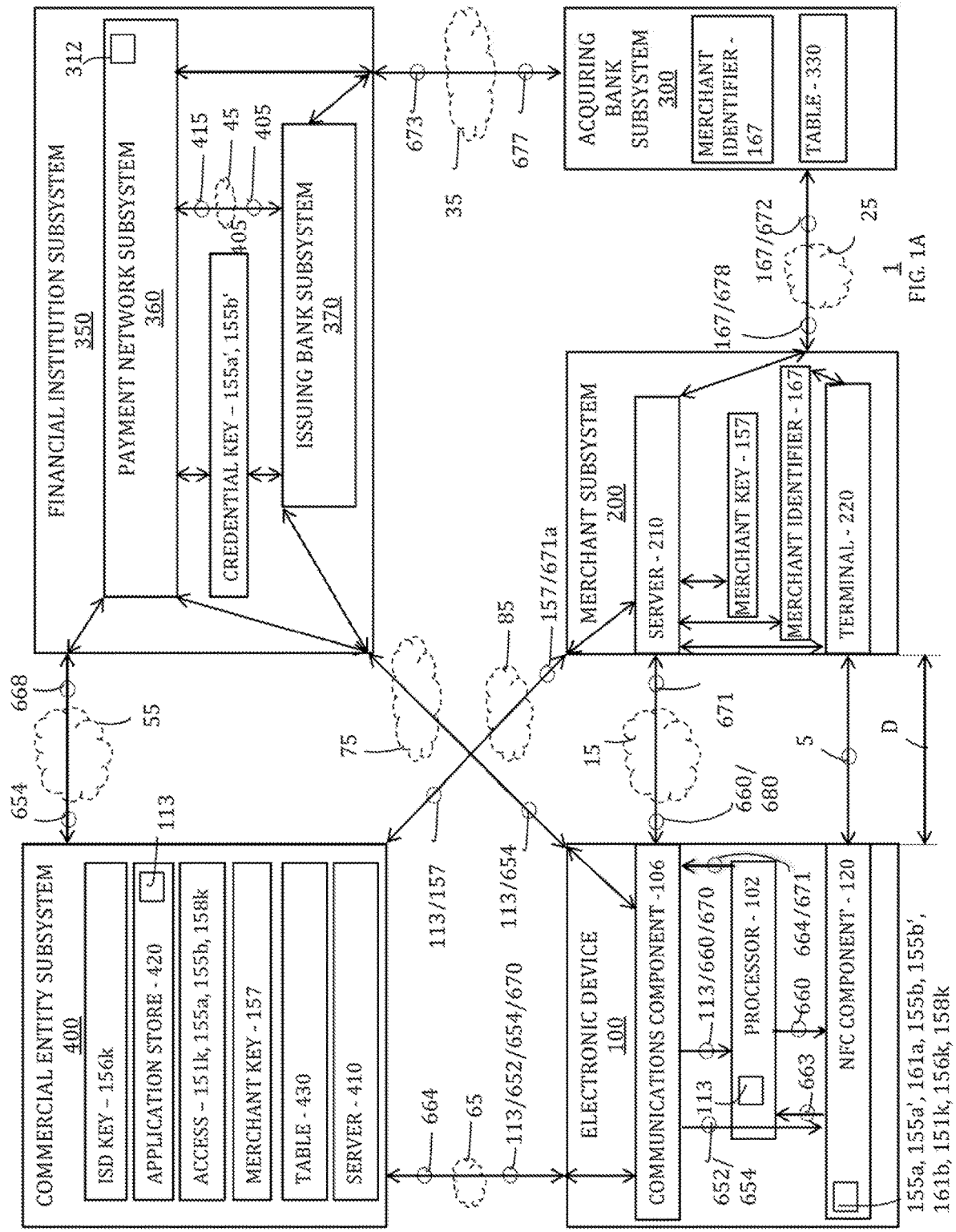
FIG. 1A is another more detailed schematic view of the system of FIG. 1.

A credential provisioned on a secure element of an electronic device may be used for securely conducting an online financial transaction between the electronic device and a merchant. Certain credential data (e.g., token data and associated crypto data) for the provisioned credential may be provided by the secure element and securely communicated along with any other suitable transaction information (e.g., information identifying the merchant for a proposed online financial transaction, transaction currency information, transaction amount information, etc.) by the electronic device to a commercial entity. The commercial entity may derive a transaction key based on transaction key data that may include a first portion of the credential data (e.g., the token data) and a portion of the transaction information. Next, the commercial entity may associate a second portion of the credential data (e.g., the crypto data) with that derived transaction key. Then, the commercial entity may securely communicate the transaction key data including the first portion of the credential data (e.g., the token data) to a financial institution via the merchant using a first communication path (e.g., a main e-commerce path). The financial institution may be operative to derive the transaction key based on that communicated transaction key data in order to access the second portion of the credential data (e.g., the crypto data) directly from the commercial entity and not via the merchant (e.g., via an unconventional e-commerce path using push or pull techniques), such that the merchant need not communicate such a second portion of the credential data to the financial institution. The financial institution may independently derive such a second portion of the credential data using the communicated transaction key data and compare that independently derived second portion of the credential data with the second portion of the credential data received from the commercial entity in order to determine whether or not to validate the financial transaction (e.g., based on both the first and second portions of the credential data). This may provide an additional layer of security by keeping certain credential data (e.g., crypto data) from being communicated through certain entities (e.g., a merchant), which may enable simplified merchant integration for supporting online financial transactions that resemble conventional e-commerce transactions despite a much more secure transaction being conducted (e.g., by minimizing the impact to merchant backend systems by keeping online crypto data processing outside of the merchant systems). Therefore, the commercial entity may derive a unique transaction key for a particular transaction that may also be independently derived by the financial institution after receiving a first portion of transaction data from the merchant in order for the financial institution to access a second portion of the transaction data from the commercial entity by leveraging that unique transaction key. In some embodiments, token data generated by the electronic device may not be used by a financial institution to fund a transaction without such token data being accompanied by crypto data also generated by the electronic device, as the crypto data may be operative to ensure that the token data comes from the same device as the crypto data (e.g., the device-generated crypto data may be a layer of security in which a portion of the crypto data may be dynamically created for a particular transaction and may link the token data to the particular transaction and to the particular electronic device). Transaction-enhancer information (e.g., rules) may be generated by a merchant or user device or commercial entity for a particular transaction to enable more robust security or options than conventional e-commerce transactions, and such transaction-enhancer information may be communicated to a financial institution along with certain credential data (e.g., crypto data) by the commercial entity and not via the merchant (e.g., via the unconventional e-commerce path).

Figure 2:
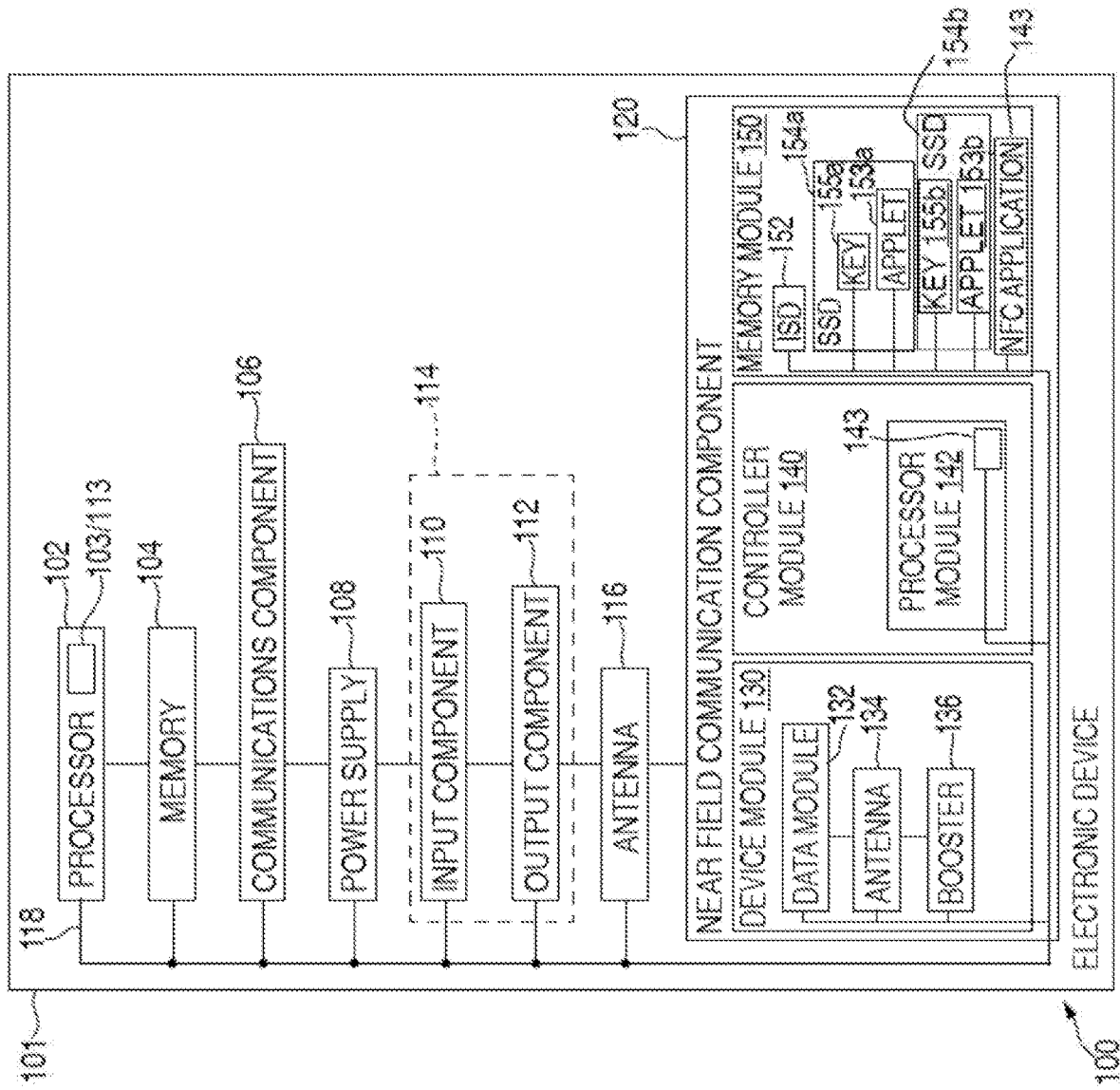
FIG. 2 is a more detailed schematic view of the electronic device of the system of FIGS. 1 and 1A.
Figure 3:
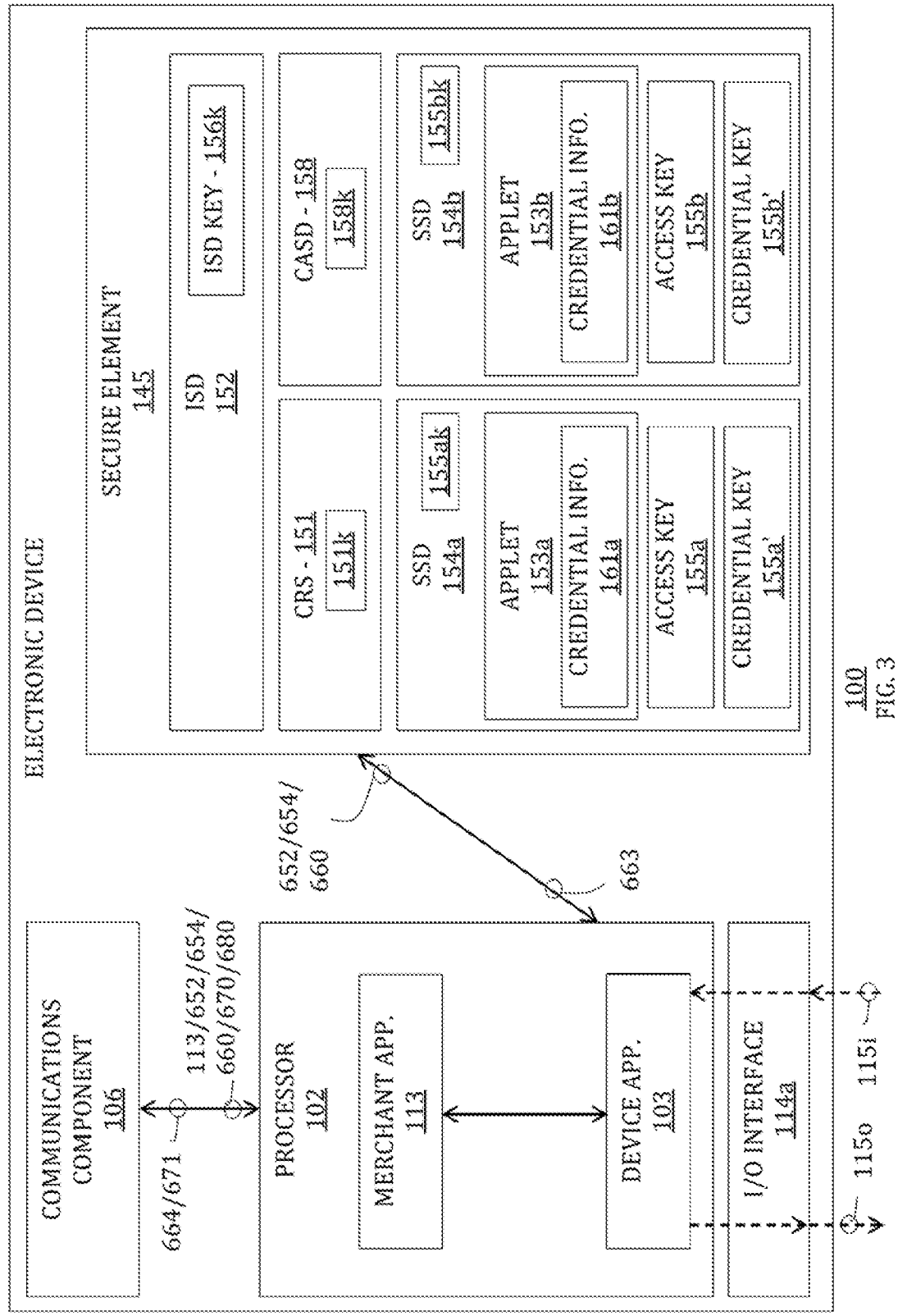
FIG. 3 is another more detailed schematic view of the electronic device of FIGS. 1-2.
Figure 4:
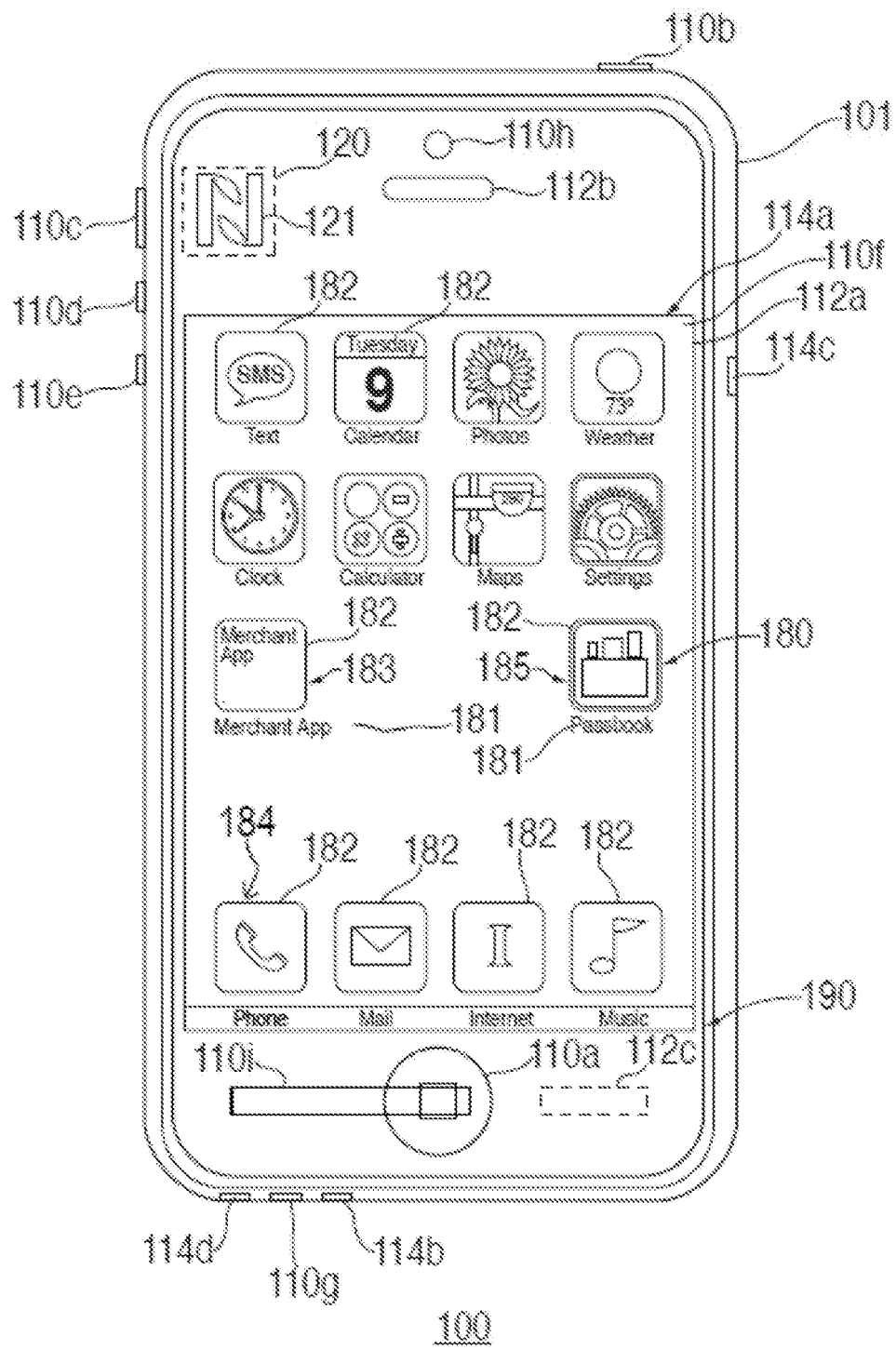
FIG. 4 is a front view of the electronic device of FIGS. 1-3.

FIGS. 1 and 1A show a system 1 in which one or more credentials may be provisioned onto an electronic device 100 from a financial institution subsystem 350 in conjunction with a commercial entity subsystem 400, and in which such credentials may be used by electronic device 100 for conducting an online financial transaction with a merchant subsystem 200 and an associated acquiring bank subsystem 300. FIGS. 2-4 show further details with respect to particular embodiments of electronic device 100 of system 1, FIGS. 4A-4D show example screens 190a-190d that may be representative of a graphical user interface of electronic device 100 during an online financial transaction, and FIGS. 5-14 are flowcharts of illustrative processes for communicating electronic device secure element data over multiple paths during an online financial transaction.

Description of FIG. 1

FIG. 1 is a schematic view of an illustrative system 1 that may allow for the multi-path communication of electronic device secure element data in an online financial transaction (e.g., an online payment). For example, as shown in FIG. 1, system 1 may include an end-user electronic device 100 as well as a financial institution subsystem 350 for securely provisioning one or more credentials on electronic device 100. Moreover, as shown in FIG. 1, system 1 may also include a merchant subsystem 200 for receiving contactless proximity-based communications (e.g., near field communications, such as communications 5) and/or online-based merchant payment data communications (e.g., in-app network telecommunications, such as communications 671) from electronic device 100 as well as a commercial entity subsystem 400 for receiving online-based device transaction data communications 664 from electronic device 100 for enabling payments based on such provisioned credentials between a user of electronic device 100 and a merchant of merchant subsystem 200. System 1 may also include an acquiring bank subsystem 300 that may utilize such contactless proximity-based communications and/or such online-based merchant payment data communications for completing a financial transaction with financial institution subsystem 350.

System 1 may include a communications path 15 for enabling communication between device 100 and merchant subsystem 200, a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, a communications path 75 for enabling communication between financial institution subsystem 350 and electronic device 100, and a communications path 85 for enabling communication between commercial entity subsystem 400 and merchant subsystem 200. One or more of paths 15, 25, 35, 45, 55, 65, 75, and 85 may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of paths 15, 25, 35, 45, 55, 65, 75, and 85, which may be capable of providing communications using any suitable wired or wireless communications protocol. For example, one or more of paths 15, 25, 35, 45, 55, 65, 75, and 85 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include a secure element that may be configured to provide a tamper-resistant platform (e.g., as a single-chip or multiple-chip secure microcontroller) that may be capable of securely hosting applications and their confidential and cryptographic data (e.g., credential applets and associated credential keys, such as a credential key 155a' and an access key 155a, and/or an issuer security domain ("ISD") key 156k, as shown in FIG. 1A) in accordance with rules and security requirements that may be set forth by a set of well-identified trusted authorities (e.g., an authority of financial institution subsystem and/or an industry standard, such as GlobalPlatform). As described below in more detail, a credential applet of NFC component 120 may be configured to provide sufficient detail for identifying a funding account or other financial instrument or credit source (e.g., at financial institution subsystem 350), where such a credential applet may be used by electronic device 100 in one or more communications with merchant subsystem 200 for facilitating a financial transaction. NFC component 120 may be configured to communicate such credential information as a contactless proximity-based communication 5 (e.g., near field communication) with merchant subsystem 200 (e.g., with a merchant terminal 220 of merchant subsystem 200, where the merchant terminal may be located at a brick and mortar store or any physical location at which a user of electronic device 100 may use a credential stored on electronic device 100 to conduct a financial transaction with a proximately located merchant terminal via a contactless proximity-based communication). Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 15, 65, and/or 75). Processor 102 of electronic device 100 may include any processing circuitry that may be operative to control the operations and performance of one or more components of electronic device 100. For example, processor 102 may be configured to run one or more applications on device 100 (e.g., an online resource or merchant application 113) that may at least partially dictate the way in which online-based merchant payment data communications that may include credential information of NFC component 120 may be communicated between communications component 106 of device 100 and a merchant server 210 of merchant subsystem 200 (e.g., to conduct a financial transaction with a remote merchant server of merchant subsystem 200 over the internet or any other suitable network that may be provided by communications path 15) and/or that may at least partially dictate the way in which online-based device transaction data communications 664 that may include credential information of NFC component 120 may be communicated between communications component 106 of device 100 and a commercial server 410 of commercial entity subsystem 400 (e.g., to conduct a financial transaction over the internet or any other suitable network that may be provided by communications path 65).

Merchant server 210 of merchant subsystem 200 of FIG. 2 may include any suitable component or subsystem configured to receive an online-based merchant payment data communication 671 from communications component 106 of electronic device 100 via a communication path 15 between device 100 and server 210. Such an online-based merchant payment data communication 671 may be configured to communicate certain commerce credential data from a secure element of NFC component 120 of device 100 (e.g., credit card credential information (e.g., a token or device primary account number and/or any suitable associated data) from an enabled applet of a credential supplemental security domain ("SSD")) to server 210 via any suitable communications protocol supported by communications component 106 of device 100 (e.g., Wi-Fi, Bluetooth™, cellular, wired network protocols, etc.). Online-based communication 671 may be provided within any suitable online-context, such as when a user of device 100 is communicating with merchant server 210 to conduct a financial transaction via a third party application 113 running on device 100 that may be managed by merchant server 210 or via an internet application or web browser (e.g., Safari™ by Apple Inc.) running on device 100 that may be pointed to a uniform resource locator ("URL") whose target or web resource may be managed by merchant server 210. Accordingly, it is noted that online-based communication 671 between merchant server 210 and electronic device 100 may occur wirelessly and/or via wired paths (e.g., over the internet). Merchant server 210 may be provided by a merchant of merchant subsystem 200 (e.g., as a webserver to host website data and/or manage third party application data). Although not shown, merchant subsystem 200 may also include a merchant processor component that may be the same as or similar to a processor component 102 of electronic device 100, a merchant communications component that may be the same as or similar to a communications component 106 of electronic device 100, a merchant I/O interface that may be the same as or similar to an I/O interface 114 of electronic device 100, a merchant bus that may be the same as or similar to a bus 118 of electronic device 100, a merchant memory component that may be the same as or similar to a memory component 104 of electronic device 100, and/or a merchant power supply component that may be the same as or similar to a power supply component 108 of electronic device 100.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 may be associated with a specific payment card that may be electronically linked to an account or accounts of a particular user. Various types of payment cards are suitable, including credit cards, debit cards, charge cards, stored-value cards, fleet cards, gift cards, and the like. The commerce credential of a specific payment card may be provisioned on electronic device 100 (e.g., as a credential of a credential supplemental security domain of NFC component 120, as described below) by financial institution subsystem 350 (e.g., by a payment network subsystem 360 and/or an issuing bank subsystem 370) for at least partial use in a commerce credential data communication (e.g., a contactless proximity-based communication and/or an online-based communication 671) with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand.

In order for a financial transaction to occur within system 1, at least one commerce credential must be securely provisioned on a secure element of NFC component 120 of electronic device 100. For example, such a commerce credential may be at least partially provisioned on a secure element of NFC component 120 of electronic device 100 directly from financial institution subsystem 350 (e.g., as credential data 654 via a communication path 75 between financial institution subsystem 350 and device 100, which may be passed to NFC component 120 via communications component 106). Additionally or alternatively, such a commerce credential may be at least partially provisioned on a secure element of NFC component 120 of electronic device 100 from financial institution subsystem 350 via commercial entity subsystem 400 (e.g., as credential data 654 via a communication path 55 between financial institution subsystem 350 and commercial entity subsystem 400, which may be passed to device 100 as credential data 654 via a communication path 65 between a server 410 of commercial entity subsystem 400 and communications component 106 of device 100, which may then be passed to NFC component 120 from communications component 106). Credential data 654 via path 75 and/or via path 65 may be provisioned on a secure element of device 100 as at least a portion or all of a credential supplemental security domain of NFC component 120 and may include a credential applet with credential information and/or a credential key, such as credential applet 153a with credential information 161a and credential key 155a'. As shown in FIG. 1A, for example, financial institution subsystem 350 may also have access to credential key 155a' (e.g., for decrypting data encrypted by device 100 using credential key 155a'). Financial institution subsystem 350 may be responsible for management of credential key 155a', which may include the generation, exchange, storage, use, and replacement of such a key. Financial institution subsystem 350 may store its version of credential key 155a' in a secure element of financial institution subsystem 350. It is to be understood that credential key 155a' of NFC component 120 and of financial institution subsystem 350 may be any suitable shared secret (e.g., a password, passphrase, array of randomly chosen bytes, one or more symmetric keys, public-private keys (e.g., asymmetric keys), etc.) available to both the secure element of electronic device 100 and financial institution subsystem 350 that may be operative to enable any suitable crypto data (e.g., a cryptogram) or any other suitable data to be independently generated by electronic device 100 and financial institution subsystem 350 (e.g., for validating payment data for an online financial transaction), such as by using any suitable cryptographic algorithm or cipher whose functional output may be at least partially determined by the shared secret, where such a shared secret may be provisioned on device 100 by financial institution subsystem 350. A shared secret may either be shared beforehand between financial institution subsystem 350 and electronic device 100 (e.g., during provisioning of a credential on device 100 by financial institution subsystem 350), in which case such a shared secret may be referred to as a pre-shared key, or a shared secret may be created prior to use for a particular online financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100.

Commercial entity subsystem 400 may be provided as an intermediary between electronic device 100 and financial institution subsystem 350, where commercial entity subsystem 400 may be configured to provide a new layer of security and/or to provide a more seamless user experience when a credential is being provisioned on a secure element of device 100 and/or when such a provisioned credential is being used as part of a commerce credential data communication between device 100 and merchant subsystem 200. Commercial entity subsystem 400 may be provided by a specific commercial entity that may offer various services to a user of device 100 via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, or the like) and/or of an operating system (e.g., device application 103) of device 100. The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and independent from any payment network subsystem 360 or issuing bank subsystem 370 that may furnish and manage any credit card or other commerce credential to be provisioned on user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and independent from any merchant of merchant subsystem 200 that may provide a merchant terminal for NFC communications, a third party application 113, and/or any other aspect of merchant subsystem 200. Such a commercial entity may leverage its potential ability to configure or control various components of device 100 (e.g., software and/or hardware components of device 100 when that commercial entity at least partially produces or manages device 100) in order to provide a more seamless user experience for a user of device 100 when he or she wants to provision a credential offered by financial institution subsystem 350 on user device 100 and/or when such a provisioned credential is being used as part of a commerce credential data communication with merchant subsystem 200. For example, in some embodiments, device 100 may be configured to communicate with commercial entity subsystem 400 seamlessly and transparently to a user of device 100 (e.g., via communications path 65) for sharing or receiving certain data that may enable a higher level of security or efficiency (e.g., during an online-based commerce credential data communication between device 100 and merchant subsystem 200).

In addition to at least one commerce credential being provisioned on a secure element of NFC component 120 of electronic device 100 (e.g., as a portion of a credential SSD with credential key 155a' and credential information 161a), at least one access SSD with an access key 155b may also be provisioned on the secure element of NFC component 120 of device 100 in order to more securely enable device 100 to conduct a financial transaction with merchant subsystem 200. For example, an access SSD may be at least partially provisioned on a secure element of NFC component 120 of electronic device 100 directly from commercial entity subsystem 400 (e.g., as access data 652 via communication path 65 between server 410 of commercial entity subsystem 400 and communications component 106 of device 100, which may then be passed to NFC component 120 from communications component 106). Access data 652 via path 65 may be provisioned on a secure element of device 100 as at least a portion or all of an access SSD and may include an access applet 153b with an access key 155b. As shown in FIG. 1A, commercial entity subsystem 400 may also have access to access key 155b (e.g., for decrypting data encrypted by device 100 using access key 155b). Commercial entity subsystem 400 may be responsible for management of access key 155b, which may include the generation, exchange, storage, use, and replacement of such a key. Commercial entity subsystem 400 may store its version of access key 155b in a secure element of commercial entity subsystem 400. An access SSD of NFC component 120 with access key 155b may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a credential of a credential SSD of NFC component 120). By storing such an access SSD within a secure element of device 100, its ability to reliably determine user intent for and authentication of a financial transaction may be increased. Moreover, access key 155b of such an access SSD of NFC component 120 may be leveraged to provide increased encryption to financial transaction data that may be communicated outside of the secure element of device 100. Additionally or alternatively, as described below, access data 652 may include an issuer security domain ("ISD") key 156k for an ISD of the secure element of electronic device 100, which may also be maintained by commercial entity subsystem 400, and may be used in addition to or as an alternative to access key 155b as described below.

In addition to at least one credential SSD and at least one access SSD being provisioned on a secure element of electronic device 100, at least one third party application (e.g., application 113) may be accessed by device 100 in order to enable a commerce credential data communication (e.g., an online-based communication 670) between device 100 and merchant subsystem 200. First, such an application 113 may be approved or otherwise enabled by commercial entity subsystem 400 before application 113 may be accessible by device 100. For example, an application store 420 of commercial entity subsystem 400 (e.g., the Apple App Store™) may receive at least some date representative of application 113 from merchant subsystem 200 via communication path 85. Moreover, in some embodiments, commercial entity subsystem 400 may generate or otherwise assign a merchant key 157 for application 113 and provide such a merchant key 157 to merchant subsystem 200 (e.g., via path 85). Alternatively, merchant subsystem 200 may generate or otherwise assign a merchant key 157 for application 113 and provide such a merchant key 157 to commercial entity subsystem 400 (e.g., via path 85). Either merchant subsystem 200 or commercial entity subsystem 400 may be responsible for management of merchant key 157, which may include the generation, exchange, storage, use, and replacement of such a key. No matter how or where such a merchant key 157 may be generated and/or managed, both merchant subsystem 200 and commercial entity subsystem 400 may store a version of merchant key 157 (e.g., in a respective secure element of merchant subsystem 200 and commercial entity subsystem 400). In some embodiments, such a merchant key 157 may be specifically associated with merchant application 113, while, in other embodiments, merchant key 157 may be specifically associated with a merchant of merchant subsystem 200 such that merchant key 157 may be associated with multiple third party applications operated by the same merchant of merchant subsystem 200. A table 430 or any other suitable data structure or source of information accessible to commercial entity subsystem 400 may be provided for associating a particular merchant key 157 with a particular merchant application 113 or merchant entity. Table 430 may enable commercial entity subsystem 400 to determine and utilize an appropriate merchant key 157 for providing a layer of security to a commerce credential data communication (e.g., an online-based communication 670) between device 100 and merchant subsystem 200 (e.g., when a user of device 100 is communicating with merchant server 210 to conduct a financial transaction via a third party application 113 associated with that merchant key 157). Device 100 may be configured to access application 113 (e.g., from application store 420 via communication path 65) and run application 113 (e.g., with processor 102). Alternatively or additionally, a merchant key 157 may be associated with a merchant's website (e.g., one or more URLs) rather than or in addition to a merchant's third party application (e.g., application 113). For example, a merchant of merchant subsystem 200 may work with commercial entity subsystem 400 to associate a particular merchant website with a particular merchant key 157 within table 430, which may enable commercial entity subsystem 400 to determine and utilize an appropriate merchant key 157 for providing a layer of security to a commerce credential data communication (e.g., an online-based communication 670) between device 100 and merchant subsystem 200 (e.g., when a user of device 100 is communicating with merchant server 210 to conduct a financial transaction via an internet application or web browser running on device 100 that may be pointed to a URL whose target or web resource may be associated with that merchant key 157). Device 100 may be configured to access such a URL, for example, from merchant server 210 via communication path 15 using an internet application on device 100.

In some embodiments, acquiring bank subsystem 300 may generate or otherwise assign a merchant identifier 167 for merchant subsystem 200 (e.g., application 113) and may provide such a merchant identifier 167 to merchant subsystem 200 (e.g., via path 25). Alternatively, merchant subsystem 200 may generate or otherwise assign such a merchant identifier 167 for itself and/or for application 113 and provide such a merchant identifier 167 to acquiring bank subsystem 300 (e.g., via path 25) or to any other suitable entity. Either merchant subsystem 200 or acquiring bank subsystem 300 may be responsible for management of merchant identifier 167, which may include the generation, exchange, storage, use, and replacement of such an identifier. No matter how or where such a merchant identifier 167 may be generated and/or managed, both merchant subsystem 200 and acquiring bank subsystem 300 may store a version of merchant identifier 167. In some embodiments, such a merchant identifier 167 may be specifically associated with merchant application 113, while, in other embodiments, merchant identifier 167 may be specifically associated with a merchant of merchant subsystem 200 such that merchant identifier 167 may be associated with multiple third party applications operated by the same merchant of merchant subsystem 200. A table 330 or any other suitable data structure or source of information accessible to acquiring bank subsystem 300 may be provided for associating a particular merchant identifier 167 with a particular merchant application 113 or merchant entity. Table 330 may enable acquiring bank subsystem 300 to determine and utilize an appropriate merchant identifier 167 for providing a merchant-specific element to a commerce credential data communication. For example, acquiring bank subsystem 300 may at least partially be provided as a payment service provider (e.g., CyberSource of Foster City, Calif.) that may generate such a merchant-specific element for use in a payment process of the disclosure.

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application (e.g., an application associated with a merchant of merchant subsystem 200).

NFC component 120 may be any suitable proximity-based communication mechanism that may enable contactless proximity-based transactions or communications between electronic device 100 and a merchant terminal (e.g., a merchant payment terminal) of merchant subsystem 200. NFC component 120 may include any suitable modules for enabling contactless proximity-based communication between electronic device 100 and such a merchant terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a merchant terminal as part of a contactless proximity-based or NFC communication. Additionally or alternatively, NFC data module 132 may be configured to contain, route, or otherwise receive any suitable data that may be received by NFC component 120 from a merchant terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a merchant terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and merchant subsystem 200. NFC memory module 150 may be tamper resistant and may provide at least a portion of a secure element 145 (see, e.g., FIG. 3). For example, such a secure element may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A credential may include credential data (e.g., credential information 161a) that may be assigned to a user/consumer and that may be stored securely on electronic device 100, such as a credit card payment number (e.g., a device primary account number ("DPAN"), DPAN expiry date, CVV, etc., as a token or otherwise). NFC memory module 150 may include at least two SSDs 154 (e.g., at least a first SSD 154a and a second SSD 154b). For example, first SSD 154a (e.g., a credential SSD 154a) may be associated with a specific credential (e.g., a specific credit card credential or a specific public transit card credential provisioned by financial institution subsystem 350) that may provide specific privileges or payment rights to electronic device 100, while second SSD 154b (e.g., an access SSD 154b) may be associated with a commercial entity (e.g., commercial entity of commercial entity subsystem 400, which may be a controlling entity for device 100) that may control access of device 100 to a specific credential of another SSD (e.g., first SSD 154a), for example, to provide specific privileges or payment rights to electronic device 100. Alternatively, each one of first SSD 154a and second SSD 154b may be associated with a respective specific credential (e.g., a specific credit card credential or a specific public transit card credential provisioned by financial institution subsystem 350) that may provide specific privileges or payment rights to electronic device 100. Each SSD 154 may include and/or be associated with at least one applet 153 (e.g., SSD 154a with applet 153a and SSD 154b with applet 153b). For example, an applet 153 of an SSD 154 may be an application that may run on a secure element of NFC component 120 (e.g., in a GlobalPlatform environment). A credential applet 153 may include or be associated with credential information 161 (e.g., information 161a of applet 153a and/or information 161b of applet 153b). Each SSD 154 and/or applet 153 may also include and/or be associated with at least one of its own keys 155 (e.g., applet 153a with at least one key 155a and applet 153b with at least one key 155b).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element when first provided on device 100. As one example, while credential SSD 154a may be associated with a particular credit card credential, that particular credential may only be communicated as a commerce credential data communication to merchant subsystem 200 (e.g., as a contactless proximity based communication to a merchant terminal and/or as an online based communication 670 to a merchant server 210) from a secure element of device 100 (e.g., from NFC component 120) for a financial transaction when applet 153a of that credential SSD 154a has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area. As an example, an access SSD 154b may leverage applet 153b to determine whether such authentication has occurred before allowing other SSDs 154 (e.g., a credential SSD 154a) to be used for communicating its credential information 161. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, applet 153b of access SSD 154b may be configured to determine intent and local authentication of a user of device 100 (e.g., via one or more input components 110, such as a biometric input component) and, in response to such a determination, may be configured to enable another particular SSD for conducting a payment transaction (e.g., with a credential of credential SSD 154a).

Description of FIG. 3

Referring now to FIG. 3, FIG. 3 shows another detailed view of a portion of electronic device 100 of system 1 described above with respect to FIGS. 1-2. As shown in FIG. 3, for example, a secure element 145 of NFC component 120 may include SSD 154a, which may include or be associated with applet 153a, credential information 161a, access key 155a, and/or credential key 155a', and SSD 154b, which may include or be associated with applet 153b, credential information 161b, access key 155b, and/or credential key 155b'. In some embodiments, a specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155ak and 155bk) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153a of SSD 154a may be associated with a first commerce credential and credential applet 153b of SSD 154b may be associated with a second commerce credential), where a credential applet may have its own access key (e.g., access key 155a for credential applet 153a and access key 155b for credential applet 153b) and/or its own credential key (e.g., credential key 155a' for credential applet 153a and credential key 155b' for credential applet 153b), and where a credential applet may need to be activated to enable its associated commerce credential information for use by NFC device module 130 as an NFC communication and/or as an online-based communication between electronic device 100 and merchant subsystem 200 and/or commercial entity subsystem 400. In some embodiments, a credential key of a credential applet (e.g., credential key 155a' for credential applet 153a and/or credential key 155b' for credential applet 153b) may be generated by financial institution subsystem 350 that may be responsible for such a credential and may be accessible by that financial institution subsystem 350 (e.g., as shown in FIG. 1A) for enabling secure transmission of that credential information of that applet between secure element 145 and financial institution subsystem 350 (e.g., via merchant subsystem 200 and/or commercial entity subsystem 400). Additionally or alternatively, an access key of a credential applet (e.g., access key 155a for credential applet 153a and/or access key 155b for credential applet 153b) may be generated by commercial entity subsystem 400 and may be accessible by commercial entity subsystem 400 (e.g., as shown in FIG. 1A) for enabling secure transmission of that credential information of that applet between secure element 145 and commercial entity subsystem 400.

Additionally or alternatively, as shown in FIG. 3, secure element 145 may include ISD 152, which may include an ISD key 156k that may also be known to a trusted service manager associated with that security domain (e.g., commercial entity subsystem 400, as shown in FIG. 1A). ISD key 156k may be leveraged by commercial entity subsystem 400 and electronic device 100 similarly to and/or instead of access key 155a and/or access key 155b for enabling secure transmissions between commercial entity subsystem 400 and secure element 145 of electronic device 100. Moreover, as shown in FIG. 3, and as described below in more detail, various data may be communicated between processor 102 and secure element 145. For example, processor 102 of device 100 may be configured to run a device application 103 that may communicate information with a merchant application 113 of processor 102 as well as secure element 145, an I/O component 114a (e.g., for receiving I/O input data 115i and/or for transmitting I/O output data 115o), and/or communications component 106.

Additionally or alternatively, as shown in FIG. 3, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it cannot be inspected or modified by any entity, including an issuer of secure element 145. CASD 158 may be configured to include and/or may be configured to generate and/or otherwise include CASD access kit 158k (e.g., a CASD private key ("CASD-SK"), a CASD public key ("CASD-PK"), a CASD certificate ("CASD-Cert."), and/or a CASD-signing module). For example, CASD 158 may be configured to sign certain data on secure element 145 (e.g., using CASD access kit 158k) before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using an associated CASD kit 158k at commercial entity subsystem 400).

Additionally or alternatively, as shown in FIG. 3, secure element 145 may include a contactless registry services ("CRS") applet or application 151 that may be configured to provide local functionality to electronic device 100 for modifying a life cycle state (e.g., activated, deactivated, locked, etc.) of certain security domain elements and sharing certain output information 115o about certain security domain elements in certain life cycle states with a user of device 100 (e.g., via a user I/O interface 114a). Additionally or alternatively, CRS 151 may include a CRS access key 151k that may also be known to a trusted service manager associated with CRS 151 (e.g., commercial entity subsystem 400, as shown in FIG. 1A). CRS access key 151k may be leveraged by commercial entity subsystem 400 and electronic device 100 similarly to and/or instead of access key 155a and/or access key 155b for enabling secure transmissions between commercial entity subsystem 400 and secure element 145 of electronic device 100.

Description of FIGS. 4-4D

As shown in FIG. 4, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific third party merchant application and may display screens of a specific user interface that may include one or more tools or features for interacting with device 100 in a specific manner (see, e.g., screens 190a-190d of FIGS. 4A-4D for specific examples of such displays of GUI 180 during use of a merchant application (e.g., application 113) that may be used by a user of device 100 for making an online payment with a credential of NFC component 120 (e.g., a credential of credential SSD 154a)). For each application, screens may be displayed on display output component 112a and may include various user interface elements. Additionally or alternatively, for each application, various other types of non-visual information may be provided to a user via various other output components 112 of device 100.

Description of FIG. 5

FIG. 5 is a flowchart of an illustrative process 500 for communicating electronic device secure element data over multiple paths for conducting an online payment. Process 500 is shown being implemented by electronic device 100, merchant subsystem 200, acquiring bank subsystem 300, commercial entity subsystem 400, and financial institution subsystem 350. However, it is to be understood that process 500 may be implemented using any other suitable components or subsystems. Process 500 may provide a seamless user experience for securely and efficiently conducting online payments with merchant subsystem 200 on device 100.

At step 502 of process 500, potential transaction data may be communicated to electronic device 100 from merchant subsystem 200. For example, at some point during user interaction with device 100 running merchant application 113 (e.g., while a user is shopping online for goods or services of a merchant), potential transaction data may be communicated to electronic device 100 from merchant subsystem 200 or from any other suitable entity that may be indicative of any suitable data relative to a potential transaction to occur between a user of device 100 and a merchant of merchant subsystem 200, including, but not limited to, (i) specific merchant information, such as identification of a merchant identifier (e.g., merchant identifier 167 as may be managed by acquiring bank subsystem 300), (ii) specific transaction information, such as identification of a specific currency to be used to pay for the transaction (e.g., yen, pounds, dollars, etc.) and/or identification of a specific amount of a currency to be paid for the transaction, (iii) specific merchant-based transaction-enhancer information (e.g., one or more elements or rules, such as an indication of a valid timeframe for the transaction to be valid, an indication of a valid maximum currency value for the transaction, an indication of whether or not the transaction is allowed to be a recurring transaction, etc.), and/or (iv) a unique merchant-based transaction identifier (e.g., any suitable data element, such as a 3 or 4 character alphanumeric string, that may be randomly or uniquely generated by merchant subsystem 200 for association with the transaction being conducted). Such potential transaction data may be communicated by merchant subsystem 200 to electronic device 100 at step 502 (e.g., such potential transaction data may be transmitted from server 210 of merchant subsystem 200 to communications component 106 of electronic device 100 via communications path 15 using any suitable communications protocol).

At step 504 of process 500, device transaction data may be at least partially generated and then communicated to commercial entity subsystem 400 from electronic device 100. For example, in response to receiving potential transaction data at step 502, device 100 may be operative to identify a particular credential of secure element 145 that is to be used to attempt to fund the transaction and payment card data associated with that particular credential may be communicated along with at least a portion of the potential transaction data of step 502 as device transaction data at step 504. Such payment card data may include any suitable data operative to securely prove proper ownership of the particular secure element credential (e.g., the credential of SSD 154*a*), including, but not limited to, (i) token data (e.g., a DPAN, DPAN expiry date, and/or CVV of credential information 161*a* of SSD 154*a*) and (ii) crypto data (e.g., a cryptogram that may be generated by secure element 145 using a shared secret of SSD 154*a* (e.g., key 155*a*') and any other suitable information (e.g., some or all of the token data, information identifying device 100, information identifying some or all of the potential transaction data of step 502, any suitable counter values, nonce, etc.) that may be available to device 100 and that may also be made available to financial institution subsystem 350 (e.g., at step 510) for independently generating the crypto data using the shared secret). Therefore, device transaction data communicated from electronic device 100 to commercial entity subsystem 400 at step 504 may include some or all of the potential transaction data of step 502 as well as payment card data that may include at least two types or divisible portions of data based on a particular credential of device 100 (e.g., any suitable token data and any suitable crypto data, which together may enable a more secure financial transaction (e.g., cryptogram validation) when received by financial institution subsystem 350). In some embodiments, device transaction data communicated from electronic device 100 to commercial entity subsystem 400 at step 504 may also include a unique device-based transaction identifier (e.g., any suitable data element, such as a 3 or 4 character alphanumeric string, that may be randomly or uniquely generated by electronic device 100 for association with the transaction being conducted). Additionally or alternatively, device transaction data communicated from electronic device 100 to commercial entity subsystem 400 at step 504 may include specific device-based transaction-enhancer information (e.g., one or more elements or rules, such as an indication of the current location of device 100 (e.g., using GPS or other location-based technologies available to device 100) or any other suitable current situational characteristic of device 100, one or more user-defined rules for the transaction, etc.).

In some embodiments, electronic device 100 may encrypt all of the payment card data of the device transaction data or at least a portion the payment card data of the device transaction data (e.g., the token data and/or the crypto data of the payment card data) with a financial institution key prior to communicating the device transaction data to commercial entity subsystem 400 at step 504. For example, secure element 145 may encrypt or sign at least a portion of the device transaction data in any suitable manner with any suitable credential key or element available to secure element 145 (e.g., credential key 155*a*') that may also be available to financial institution subsystem 350.

In some embodiments, electronic device 100 may encrypt all of the device transaction data or at least a portion of the device transaction data (e.g., the payment card data) with a commercial entity key prior to communicating the device transaction data to commercial entity subsystem 400 at step 504 (e.g., whether or not any portion of the device transaction data is first encrypted with a financial institution key). For example, secure element 145 may encrypt at least a portion of the device transaction data with access key 155*a*, access key 155*b*, CRS 151*k*, and/or ISD key 156*k* of secure element 145, which may also be accessible to commercial entity subsystem 400 (e.g., any shared secret between electronic device 100 and commercial entity subsystem 400). Alternatively or additionally, secure element 145 may sign at least a portion of the device transaction data with CASD 158*k* that may be accessible to commercial entity subsystem 400. In some embodiments, such a commercial entity key or access key may be a commercial entity public key associated with a scheme of commercial entity subsystem 400 and of which commercial entity subsystem 400 may have access to an associated commercial entity private key. Commercial entity subsystem 400 may provide such a commercial entity public key to financial institution subsystem 350 and financial institution subsystem 350 may then share that commercial entity public key with device 100 (e.g., when provisioning credential data on device 100 (e.g., at step 654 of process 600)). Device transaction data, whether or not at least partially encrypted and/or signed by any suitable financial institution key or by any commercial entity key, may be communicated by electronic device 100 to commercial entity subsystem 400 at step 504 (e.g., such device transaction data may be transmitted from communications component 106 of electronic device 100 to server 410 of commercial entity subsystem 400 via communications path 65 using any suitable communications protocol).

At step 506 of process 500, commercial entity subsystem 400 may be operative to process the device transaction data received from device 100 at step 504 in order to enable at least two distinct portions of transaction payment data (e.g., at least two distinct portions of the payment card data of the device transaction data) to be communicated to financial institution subsystem 350 via different communication paths for achieving a more secure and/or more efficient validation of the payment card data of the transaction. At step 506, commercial entity subsystem 400 may be operative to isolate token data from crypto data of the payment card data of the device transaction data received from device 100 at step 504, such that the token data (e.g., a DPAN, DPAN expiry date, etc. of SSD 154*a*) may be communicated as part of a first portion of transaction payment data to financial institution subsystem 350 via a first communication path (e.g., as a portion of merchant payment data communicated from commercial entity subsystem 400 to financial institution subsystem 350 via electronic device 100 and/or via merchant subsystem 200 and/or via acquiring bank subsystem 300 (e.g., at steps 508 and 510)), and such that the crypto data (e.g., a cryptogram generated at device 100 using a shared secret of SSD 154*a* and financial institution subsystem 350) may be communicated as part of a second portion of the transaction payment data to financial institution subsystem 350 via a second communication path (e.g., as a portion of commercial payment data communicated from commercial entity subsystem 400 to financial institution subsystem 350 not via electronic device 100 and/or not via merchant subsystem 200 and/or not via acquiring bank subsystem 300 (e.g., at step 512)), whereby financial institution subsystem 350 may be operative to leverage the first portion of the transaction payment data (e.g., the merchant payment data received at step 510) in order to derive a transaction key for appropriately accessing the second portion of the transaction payment data (e.g., the commercial payment data received at step 512), and then financial institution subsystem 350 may be operative to leverage the first portion of the transaction payment data to validate the crypto data of the appropriately accessed second portion of the transaction payment data (e.g., using a shared secret of SSD 154*a* and financial institution subsystem 350). For example, at step 506, commercial entity subsystem 400 may access a unique transaction identifier for the transaction being conducted (e.g., at sub-step 506*a* of step 506), derive a transaction key based on any suitable transaction key data (e.g., at sub-step 506*b* of step 506), where such transaction key data may include the accessed unique transaction identifier, and then store or otherwise use any suitable commercial payment data against the derived transaction key (e.g., at sub-step 506c of step 506), where such commercial payment data may include the crypto data of the payment card data of the received device transaction data. Such a transaction key may be any suitable data element that may enable commercial entity subsystem 400 to find an associated data element (e.g., the commercial payment data) using a database index, hash table, memory location, or the like (e.g., table 430 or any other suitable data structure accessible to commercial entity subsystem 400 may be provided for enabling commercial entity subsystem 400 to store or otherwise associate a particular transaction key with or against particular commercial payment data).

The accessing of a unique transaction identifier by commercial entity subsystem 400 at sub-step 506a may include commercial entity subsystem 400 identifying a unique merchant-based transaction identifier from the device transaction data received at step 504 (e.g., as may have been generated by merchant subsystem 200 for inclusion in the potential transaction data of step 502, and which may have been passed on by device 100 as a portion of the device transaction data of step 504). Alternatively, the accessing of a unique transaction identifier by commercial entity subsystem 400 at sub-step 506a may include commercial entity subsystem 400 identifying a unique device-based transaction identifier from the device transaction data received at step 504 (e.g., as may have been generated by electronic device 100 for inclusion in the device transaction data of step 504). Alternatively, the accessing of a unique transaction identifier by commercial entity subsystem 400 at sub-step 506a may include commercial entity subsystem 400 generating a unique commercial-based transaction identifier (e.g., any suitable data element, such as a 3 or 4 character alphanumeric string, that may be randomly or uniquely generated by commercial entity subsystem 400 for association with the transaction being conducted). Alternatively, the accessing of a unique transaction identifier by commercial entity subsystem 400 at sub-step 506a may include commercial entity subsystem 400 generating a unique commercial-based transaction identifier at least partially based on one or both of a unique merchant-based transaction identifier from the device transaction data received at step 504 and a unique device-based transaction identifier from the device transaction data received at step 504.

The deriving of a transaction key by commercial entity subsystem 400 at sub-step 506b may be done using any suitable transaction key data that may also be made accessible to financial institution subsystem 350 for independently deriving or determining the transaction key. For example, such transaction key data may be at least a portion of merchant payment data that may be provided to financial institution subsystem 350 (e.g., at step 510). Such transaction key data may include, but is not limited to, one or more of (i) a unique transaction identifier (e.g., as accessed at sub-step 506a), (ii) specific merchant information (e.g., identification of a merchant identifier, such as merchant identifier 167, that may be provided from merchant subsystem 200 to device 100 as a portion of the potential transaction data of step 502 and that may then be provided from device 100 to commercial entity subsystem 400 as a portion of the device transaction data of step 504), (iii) specific transaction information (e.g., identification of a specific currency to be used to pay for the transaction and/or identification of a specific amount of a currency to be paid for the transaction that may be provided from merchant subsystem 200 to device 100 as a portion of the potential transaction data of step 502 and that may then be provided from device 100 to commercial entity subsystem 400 as a portion of the device transaction data of step 504), and (iv) a specific portion of payment card data (e.g., token data of the payment card data that may then be provided from device 100 to commercial entity subsystem 400 as a portion of the device transaction data of step 504 (e.g., a DPAN, DPAN expiry date, etc. of SSD 154a)). Therefore, in some embodiments, a transaction key may be derived by commercial entity subsystem 400 at sub-step 506b based on transaction key data that may include a unique transaction identifier accessed at sub-step 506a, a specific merchant identifier provided by merchant subsystem 200 (e.g., via device 100), a specific currency to be used to pay for the transaction, and token data provided by secure element 145. The transaction key may be derived by commercial entity subsystem 400 at sub-step 506b using any suitable transaction key data in combination with any suitable derivation technique (e.g., concatenation of the fields of transaction key data, leveraging any suitable security keys or derivation techniques, etc., and one or more hashes may be run to confirm that a derived transaction key sequence is valid). In some embodiments, the derivation technique may be shared between commercial entity subsystem 400 and financial institution subsystem 350 such that each may be enabled to independently derive the same transaction key based on the same transaction key data.

Once a suitable transaction key is derived at sub-step 506b, commercial entity subsystem 400 may store suitable commercial payment data against that transaction key at sub-step 506c. For example, commercial payment data associated with the current transaction may be stored by commercial entity subsystem 400 in association with the transaction key (e.g., in table 430 or any other suitable data structure accessible to commercial entity subsystem 400, such that the particular stored commercial payment data may be later accessed using the transaction key (e.g., for use by financial institution subsystem 350)). Alternatively, as described with respect to step 512, such commercial payment data may be communicated (e.g., pushed) in combination with the transaction key from commercial entity subsystem 400 to financial institution subsystem 350 (e.g., immediately after deriving the transaction key) such that the transaction key and/or the commercial payment data may thereafter be deleted or otherwise not maintained by commercial entity subsystem 400. Such commercial payment data may include, but is not limited to, one or more of (i) a specific portion of payment card data (e.g., crypto data of the payment card data that may then be provided from device 100 to commercial entity subsystem 400 as a portion of the device transaction data of step 504 (e.g., a cryptogram that may be generated by secure element 145 using a shared secret of SSD 154a (e.g., key 155a') and any other suitable information (e.g., some or all of the token data of the payment card data, information identifying device 100, information identifying some or all of the potential transaction data of step 502, any suitable counter values, etc.) that may be available to device 100 and that may also be made available to financial institution subsystem 350 (e.g., at step 510) for independently generating the crypto data using the shared secret)), (ii) specific merchant-based transaction-enhancer information (e.g., one or more elements or rules that may be generated by and provided from merchant subsystem 200 to device 100 as a portion of the potential transaction data of step 502 and that may then be provided from device 100 to commercial entity subsystem 400 as a portion of the device transaction data of step 504), (iii) specific device-based transaction-enhancer information (e.g., one or more elements or rules that may be generated by and provided from device 100 to commercial entity subsystem 400 as a portion of the device transaction data of step 504), and/or (iv) specific commercial-based transaction-enhancer information (e.g., one or more elements or rules that may be generated by commercial entity subsystem 400 (e.g., any suitable verification information that may be generated and/or authenticated by commercial entity subsystem 400 for verifying the identity of the user of device 100 and/or of device 100 itself)). Therefore, in some embodiments, such commercial payment data leveraged by commercial entity subsystem 400 at sub-step 506c and/or at step 512 in combination with a transaction key may include crypto data provided by secure element 145 with or without any suitable transaction-enhancer information (e.g., one or more transaction-specific elements or rules that may originate from merchant subsystem 200 and/or electronic device 100 and/or commercial entity 400).

In some embodiments, commercial entity 400 may decrypt at least a portion of the device transaction data received at step 504 with a commercial entity key prior to at least one of the sub-steps of step 506. For example, server 410 of commercial entity subsystem 400 may receive the device transaction data from electronic device 100, decrypt at least a portion of that encrypted device transaction data with access key 155a, access key 155b, CRS 151k, and/or ISD key 156k of commercial entity subsystem 400 and/or unsign at least a portion of that device transaction data with CASD 158k of commercial entity subsystem 400 (e.g., any portion of the device transaction data that was encrypted and/or signed by electronic device 100 prior to communicating such data to commercial entity subsystem 400 at step 504 (e.g., at least a portion of the payment card data may be encrypted/signed with a shared secret of device 100 and commercial entity subsystem 400)). As one example, at least the token data of the payment card data of the device transaction data, which may be used as a portion of the transaction key data at sub-step 506b, may be encrypted by device 100 with a shared secret of commercial entity subsystem 400 such that it must be decrypted by commercial entity subsystem 400 prior to sub-step 506b. Additionally or alternatively, at least the crypto data of the payment card data of the device transaction data, which may be used as a portion of the commercial payment data at sub-step 506c, may be encrypted by device 100 with a shared secret of commercial entity subsystem 400 such that it must be decrypted by commercial entity subsystem 400 prior to sub-step 506c. By communicating at least a portion of the payment card data of the device transaction data between electronic device 100 and commercial entity subsystem 400 in an encrypted form that has been encrypted using a commercial entity key known to both electronic device 100 and commercial entity subsystem 400 (e.g., access key 155a, access key 155b, CRS 151k, and/or ISD key 156k), process 500 may prohibit the communication of such encrypted payment card data from being intercepted and decrypted by an entity that does not have access to the commercial entity key.

Next, at step 508, process 500 may include commercial entity subsystem 400 communicating any suitable merchant payment data to electronic device 100, which may then be forwarded on from device 100 to financial institution subsystem 350 via merchant subsystem 200 and acquiring bank subsystem 300 at step 510. The merchant payment data to be received by financial institution subsystem 350 may include any suitable data that may be used by financial institution subsystem 350 to derive the transaction key for enabling financial institution subsystem 350 to access the commercial payment data (e.g., at step 512) and any suitable data that may be used by financial institution subsystem 350 to validate the funding of a transaction in combination with the commercial payment data and any data otherwise accessible to financial institution subsystem 350 (e.g., one or more shared secrets of financial institution subsystem 350). In some embodiments, the merchant payment data received by financial institution subsystem 350 at step 510 (e.g., as may be at least partially generated by commercial entity subsystem 400 at step 508, and potentially supplemented with additional data by device 100, merchant subsystem 200, and/or acquiring bank subsystem 300 at step 510, or as may be at least partially or completely generated by any one of commercial entity subsystem 400, merchant subsystem 200, and acquiring bank subsystem 300), may include, but is not limited to, one or more of (i) a unique transaction identifier (e.g., as accessed at sub-step 506a), (ii) specific merchant information (e.g., identification of a merchant identifier, such as merchant identifier 167), (iii) specific transaction information (e.g., identification of a specific currency to be used to pay for the transaction and/or identification of a specific amount of a currency to be paid for the transaction), and (iv) a specific portion of payment card data (e.g., token data (e.g., a DPAN, DPAN expiry date, etc. of SSD 154a)). Therefore, in some embodiments, merchant payment data received by financial institution subsystem 350 at step 510 may include at least the same data that was used by commercial entity subsystem 400 at sub-step 506b as transaction key data, such as a unique transaction identifier, a specific merchant identifier, a specific currency to be used to pay for the transaction, and token data provided by secure element 145 (e.g., a DPAN and a DPAN expiry date). Upon receiving such merchant payment data at step 510, financial institution subsystem 350 may be operative to independently derive the same transaction key as derived by commercial entity subsystem 400 (e.g., at step 506b) by using that merchant payment data in combination with any suitable derivation technique. As mentioned, the derivation technique may be shared between commercial entity subsystem 400 and financial institution subsystem 350 such that each may be enabled to independently derive the same transaction key based on the same transaction key data.

In some embodiments, commercial entity 400 may encrypt at least a portion of the merchant payment data with a merchant key prior to communicating such merchant payment data at step 508. For example, commercial entity subsystem 400 may be operative to identify an appropriate merchant key 157 for merchant subsystem 200 (e.g., by leveraging table 410 and any suitable merchant identification data that may be accessible to commercial entity subsystem 400 for the particular transaction being conducted (e.g., based on any suitable merchant identification data of the device transaction data received by commercial entity subsystem 400 at step 504)). This may enable any sensitive data (e.g., a portion of payment card data (e.g., token data)) of the merchant payment data to be encrypted and/or signed using a shared secret between commercial entity subsystem 400 and merchant subsystem 200, which may then be leveraged by merchant subsystem 200 for decrypting that data before passing it on to acquiring bank subsystem 300 as a part of step 510. For example, such re-encrypted payment card data may be transmitted as a portion of the merchant payment data from commercial entity subsystem 400 to communications component 106 of electronic device 100 via communications path 65 using any suitable communications protocol. Next, at step 510, process 500 may include electronic device 100 communicating the communicated merchant payment data of step 508 to merchant subsystem 200. For example, such merchant payment data may be transmitted from communications component 106 of electronic device 100 to server 210 of merchant subsystem 200 via communications path 15 using any suitable communications protocol. By communicating the payment card data portion of the merchant payment data from commercial entity subsystem 400 to electronic device 100 and then to merchant subsystem 200 in a re-encrypted form that has been re-encrypted using a merchant key known to both commercial entity subsystem 400 and merchant subsystem 200 (e.g., merchant key 157), process 500 may prohibit the communication of such re-encrypted payment card data from being decrypted and altered by an entity that does not have access to the merchant key (e.g., electronic device 100). In some embodiments, the device transaction data communicated from electronic device 100 to commercial entity subsystem 400 at step 504 may include a merchant identifier that may be indicative of a merchant subsystem with which electronic device 100 is attempting to conduct a financial transaction (e.g., via an online resource 113 associated with merchant subsystem 200). Such a merchant identifier may be received and utilized by commercial entity subsystem 400 at step 506 to identify a particular one of many merchant keys accessible by commercial entity subsystem 400 to use for the re-encryption of at least a portion of the payment card data for inclusion in the merchant payment data that may be communicated at step 508 (e.g., through leveraging table 430 of commercial entity subsystem 400).

The merchant payment data received by electronic device 100 at step 508 may be forwarded on to financial institution subsystem 350 at step 510, either directly (e.g., via communications path 75 using any suitable communications protocol) or via merchant subsystem 200 and acquiring bank subsystem 300 (e.g., via communications paths 25 and 35 using any suitable communications protocol or protocols). In some embodiments, some portion of the merchant payment data received by financial institution subsystem 350 at step 510 may have been added to the merchant payment data by device 100, merchant subsystem 200, and/or acquiring bank subsystem 300 (e.g., by supplementing the merchant payment data communicated by commercial entity subsystem 400 at step 308). As just one example, the merchant payment data communicated by commercial entity subsystem 400 at step 308 may include (i) a unique transaction identifier (e.g., as accessed at sub-step 506a), (ii) specific transaction information (e.g., identification of a specific currency to be used to pay for the transaction and/or identification of a specific amount of a currency to be paid for the transaction), and (iii) a specific portion of payment card data (e.g., token data (e.g., a DPAN, DPAN expiry date, etc. of SSD 154a)), and acquiring bank subsystem 300 may supplement such merchant payment data with specific merchant information (e.g., identification of a merchant identifier, such as merchant identifier 167) before communicating such supplemented merchant payment data to financial institution subsystem 350, whereby such supplemented merchant payment data may include at least the same information as included in the transaction key data used by commercial entity subsystem 400 to derive a particular transaction key at sub-step 506b, such that financial institution subsystem 350 may be operative to leverage at least a portion of such supplemented merchant payment data to independently derive that same particular transaction key.

At step 512, which may at least be initiated prior to step 508 and/or prior to step 510, or which may at least be initiated after step 508 and/or after step 510, commercial payment data may be communicated between commercial entity subsystem 400 and financial institution subsystem 350 (e.g., via communications path 55 using any suitable communications protocol or protocols). In some embodiments, step 512 may include commercial entity subsystem 400 communicating commercial payment data to an appropriate target financial institution subsystem 350 in response to receiving a pull request from that appropriate target financial institution subsystem 350. Such a pull request for commercial payment data may be generated and communicated by the appropriate target financial institution subsystem 350 at a first portion of step 512, where such a pull request may include an identification of the transaction key associated with the commercial payment data being requested. For example, in response to receiving particular merchant payment data at step 510, a particular financial institution subsystem 350 may be operative to leverage at least a portion of that particular merchant payment data to derive a particular transaction key and then to generate and transmit a pull request to commercial entity subsystem 400 at step 512, where such a pull request may include that particular derived transaction key. Commercial entity subsystem 400 may be identified by financial institution subsystem 350 as the proper recipient of such a pull request based on any suitable information available to financial institution subsystem 350 (e.g., DPAN bin information associated with the merchant payment data received at step 510 (e.g., in combination with financial institution subsystem 350 identifying that the merchant payment data received at step 510 needs to be associated with crypto data)). In response to receiving such a pull request with such a particular transaction key, commercial entity subsystem 400 may be operative to identify the particular commercial payment data associated with that particular transaction key (e.g., server 410 may be operative to leverage that received particular transaction key to identify particular commercial payment data stored against that particular transaction key (e.g., at sub-step 506c)), and then commercial entity subsystem 400 may be operative to communicate that identified particular commercial payment data to the particular financial institution subsystem 350 that had communicated the pull request.

Alternatively, step 512 may include commercial entity subsystem 400 pushing commercial payment data and its associated transaction key to an appropriate target financial institution subsystem 350 (e.g., immediately after deriving the transaction key). For example, commercial entity subsystem 400 may be operative at step 512 to identify an appropriate target financial institution subsystem 350 for such commercial payment data using any suitable data that may be available to commercial entity subsystem 400 and then sending such commercial payment data to that identified target financial institution subsystem 350. Such data that may be available to commercial entity subsystem 400 for use in identifying the appropriate target financial institution subsystem 350 may include the token data of the payment card data of the device transaction data that may be received by commercial entity subsystem 400 at step 504 and/or that may be utilized by commercial entity subsystem 400 as at least a portion of the transaction key data of sub-step 506b and/or as at least a portion of the merchant payment data of step 508. For example, such token data may include a DPAN, DPAN expiry date, and/or CVV of credential information 161a of SSD 154a, whereby at least a portion of such a DPAN may be operative to identify to commercial entity subsystem 400 the appropriate target financial institution subsystem 350 (e.g., an appropriate payment network subsystem 360 associated with that DPAN (e.g., a certain subset of alphanumeric characters of a DPAN may be associated with a particular payment network that may be identifiable by commercial entity subsystem 400 (e.g., using a look-up table))). In such embodiments, once a transaction key has been derived at sub-step 506b and the appropriate target financial institution subsystem 350 has been identified, commercial entity subsystem 400 may be operative to communicate any suitable commercial payment data along with its associated derived transaction key to the identified appropriate target financial institution subsystem 350 at step 512 (e.g., via communications path 55 using any suitable communications protocol). Such communication of commercial payment data and its associated transaction key by commercial entity subsystem 400 to an appropriate target financial institution subsystem 350 as identified by commercial entity subsystem 400 based on device transaction data received by commercial entity subsystem 400 from device 100 at step 504 (e.g., token data) may be a push communication as commercial entity subsystem 400 may be initiating the communication. As mentioned, financial institution subsystem 350 may be operative to derive a transaction key based on merchant payment data received at step 510, such that financial institution subsystem 350 may be operative to leverage that derived transaction key in order to identify a particular push communication received from commercial entity subsystem 400 that includes that same transaction key and then to access the commercial payment data of that identified particular push communication.

Therefore, whether commercial payment data is communicated at step 512 from commercial entity subsystem 400 to financial institution subsystem 350 as a push communication or as a response to a received pull request, step 512 may include financial institution subsystem 350 leveraging particular merchant payment data received at step 510 for deriving a particular transaction key for accessing particular commercial payment data associated with that particular transaction key from commercial entity subsystem 400. Once financial institution subsystem 350 has received particular merchant payment data through a first communication channel at step 510 and has received associated particular commercial payment data through a second communication channel at step 512 (e.g., by leveraging a transaction key that may be both derived from such merchant payment data by financial institution subsystem 350 and associated with such commercial payment data by commercial entity subsystem 400), financial institution subsystem 350 may be operative at step 514 to independently generate crypto data based on the token data of the particular merchant payment data received at step 510, compare that generated crypto data to the crypto data of the particular commercial payment data received at step 512, and either validate or reject the transaction based on the comparison. For example, financial institution subsystem 350 may be operative to independently generate crypto data based on particular merchant payment data received at step 510, where such merchant payment data may include token data (e.g., a DPAN, DPAN expiry date, and/or CVV of credential information 161a of SSD 154a) and any other suitable data associated with the transaction (e.g., merchant identification information, currency and/or amount information, etc.), and where financial institution subsystem 350 may be operative to leverage such received merchant payment data in conjunction with a shared secret of both financial institution subsystem 350 and electronic device 100 to independently generate crypto data (e.g., in a similar manner as device 100 may have generated crypto data of device transaction data at step 504). Then, such crypto data as generated by financial institution subsystem 350 at a first portion of step 514 based on merchant payment data received by financial institution subsystem 350 at step 510 may be compared by financial institution subsystem 350 at a second portion of step 514 to crypto data of the commercial payment data received by financial institution subsystem 350 at step 512. If such a comparison reveals that the two instances of crypto data are the same, then financial institution subsystem 350 may validate the crypto data at a third portion of step 514 for enabling the transaction to be funded using a funding account associated with the validated crypto data (e.g., a finding account that may be associated with the DPAN of the token data associated with the crypto data) at step 516. Additionally or alternatively, at step 514, financial institution subsystem 350 may be operative to use at least a portion of the merchant payment data received at step 510 (e.g., DPAN, DPAN expiry date, etc.) in combination with at least a portion of the commercial payment data received at step 512 (e.g., any suitable counter values, nonce, etc.) and in combination with at least some data securely stored by financial institution subsystem 350 (e.g., a cryptogram master key that may also be used to generate a shared secret and/or a credential key (e.g., key 155a') on secure element 145) to reconstruct the cryptogram and then to compare that reconstructed cryptogram with the cryptogram of the commercial payment data received at step 512 for validating the crypto data based on such a comparison.

In some embodiments, if the crypto data is validated at a third portion of step 514, financial institution subsystem 350 may process at another portion of step 514 any transaction-enhancer information that may also be provided along with the crypto data by the commercial payment data received by financial institution subsystem 350 at step 512 in order to make a determination as to whether or not to enable the transaction to be funded at step 516. Therefore, not only must the crypto data of particular received commercial payment data be validated at step 514 but any transaction-enhancer information of that particular received commercial payment data must also be processed in order to confirm that any requirements of such transaction-enhancer information are satisfied before enabling the transaction to be funded at step 516 (e.g., as described in more detail with respect to step 625 of process 600). Such transaction-enhancer information may include (i) specific merchant-based transaction-enhancer information (e.g., one or more elements or rules that may be generated by and provided from merchant subsystem 200 to device 100 as a portion of the potential transaction data of step 502 and that may then be provided from device 100 to commercial entity subsystem 400 as a portion of the device transaction data of step 504), (ii) specific device-based transaction-enhancer information (e.g., one or more elements or rules that may be generated by and provided from device 100 to commercial entity subsystem 400 as a portion of the device transaction data of step 504), and/or (iii) specific commercial-based transaction-enhancer information (e.g., one or more elements or rules that may be generated by commercial entity subsystem 400). In some embodiments, commercial entity subsystem 400 may instead include the crypto data in the merchant payment data along with the token data and the transaction key data as sent to device 100 and merchant subsystem 200 at steps 508/510, such that the crypto data may be verified by financial institution subsystem 350 in response to receiving the merchant payment data and without requiring any commercial payment data from commercial entity subsystem 400, but the commercial payment data of commercial entity subsystem 400 as may be accessed by financial institution subsystem 350 using a transaction key may still include any suitable transaction-enhancer information to be associated with the transaction and leveraged by financial institution subsystem 350.

If the transaction is enabled to be funded, then step 516 may include funding the transaction (e.g., by enabling financial institution subsystem 350, acquiring bank 300, and merchant subsystem 200 to communicate any suitable data in any suitable manner for crediting an account associated with merchant subsystem 200 using funds from an account associated with electronic device 100 (e.g., a funding account that may be associated with the DPAN of the token data associated with the crypto data)). As just one example, a particular payment network subsystem 360 associated with a particular payment network may be operative at steps 510-514 to receive and leverage particular merchant payment data and particular commercial payment data for validating crypto data and then passing any suitable validation result data that may be indicative of that validated crypto data (e.g., cryptogram validation results, counter validation results, etc.) to an appropriate issuing bank subsystem 370 that may be associated with the DPAN of the merchant payment data, such that such an issuing bank subsystem 370 may utilize such validation result data to identify an appropriate funding account for use at step 516 to field the transaction being executed between electronic device 100 and merchant subsystem 200. In some embodiments, such a particular payment network subsystem 360 may be operative to share certain transaction-enhancer information with the appropriate issuing bank subsystem 370 for use by the appropriate issuing bank subsystem 370. Alternatively or additionally, such a particular payment network subsystem 360 may be operative to share transaction key data or the transaction key with the appropriate issuing bank subsystem 370 for use by the appropriate issuing bank subsystem 370 to independently access certain transaction-enhancer information directly from commercial entity subsystem 400. If the transaction is not enabled to be funded at step 514 (e.g., due to the crypto data not being validated and/or due to the transaction-enhancer information not being satisfied), then step 516 may include not funding the transaction (e.g., by enabling financial institution subsystem 350, acquiring bank 300, and merchant subsystem 200 to communicate any suitable data in any suitable manner for rejecting the transaction being executed). Next, after such a transaction is either funded or rejected at step 516, process 500 may include merchant subsystem 200 confirming that transaction status to electronic device 100 at step 518. For example, merchant subsystem 200 may communicate any suitable confirmation information to electronic device 100 via communications path 15.

In some embodiments, the payment card data (e.g., token data and/or crypto data) of the device transaction data that may be encrypted by electronic device 100 at step 504 may first be encrypted by a credential key (e.g., credential key 155a' of secure element 145). Such a credential key may not be accessible by commercial entity subsystem 400, such that the encrypted payment card data of not only the decrypted device transaction data of step 506 (e.g., as decrypted using a commercial entity key) but also the re-encrypted merchant payment data of steps 508 and 510 (e.g., as re-encrypted with a merchant key) may remain encrypted by that credential key. Acquiring bank 300 and/or financial institution subsystem 350 may have access to such a credential key (e.g., credential key 155a' of financial institution subsystem 350), such that when the merchant payment data is forwarded to acquiring bank 300 and/or financial institution subsystem 350 by merchant subsystem 200 at step 510, acquiring bank 300 and/or financial institution subsystem 350 may decrypt the payment card data of the merchant payment data using the credential key before being able to identify the funding account associated with that merchant payment data (e.g., the DPAN of the token data). Therefore, process 500 may utilize a commercial entity subsystem 400 to add a layer of security to an online financial transaction between an electronic device and a merchant. Commercial entity subsystem 400 may be privy not only to a commercial entity key available at a secure element of device 100 but also to a merchant key available to merchant subsystem 200. Therefore, commercial entity subsystem 400 may be in a unique position to manage any online transactions between the secure element of device 100 and merchant subsystem 200, while at the same time not being privy to the payment card data being used to identify an account for funding that transaction (e.g., as commercial entity subsystem 400 may not have access to a credential key with which at least a portion of the payment card data (e.g., token data and/or crypto data) may be initially encrypted by the secure element). Moreover, commercial entity subsystem 400 may be in a unique position to process device transaction data received from device 100 at step 504 in order to enable at least two distinct portions of transaction payment data (e.g., at least two distinct portions of the payment card data of the device transaction data) to be communicated to financial institution subsystem 350 via at least two different communication paths for achieving a more secure and/or more efficient validation of the payment card data of the transaction (e.g., commercial entity subsystem 400 may be operative to parse device transaction data received from device 100 at step 504 to perform nonce validation). For example, commercial entity subsystem 400 may be operative to securely and/or efficiently communicate a first portion of payment card data (e.g., token data originating from device 100 and received by commercial entity subsystem 400 as a portion of device transaction data at step 504) to financial institution subsystem 350 via a first communication path (e.g., as a portion of merchant payment data communicated from commercial entity subsystem 400 to financial institution subsystem 350 via electronic device 100 and/or merchant subsystem 200 and/or acquiring bank subsystem 300 (e.g., at steps 508 and 510)) and to securely and/or efficiently communicate a second portion of payment card data (e.g., crypto data originating from device 100 and received by commercial entity subsystem 400 as a portion of device transaction data at step 504) to financial institution subsystem 350 via a second communication path (e.g., as a portion of commercial payment data communicated from commercial entity subsystem 400 to financial institution subsystem 350 not via electronic device 100 and/or merchant subsystem 200 and/or acquiring bank subsystem 300 (e.g., at step 512)).

In some embodiments, a process similar to process 500 may be carried out without commercial entity subsystem 400. Instead, device 100 may be operative to access a transaction identifier, derive a transaction key based on transaction key data, and store commercial payment data against the transaction key (e.g., device 100 may perform the operations of step 506 of process 500), such that device 100 may then generate and communicate merchant payment data to merchant subsystem 200 (e.g., device 100 may perform the operations of steps 508 and 510) and such that device 100 may also generate and communicate commercial payment data using the transaction key to financial institution subsystem 350 (e.g., device 100 may perform the operations of step 512). In such embodiments, electronic device 100 may be operative to push such the commercial payment data to financial institution subsystem 350 rather than financial institution subsystem 350 relying on device 100 being always communicatively coupled to financial institution subsystem 350 for enabling smooth pulling of the commercial payment data.

It is understood that the steps shown in process 500 of FIG. 5 are only illustrative and that existing steps may be modified or omitted, additional steps may be added, and the order of certain steps may be altered.

Description of FIG. 6

FIG. 6 is a flowchart of an illustrative process 600 for communicating electronic device secure element data over multiple paths for conducting an online payment. Process 600 is shown being implemented by electronic device 100, merchant subsystem 200, acquiring bank subsystem 300, commercial entity subsystem 400, and financial institution subsystem 350. However, it is to be understood that process 600 may be implemented using any other suitable components or subsystems. Process 600 may provide a seamless user experience for securely and efficiently conducting online payments with merchant subsystem 200 on device 100. To facilitate the following discussion regarding the operation of system 1 for securely conducting online payments between device 100 and merchant subsystem 200 according to process 600 of FIG. 6, reference is made to various components of system 1 of the schematic diagrams of FIGS. 1-4, and to front views of screens 190-190d that may be representative of a graphical user interface of electronic device 100 during such a payment (e.g., as shown in FIGS. 4-4D). The operation described may be achieved with a wide variety of graphical elements and visual schemes. Therefore, the embodiments of FIGS. 4-4D are not intended to be limited to the precise user interface conventions adopted herein. Rather, embodiments may include a wide variety of user interface styles.

Process 600 may begin at step 602, where access data 652 (e.g., access data 652 of FIG. 1A) may be provisioned on a secure element of electronic device 100 by commercial entity subsystem 400. For example, at least one access SSD (e.g., SSD 154b) may be provisioned on secure element 145 of device 100 as access data 652 from server 410 of commercial entity subsystem 400 in order to more securely enable device 100 to conduct a financial transaction with merchant subsystem 200. As mentioned, access SSD 154b may be at least partially provisioned on secure element 145 of electronic device 100 directly from commercial entity subsystem 400 (e.g., as access data 652 via communication path 65 between server 410 of commercial entity subsystem 400 and communications component 106 of device 100, which may then be passed to secure element 145 from communications component 106 (e.g., via bus 118)). Access data 652 via path 65 may be provisioned on secure element 145 of device 100 as at least a portion or all of an access SSD 154b and may include access applet 153b and/or access key 155b. Step 602 may be at least partially carried out when device 100 is initially configured (e.g., by commercial entity subsystem 400 before device 100 is sold to a user). Alternatively, step 602 may be at least partially carried out in response to a user of device 100 initially setting up secure element 145 of NFC component 120. Additionally or alternatively, access data 652 may include ISD key 156k for ISD 152 of secure element 145 and may be used in addition to or as an alternative to access key 155b for enabling secure transmissions between commercial entity subsystem 400 and electronic device 100. Additionally or alternatively, access data 652 may include CRS 151k of CRS 151 and/or CASD 158k of CASD 158 of secure element 145 of electronic device 100 and may be used in addition to or as an alternative to access key 155b and/or access key 155a and/or ISD key 156k for enabling secure transmissions between commercial entity subsystem 400 and electronic device 100 (e.g., for use as any suitable commercial entity key or shared secret between commercial entity subsystem 400 and electronic device 100).

At step 604, process 600 may include provisioning credential data 654 (e.g., credential data 654 of FIG. 1A) on a secure element of electronic device 100 by financial institution subsystem 350, in some embodiments, via commercial entity subsystem 400. For example, such credential data 654 may be at least partially provisioned on secure element 145 of electronic device 100 directly from financial institution subsystem 350 (e.g., via communication path 75 of FIG. 1A between financial institution subsystem 350 and device 100, which may be passed to secure element 145 via communications component 106). Additionally or alternatively, such credential data 654 may be at least partially provisioned on secure element 145 of electronic device 100 from financial institution subsystem 350 via commercial entity subsystem 400 (e.g., via communication path 55 of FIG. 1A between financial institution subsystem 350 and commercial entity subsystem 400, which may be passed to device 100 as credential data 654 via communication path 65 of FIG. 1A between server 410 of commercial entity subsystem 400 and communications component 106 of device 100, which may then be passed to secure element 145 from communications component 106 (e.g., via bus 118)). Credential data 654 via path 75 and/or via path 65 may be provisioned on secure element 145 of device 100 as at least a portion or all of credential SSD 154a and may include credential applet 153a with credential information 161a and/or credential key 155a' and/or key 155ak. Step 604 may be at least partially carried out when a user of device 100 selects a particular credential to be provisioned on device 100. In some embodiments, credential data 654 may also include access key 155a, which may be initially provided from commercial entity subsystem 400 to financial institution subsystem 350 and/or may be added by commercial entity subsystem 400.

The credential data provisioned on device 100 may include all data necessary to make a payment with that credential, such as, for example, a primary account number ("PAN"), a card security code (e.g., a card verification code ("CVV")), PAN expiration date, name associated with the credential, and the like, as well as other data that may be operative for electronic device 100 to generate appropriate crypto data (e.g., any suitable shared secret and any suitable cryptographic algorithm or cipher whose functional output may be at least partially determined by the shared secret). A "virtual" credential or virtual PAN or device PAN ("D-PAN") may be provisioned on device 100 rather than the user's "actual" credential or actual PAN or funding PAN ("F-PAN"). For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 312 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization or validation request or otherwise attempt to validate any received data indicative of that virtual credential (e.g., at step 625 in response to receiving data 673 at step 623 and data 668 at step 624) and may conduct an analysis of that validation attempt request in light of the actual credential associated with the virtual credential as determined by table 312. Alternatively, such a table may be accessible and/or similarly leveraged by an appropriate issuing bank subsystem 370 or any other suitable subsystem accessible by financial institution subsystem 350. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 312 for linking the virtual credential to the actual credential during certain transactions.

At step 605, process 600 may include associating a particular merchant identifier with merchant subsystem 200. For example, acquiring bank subsystem 300 may generate or otherwise assign a merchant identifier 167 for merchant subsystem 200 (e.g., an entity associated with application 113) and may provide such a merchant identifier 167 to merchant subsystem 200 (e.g., via path 25) at step 605. Alternatively, merchant subsystem 200 may generate or otherwise assign such a merchant identifier 167 to itself and/or to application 113 and provide such a merchant identifier 167 to acquiring bank subsystem 300 (e.g., via path 25) or to any other suitable entity. Either merchant subsystem 200 or acquiring bank subsystem 300 may be responsible for management of merchant identifier 167, which may include the generation, exchange, storage, use, and replacement of such an identifier. No matter how or where such a merchant identifier 167 may be generated and/or managed, both merchant subsystem 200 and acquiring bank subsystem 300 may store a version of merchant identifier 167. In some embodiments, such a merchant identifier 167 may be specifically associated with merchant online resource (e.g., application 113), while, in other embodiments, merchant identifier 167 may be specifically associated with a merchant of merchant subsystem 200 such that merchant identifier 167 may be associated with multiple third party applications operated by the same merchant of merchant subsystem 200. A table 330 or any other suitable data structure or source of information accessible to acquiring bank subsystem 300 may be provided for associating a particular merchant identifier 167 with a particular merchant application 113 or merchant entity. Table 330 may enable acquiring bank subsystem 300 to determine and utilize an appropriate merchant identifier 167 for providing a merchant-specific element to a commerce credential data communication. For example, acquiring bank subsystem 300 may at least partially be provided as a payment service provider (e.g., CyberSource of Foster City, Calif.) that may generate such a merchant-specific element for use in conducting a financial transaction per process 600. Merchant identifier 167 may include any suitable data that may be operative to identify a specific merchant. For example, merchant identifier 167 may be a service establishment number. In some embodiments, merchant identifier 167 may be communicated per data field 42 of ISO 8583.

At step 606, process 600 may include associating a merchant's online resource, such as a merchant application 113 or a merchant website, with a merchant key 157. For example, commercial entity subsystem 400 may populate a table 430 to associate a merchant key 157 with a merchant's resource (e.g., application 113 or website) for enabling a secure commerce credential data communication (e.g., an online-based communication as merchant payment data 671 and/or 671a of FIG. 1A) between commercial entity subsystem 400 and merchant subsystem 200 (e.g., via device 100 or directly) using that merchant resource. Both merchant subsystem 200 and commercial entity subsystem 400 may store a version of such a merchant key 157 (e.g., in a respective secure element of merchant subsystem 200 and commercial entity subsystem 400, as shown in FIG. 1A). In some embodiments, in order to participate in an online-resource payment program, a merchant may be required to register as a member of a program run by the commercial entity of commercial entity subsystem 400 and/or obtain a merchant certificate. Merchants may not be able to receive payment data without a certificate. Each certificate may contain a unique commercial entity merchant identifier that may bind the merchant to the public key for that merchant (e.g., a public merchant key 157). A merchant may obtain multiple certificates, and thus may hold more than one identity. Such a unique commercial entity merchant identifier may be provided by merchant subsystem 200 to device 100 (e.g., at step 610 as a portion of data 660 and/or as an inherent element of the merchant online resource running on device 100 (e.g., merchant application 113), and such a commercial entity merchant identifier may be provided from device 100 to commercial entity subsystem 400 during an attempted transaction (e.g., as at least a portion of data 664 at step 614 described below). In some embodiments, commercial entity subsystem 400 may generate or otherwise assign a merchant key 157 for a merchant online resource (e.g., application 113) and provide such a merchant key 157 to merchant subsystem 200 (e.g., via path 85). Alternatively, merchant subsystem 200 may generate or otherwise assign a merchant key 157 for a merchant online resource (e.g., application 113) and provide such a merchant key 157 to commercial entity subsystem 400 (e.g., via path 85). Either merchant subsystem 200 or commercial entity subsystem 400 may be responsible for management of merchant key 157, which may include the generation, exchange, storage, use, and replacement of such a key. No matter how or where such a merchant key 157 may be generated and/or managed, both merchant subsystem 200 and commercial entity subsystem 400 may store a version of merchant key 157 (e.g., in a respective secure element of merchant subsystem 200 and commercial entity subsystem 400). This may enable a shared secret between commercial entity subsystem 400 and merchant subsystem 200 for securely communicating data therebetween.

At step 608, process 600 may include a merchant's online resource 658 (e.g., a merchant's third party application 113 of FIG. 1A or website) being accessed by device 100. As shown in FIG. 1A, a merchant's third party application 113 may be loaded onto device 100 from commercial entity subsystem 400 (e.g., from application store 420). For example, as shown in FIG. 4, a user may select "Merchant App" icon 183 of a specific screen 190 of GUI 180 using touch screen input component 110f of I/O component 114a, and this selection may be recognized by electronic device 100 as an initiation event for providing the user with the ability to interact with a merchant's third party application 113. Alternatively or additionally, such an online resource 658 may be accessed by electronic device 100 directly from merchant subsystem 200. In response to such a selection of a merchant application icon 183, GUI 180 may provide an interactive screen where electronic device 100 may enable the user to interact with application 113 to peruse commercially available items from the merchant for purchase. Alternatively, step 608 may include device 100 accessing a merchant's online resource 658 as a merchant's webpage from merchant subsystem 200 (e.g., via merchant server 210) using an internet application of device 100, which may also be selectable by an "Internet" icon 182 of specific screen 190 of GUI 180 of FIG. 4 for providing the user with the ability to interact with a merchant's webpage rather than with a merchant's third part application.

Next, at step 610, device 100 may receive potential transaction data 660 from the accessed online resource of the merchant (e.g., as described with respect to step 502 of process 500). For example, as shown in FIG. 1A, potential transaction data 660 may be provided to device 100 from merchant subsystem 200 (e.g., from merchant server 210) when device 100 is interacting with the merchant's third party application 113 or the merchant's website or any other suitable online resource (e.g., resource 658) of the merchant. Alternatively or additionally, at least a portion of potential transaction data 660 may be locally accessible by device 100 via application 113 local to device 100 (e.g., when application 113 is stored in memory component 104 or being run by processor 102 of device 100), rather than the data being actively sent to device 100 from merchant server 210 at step 610. For example, when application 113 is initially stored on device 100 (e.g., at step 608 as merchant's online resource 658), at least some of potential transaction data 660 may be generated by that initially stored application 113 absent any additional information provided to device 100 by merchant subsystem 200. Potential transaction data 660 may include any suitable data indicative of characteristics of a potential financial transaction to occur between a user of device 100 and a merchant of merchant subsystem 200, including, but not limited to, identification of device 100, identification of the merchant (e.g., acquiring bank merchant identifier 167 and/or a commercial entity merchant identifier), identification of the particular merchant resource being used (e.g., the particular merchant application 113 or website being accessed by device 100), identification of the particular product or service to be purchased or rented or otherwise paid for, identification of the price to be paid, identification of the currency to be used during the transaction, identification of a default or initial shipping address to be used, a list of financial institutions whose credentials may be accepted by merchant subsystem 200, specific merchant-based transaction enhancer information, a unique merchant-based transaction identifier, and/or any other suitable information. Potential transaction data 660 may define an online resource's request for device 100 to produce a payment token for the purchase of products and/or services and may encapsulate any suitable information about the potential transaction including, for example, information about the merchant's payment processing capabilities, an amount to pay, and the currency code. Potential transaction data 660 may also include a list of one or more payment networks (e.g., payment network(s) 360) that may be supported by the merchant such that device 100 may be configured to determine whether any of such listed one or more payment networks has an authorized payment credential on device 100. If such a match exists, for example, as shown in FIG. 4A, GUI 180 may provide screen 190a, where a merchant's online resource may use transaction data 660 to show to a user the name of the merchant (e.g., "Merchant A") with information 487a, the name of the product (e.g., "Product B") with information 487b, the price (e.g., "Price C") with information 487c, and/or initial shipping data (e.g., "Address D") with information 487d. Potential transaction data 660 that may be provided to device 100 by merchant server 210 may be indicative of such information 487a, 487b, 487c, and/or 487d. As also shown in FIG. 4A and described below in more detail, screen 190a may also include a purchase prompt 491. Potential transaction data 660 may be provided from merchant server 210 to device 100 via communication path 15 of FIG. 1A and may be received by communications component 106 of device 100. Communications component 106 may pass this potential transaction data 660 on to processor 102 (e.g., for displaying on screen 190a as part of a user interface for merchant application 113 on device 100 (e.g., for information 487a-487d)) and/or to NFC component 120. For example, NFC component 120 may utilize such potential transaction data 660 for securely enabling a financial transaction between device 100 and merchant subsystem 200. In some embodiments, potential transaction data 660 may be referred to as payment request data and/or a uniform resource locator ("URL") or any other suitable reference character string and/or query string.

Next, at step 611, process 600 may include receiving intent and authentication by a user of device 100 to utilize a specific credential for carrying out a financial transaction for a particular merchant, product, price, and shipping destination based on potential transaction data 660. For example, as shown in FIG. 4A, screen 190a of GUI 180 of device 100 may also include a purchase prompt 491 that may ask the user whether he or she wishes to make a purchase from the merchant according to the details of potential transaction data 660. Moreover, as shown in FIG. 4B, output display component 112a may be configured to provide screen 190b in response to receiving selection of purchase prompt 491 of screen 190a of FIG. 4A. Screen 190b of FIG. 4B may prompt a user to interact with device 100 in one or more ways to choose a specific credential available to device 100 for making the purchase. As shown, screen 190b may include a credential selection prompt 493 that may enable a user to select one of potentially multiple credentials that may be provisioned on device 100 (e.g., the credential of credential SSD 154a). Prompt 493 may only include credentials that are associated with payment networks supported by the merchant (e.g., as may be determined by potential transaction data 660, as mentioned above). As shown in FIG. 4C, output display component 112a may be configured to provide screen 190c in response to receiving user selection of a credential from credential selection prompt 493 of screen 190b of FIG. 4B. Screen 190c of FIG. 4C may prompt a user to interact with device 100 in one or more ways to authenticate the user and its intent to utilize the selected credential. This may include prompting the user (e.g., with an authentication prompt 495) to enter user authentication via personal identification number ("PIN") entry or via user interaction with a biometric sensor in order to access the secure element of device 100 and, thus, the credential to be used for the purchase. Access SSD 154b may leverage applet 153b to determine whether such authentication has occurred before allowing other SSDs 154 (e.g., credential SSD 154a) to be used for enabling its credential information in a commerce credential data communication. As just one example of step 611, applet 153b of access SSD 154b may be configured to determine intent and local authentication of a user of device 100 (e.g., via one or more input components 110, such as a biometric input component 110i of FIG. 4, as may be used by a user interacting with application 113 via GUI 180) and, in response to such a determination, may be configured to enable another particular SSD for conducting a payment transaction (e.g., with a credential of credential SSD 154a). In some embodiments, after such a determination, but before such enablement, output display component 112a may be configured to provide screen 190d of FIG. 4D that may prompt a user (e.g., with a payment prompt 497) to interact with device 100 in one or more ways to finally initiate payment to merchant subsystem 200 according to potential transaction data 660 using the selected and authenticated credential.

Next, at steps 612-614, process 600 may include device 100 generating, encrypting, and transmitting device transaction data 664 for use by commercial entity subsystem 400. Once the credential of credential SSD 154a on secure element 145 of device 100 has been selected, authenticated, and/or enabled for use in a financial transaction (e.g., at step 611), secure element 145 of device 100 (e.g., processor module 142 of NFC component 120) may generate and encrypt certain credential data of that selected credential for use by commercial entity subsystem 400. For example, secure element ("SE") credential data 661 of credential SSD 154a (e.g., payment card data of SSD 154a, such as token data and crypto data (e.g., as described above with respect to step 504 of process 500)) may be generated and/or at least partially encrypted with credential key 155a' at step 612 as encrypted SE credential data 662 to include at least token data 662t and crypto data 662c, such that such encrypted SE credential data 662 may only be decrypted by an entity with access to that credential key 155a' (e.g., financial institution subsystem 350) for accessing SE credential data 661. That SE credential data 662 may include all data necessary to make a payment with that credential, such as, for example, a primary account number (e.g., an actual F-PAN or a virtual D-PAN), a card security code (e.g., a card verification code ("CVV")), expiration date, name associated with the credential, associated crypto data (e.g., a cryptogram generated using a shared secret between secure element 145 and financial institution subsystem 350 and any other suitable information), and/or the like. In some embodiments, once some or all of that SE credential data 661 of credential SSD 154a has been encrypted with credential key 155a' at step 612 as encrypted SE credential data 662, that encrypted SE credential data 662, either alone or along with at least a first portion if not all of potential transaction data 660 (e.g., a first portion of potential transaction data 660 that may include identification of the merchant (e.g., acquiring bank merchant identifier 167, a commercial entity merchant identifier, and/or the like), identification of the price amount, identification of the currency, specific merchant-based transaction-enhancer information, a unique merchant-based transaction identifier, identification of the product/service, and/or the like) and/or any other suitable information (e.g., any information identifying device 100 itself, specific device-based transaction-enhancer information, a unique device-based transaction identifier, and/or the like), may be encrypted by access information (e.g., by access key 155a of SSD 154a, access key 155b of access SSD 154b, ISD key 156k, and/or CRS 151k and/or signed by CASD 158k) at step 613 as encrypted commercial entity ("CE") credential data 663. For example, secure element 145 of device 100 (e.g., processor module 142 of NFC component 120) may use access information to encrypt not only an identification of the merchant from data 660 (e.g., identification of the merchant or its resource being used for the purchase, such as application 113), but also the identification of the amount of the purchase and/or currency code from data 660, as well as the encrypted SE credential data 661 of SSD 154a (e.g., encrypted SE credential data 662) into encrypted commercial entity credential data 663. In some embodiments, secure element ("SE") credential data 661 of credential SSD 154a (e.g., payment card data of SSD 154a, such as token data and crypto data (e.g., as described above with respect to step 504 of process 500)) may be generated but not encrypted with a credential key (e.g., at step 612 as data 662) before being encrypted with a commercial entity key or access key (e.g., at step 613 as data 663), and, instead, such SE credential data 661 may be encrypted with a commercial entity key or access key (e.g., at step 613 as data 663), whereby in such embodiments, any future reference to data 662 may also be in reference to data 661 that is not encrypted with any credential key. In some embodiments, such a commercial entity key or access key may be a commercial entity public key associated with a scheme of commercial entity subsystem 400 and of which commercial entity subsystem 400 may have access to an associated commercial entity private key. Commercial entity subsystem 400 may provide such a commercial entity public key to financial institution subsystem 350 and financial institution subsystem 350 may then share that commercial entity public key with device 100 (e.g., when provisioning credential data on device 100 (e.g., at step 654 of process 600)).

Next, encrypted commercial entity credential data 663 along with any additional information, such as at least some of potential transaction data 660 (e.g., identification of the merchant (e.g., acquiring bank merchant identifier 167, a commercial entity merchant identifier, and/or the like), identification of the price amount, identification of the currency, specific merchant-based transaction-enhancer information, a unique merchant-based transaction identifier, identification of the product/service, and/or the like) and/or any other suitable information (e.g., any information identifying device 100 itself, specific device-based transaction-enhancer information, a unique device-based transaction identifier, and/or the like) may together be transmitted as device transaction data 664 from device 100 to commercial entity subsystem 400 at step 614 (e.g., as described with respect to step 504 of process 500). Therefore, at least portions of device transaction data 664 (e.g., encrypted commercial entity credential data 663) may only be decrypted by an entity with access to that access information used for the encryption (e.g., access key 155a, access key 155b, ISD key 156k, CRS 151k, and/or CASD 158k) that generated encrypted commercial entity credential data 663 of device transaction data 664 (e.g., commercial entity subsystem 400). Such device transaction data 664 may be generated at steps 612-614 and then transmitted to commercial entity subsystem 400 at step 614 (e.g., from secure element 145 of NEC component 120, via communications component 106 and communication path 65). Steps 612, 613, and 614 may ensure that any credential data generated and transmitted from secure element 145 of device 100 as part of device transaction data 664 has first been encrypted in such a way that it cannot be decrypted by another portion of device 100. That is, SE credential data 661 of device transaction data 664 may be encrypted as encrypted SE credential data 662 with a credential key 155a' that may not be exposed to or accessible by any portion of device 100 outside of its secure element. Moreover, such encrypted SE credential data 662 of device transaction data 664 may be encrypted as encrypted commercial entity credential data 663 with an access key (e.g., access key 155a, 155b, 156k, 151k, and/or 158k (e.g., referred to herein as "access information")) that may not be exposed to or accessible by any portion of device 100 outside of its secure element.

Next, at step 615, process 600 may include commercial entity subsystem 400 receiving and decrypting at least a portion of device transaction data 664. For example, commercial entity subsystem 400 may receive device transaction data 664 and may then decrypt encrypted commercial entity credential data 663 of device transaction data 664 using access information (e.g., 155a, 155b, 156k, 151k, and/or 158k) as available at commercial entity subsystem 400. This may enable commercial entity subsystem 400 to determine an unencrypted identification of the merchant (e.g., from decrypted commercial entity credential data 663), while also maintaining SE credential data 661 in an encrypted state (e.g., as encrypted SE credential data 662), because commercial entity subsystem 400 may not have access to credential key 155a' with which such SE credential data 661 may have been encrypted by secure element 145 of device 100 at step 612 as encrypted SE credential data 662. Additionally or alternatively, the merchant may be identified by the additional data that may have been included in device transaction data 664 along with encrypted commercial entity credential data 663. Device transaction data 664 may include information identifying device 100 or at least its secure element, such that, when data 664 is received by commercial entity subsystem 400, commercial entity subsystem 400 may know which access information (e.g., which of access information 155a, 155b, 156k, 151k, and/or 158k) to use at step 616. For example, commercial entity subsystem 400 may have access to multiple access keys 155a/155b and/or multiple ISD keys 156k, each one of which may be particular to a specific device 100 or to a specific secure element.

At step 615, commercial entity subsystem 400 may be operative to isolate a first data portion 662t (e.g., token data) of SE credential data 662 of device transaction data 664 from a second data portion 662c (e.g., crypto data) of SE credential data 662 of device transaction data 664. This may enable commercial entity subsystem 400 to later communicate the isolated token data portion 662t (e.g., a DPAN, DPAN expiry date, etc. of SSD 154a) as part of a first portion of transaction payment data to financial institution subsystem 350 via a first communication path (e.g., as a portion of merchant payment data 670/671/672/673 communicated from commercial entity subsystem 400 to financial institution subsystem 350 via electronic device 100 and/or via merchant subsystem 200 and/or via acquiring bank subsystem 300 (e.g., at steps 620-623)), and to later communicate the isolated crypto data portion 662c (e.g., a cryptogram generated at device 100 using a shared secret of SSD 154a and financial institution subsystem 350) as part of a second portion of the transaction payment data to financial institution subsystem 350 via a second communication path (e.g., as a portion of commercial payment data 668 communicated from commercial entity subsystem 400 to financial institution subsystem 350 not via electronic device 100 and/or not via merchant subsystem 200 and/or not via acquiring bank subsystem 300 (e.g., at step 624)). Financial institution subsystem 350 may be operative at step 625 to leverage the first portion of the transaction payment data (e.g., merchant payment data 673 received at step 623) in order to derive a transaction key for appropriately accessing the second portion of the transaction payment data (e.g., commercial payment data 668 received at step 624), and then financial institution subsystem 350 may be operative to leverage the first portion 662t of the transaction payment data to validate the crypto data of the appropriately accessed second portion 662c of the transaction payment data (e.g., using a shared secret of SSD 154a and financial institution subsystem 350). Alternatively, in some embodiments, first data portion 662t of SE credential data 662 may include crypto data of SE credential data 662 (e.g., a cryptogram generated at device 100 using a shared secret of SSD 154a and financial institution subsystem 350), while second data portion 662c of SE credential data 662 may include token data of SE credential data 662 (e.g., a DPAN, DPAN expiry date, etc. of SSD 154a), such that merchant payment data 670, 671, 671a, 672, and/or 673 may include crypto data of SE credential data 662 and/or such that commercial payment data 668 may include token data of SE credential data 662.

At steps 616-618, process 600 may include commercial entity subsystem 400 processing device transaction data 664 received from device 100 at step 614 in order to enable at least two distinct portions of transaction payment data (e.g., at least two distinct portions of SE credential data 662 (e.g., token data and crypto data)) to be communicated to financial institution subsystem 350 via different communication paths for achieving a more secure and/or more efficient validation of the payment card data of the transaction. For example, commercial entity subsystem 400 may access a unique transaction identifier 666 for the transaction being conducted at step 616 (e.g., as described with respect to sub-step 506a of process 500), derive a transaction key 667k based on any suitable transaction key data 667d at step 617 (e.g., as described with respect to sub-step 506b of process 500), where such transaction key data 667d may include the accessed unique transaction identifier 666, and then store or otherwise use any suitable commercial payment data 668 against the derived transaction key 667k at step 618 (e.g., as described with respect to sub-step 506c of process 500), where such commercial payment data 668 may include the crypto data of the SE credential data 661 of the received device transaction data 664. Such a transaction key 667k may be any suitable data element that may enable commercial entity subsystem 400 to find an associated data element (e.g., commercial payment data 668) using a database index, hash table, memory location, or the like (e.g., table 430 or any other suitable data structure accessible to commercial entity subsystem 400 may be provided for enabling commercial entity subsystem 400 to store or otherwise associate a particular transaction key 667k with or against particular commercial payment data 668).

As described with respect to sub-step 506a of process 500, unique transaction identifier 666 accessed by commercial entity subsystem 400 at step 616 may include a unique merchant-based transaction identifier that may have been generated by merchant subsystem 200 as a portion of potential transaction data 660 and then included as a portion of device transaction data 664 received by commercial entity subsystem 400 at step 614. Alternatively, unique transaction identifier 666 accessed by commercial entity subsystem 400 at step 616 may include a unique device-based transaction identifier that may have been generated by electronic device 100 and then included as a portion of device transaction data 664 received by commercial entity subsystem 400 at step 614. Alternatively, unique transaction identifier 666 accessed by commercial entity subsystem 400 at step 616 may include a unique commercial-based transaction identifier that may be generated by commercial entity subsystem 400 at step 616 (e.g., any suitable data element, such as a 3 or 4 character alphanumeric string, that may be randomly or uniquely generated by commercial entity subsystem 400 for association with the transaction being conducted). Alternatively, the accessing of unique transaction identifier 666 by commercial entity subsystem 400 at step 616 may include commercial entity subsystem 400 generating a unique commercial-based transaction identifier at least partially based on one or both of a unique merchant-based transaction identifier and a unique device-based transaction identifier received from device transaction data 664.

As described with respect to sub-step 506*b* of process 500, transaction key 667*k* may be derived by commercial entity subsystem 400 at step 617 of process 600 using any suitable transaction key data 667*d* that may also be made accessible to financial institution subsystem 350 for independently deriving or determining the transaction key. For example, such transaction key data 667*d* may be at least a portion of merchant payment data 673 that may be provided to financial institution subsystem 350 (e.g., at step 627). Such transaction key data 667*d* may include, but is not limited to, one or more of (i) a unique transaction identifier (e.g., as accessed at step 616), (ii) specific merchant information (e.g., identification of a merchant identifier, such as merchant identifier 167, that may be provided from merchant subsystem 200 to device 100 as a portion of the potential transaction data 660 of step 610 and that may then be provided from device 100 to commercial entity subsystem 400 as a portion of device transaction data 664 of step 614), (iii) specific transaction information (e.g., identification of a specific currency to be used to pay for the transaction and/or identification of a specific amount of a currency to be paid for the transaction that may be provided from merchant subsystem 200 to device 100 as a portion of potential transaction data 660 of step 610 and that may then be provided from device 100 to commercial entity subsystem 400 as a portion of device transaction data 664 of step 614), and (iv) a specific portion of payment card data (e.g., token data 662*t* of credential data 662 that may be provided from device 100 to commercial entity subsystem 400 as a portion of device transaction data 664 of step 614 (e.g., a DPAN, DPAN expiry date, etc. of SSD 154*a*)). Therefore, in some embodiments, transaction key 667*k* may be derived by commercial entity subsystem 400 at step 617 based on transaction key data 667*d* that may include a unique transaction identifier accessed at step 616, a specific merchant identifier provided by merchant subsystem 200 (e.g., via device 100), a specific currency to be used to pay for the transaction, and token data 662*t* provided by secure element 145. Transaction key 667*k* may be derived by commercial entity subsystem 400 at step 617 using any suitable transaction key data 667*d* in combination with any suitable derivation technique (e.g., concatenation of the fields of transaction key data 667*d*, leveraging any suitable security keys or derivation techniques, etc., and one or more hashes may be run to confirm that a derived transaction key sequence is valid). In some embodiments, the derivation technique may be shared between commercial entity subsystem 400 and financial institution subsystem 350 such that each may be enabled to independently derive the same transaction key 667*k* based on the same transaction key data 667*d*. Alternatively, device 100 may be configured to access transaction identifier 666 and derive transaction key 667*k* based on transaction key data 667*d* that may include transaction identifier 666. In such embodiments, the derivation technique may be shared between device 100 and financial institution subsystem 350 such that each may be enabled to independently derive the same transaction key 667*k* based on the same transaction key data 667*d*.

As described with respect to sub-step 506*c* of process 500, commercial entity subsystem 400 may store suitable commercial payment data 668 against transaction key 667*k* at step 618 of process 600. For example, commercial payment data 668 associated with the current transaction may be stored by commercial entity subsystem 400 in association with the transaction key 667*k* (e.g., in table 430 or any other suitable data structure accessible to commercial entity subsystem 400, such that the particular stored commercial payment data 668 may be later accessed using transaction key 667*k* (e.g., for use by financial institution subsystem 350)). Alternatively, as described with respect to step 512 of process 500, such commercial payment data 668 may be communicated (e.g., pushed) in combination with transaction key 667*k* from commercial entity subsystem 400 to financial institution subsystem 350 (e.g., at step 624, such as immediately after deriving transaction key 667*k*) such that transaction key 667*k* and/or commercial payment data 668 may thereafter be deleted or otherwise not maintained by commercial entity subsystem 400. Such commercial payment data 668 may include, but is not limited to, one or more of (i) a specific portion of payment card data (e.g., crypto data 662*c* of credential data 662) and (ii) any transaction-enhancer information 662*e*, such as (iia) specific merchant-based transaction-enhancer information (e.g., one or more elements or rules that may have been generated by and provided from merchant subsystem 200 to device 100 as a portion of potential transaction data 660 and that may have then been provided from device 100 to commercial entity subsystem 400 as a portion of device transaction data 664), (iib) specific device-based transaction-enhancer information (e.g., one or more elements or rules that may have been generated by and provided from device 100 to commercial entity subsystem 400 as a portion of device transaction data 664), and/or (iic) specific commercial-based transaction-enhancer information (e.g., one or more elements or rules that may be generated by commercial entity subsystem 400 (e.g., at step 618), such as any suitable verification information that may be generated and/or authenticated by commercial entity subsystem 400 for verifying the identity of the user of device 100 and/or of device 100 itself). Therefore, in some embodiments, commercial payment data 668 leveraged by commercial entity subsystem 400 at step 618 and/or at step 624 in combination with transaction key 667*k* may include crypto data 662*c* provided by secure element 145 with or without any suitable transaction-enhancer information 662*e* (e.g., one or more transaction-specific elements or rules that may originate from merchant subsystem 200 and/or electronic device 100 and/or commercial entity 400).

Next, at step 619, process 600 may include commercial entity subsystem 400 identifying a merchant key 157 associated with the merchant that may have been identified by device transaction data 664 and then re-encrypting at least a portion of device transaction data 664 using that merchant key 157. That is, after decrypting at least a portion of device transaction data 664 using suitable access information at step 615 (e.g., after decrypting encrypted CE credential data 663 to realize encrypted SE credential data 662 and any other information that may have been encrypted in encrypted CE credential data 663), commercial entity subsystem 400 may then, at step 619, re-encrypt at least a portion of decrypted device transaction data 664 (e.g., token data 662*t* of encrypted SE credential data 662) with an appropriate merchant key 157 that may be associated with merchant information identified in device transaction data 664. For example, such a merchant key 157 may be determined by comparing commercial entity merchant information identified in device transaction data 664 with data in table 430 of FIG. 1A. With this determined appropriate merchant key 157, commercial entity subsystem 400 may re-encrypt with merchant key 157 at least a portion of device transaction data 664 (e.g., token data 662t of SE credential data 662) as encrypted merchant credential data 669. Such encrypted merchant credential data 669 may be generated at step 619 and then transmitted to electronic device 100 along with any other suitable data as merchant payment data 670 at step 620 (e.g., from server 410 of commercial entity subsystem 400 to communications component 106 of device 100 via path 65 of FIG. 1A). In some embodiments, step 619 may include commercial entity subsystem 400 ensuring that a merchant subsystem associated with the identified merchant information (e.g., merchant information identified in device transaction data 664 and/or merchant information associated with merchant key 157) is a merchant that is currently trusted by commercial entity subsystem 400 before enabling the encryption of step 619. For example, at step 619, commercial entity subsystem 400 may be operative to ensure that merchant subsystem 200 has been properly registered with commercial entity subsystem 400 (e.g., at step 606) and is still a trusted partner before commercial entity subsystem 400 may proceed with the encryption of step 619 and/or the communication of step 620 and/or step 621a and/or step 624. Similar verification of merchant subsystem 200 may be performed by commercial entity subsystem 400 at step 506 of process 500. Therefore, communication of device transaction data between device 100 and commercial entity subsystem 400 prior to certain communication of payment data to merchant subsystem 200 may enable commercial entity subsystem 400 to perform any suitable fraud check and/or validation and/or confirmation of merchant subsystem 200 (e.g., to protect a transaction being made by device 100). Steps 619 and 620 may be operative to ensure that credential data transmitted from the commercial entity subsystem 400 as part of merchant payment data 670 of FIG. 1A (e.g., token data 662t of encrypted merchant credential data 669) may be encrypted in such a way that it cannot be decrypted by a portion of device 100 (e.g., perhaps, including, secure element 145). That is, credential data of merchant payment data 670 (e.g., token data 662t of encrypted merchant credential data 669) may be encrypted with a merchant key 157 that may not be exposed to or otherwise accessible by any portion of device 100, including, in some embodiments, secure element 145. Moreover, credential data of merchant payment data 670 (e.g., token data 662t of encrypted merchant credential data 669) may be encrypted with a credential key 155a' (e.g., at step 612) that may not be exposed to or otherwise accessible by any portion of device 100 outside of secure element 145. Merchant payment data 670 may then be forwarded on to merchant subsystem 200 (e.g., merchant server 210) by device 100 as merchant payment data 671 (e.g., an online-based communication via communications component 106 and communication path 15 of FIG. 1A) at step 621. Such merchant payment data 671 may at least include some of merchant payment data 670 (e.g., token data 662t of encrypted merchant credential data 669), if not all of merchant payment data 670. Alternatively, rather than sharing merchant payment data 670 with merchant subsystem 200 via device 100 as merchant payment data 671 at steps 620 and 621, commercial entity subsystem 400 may directly share merchant payment data 670 with merchant subsystem 200 as merchant payment data 671a at step 621a (e.g., via path 85 of FIG. 1A).

Once such merchant payment data is received by merchant subsystem 200 (e.g., as merchant payment data 671 via device 100 at step 621 or as merchant payment data 671a from commercial entity subsystem 400 directly at step 621a), merchant subsystem 200 may be operative to send confirmation data to device 100 (e.g., via communication path 15 of FIG. 1A). Such confirmation data (not shown in FIG. 6) may be received by device 100 to indicate to a user of device 100 that the user's payment instructions have been received by merchant subsystem 200. After a user of device 100 may provide intent and authentication to utilize a specific credential for carrying out a financial transaction based on potential transaction data 660 at step 611, the remaining steps of process 600 may occur transparent to the user. That is, once the user provides authentication and intent at step 611, steps 612-621 or 621a as well as steps 622-630 may occur without any further user interaction and may seem instantaneous to a user, whereby process 600 may appear to a user as if, after step 611, credential data is automatically and instantaneously sent to merchant subsystem 200 and confirmed (e.g., after step 621 or step 621a).

Moreover, once such merchant payment data is received by merchant subsystem 200 (e.g., as merchant payment data 671 via device 100 at step 621 or as merchant payment data 671a from commercial entity subsystem 400 directly at step 621a), process 600 may also include step 622 at which merchant subsystem 200 may be configured to generate and transmit merchant payment data 672 to acquiring bank subsystem 300 (e.g., via communication path 25 between merchant subsystem 200 and acquiring bank subsystem 300 of FIG. 1A), where data 672 may include payment information (e.g., token data 662t) and any other suitable data associated with the transaction (e.g., the merchant's purchase price and currency for the product or service, unique transaction identifier 666, and the like, as may be included in merchant payment data 671 received via device 100 at step 621 or as merchant payment data 671a received from commercial entity subsystem 400 directly at step 621a)). For example, at step 622, merchant subsystem 200 may leverage its known merchant key 157 to at least partially decrypt the received merchant payment data (e.g., as received from data 671 or from data 671a), such that merchant payment data 672 may include a portion of credential SSD 154a encrypted with its credential key 155a' (e.g., token data 662t of encrypted SE credential data 662) but not with a key that is not available to financial institution subsystem 350. Then, at step 623, acquiring bank subsystem 300 may transmit merchant payment data 673 (e.g., as an authorization request) to financial institution subsystem 350 (e.g., via communication path 35 between acquiring bank subsystem 300 and financial institution subsystem 350 of FIG. 1A), where merchant payment data 673 may include a portion of credential SSD 154a (e.g., token data 662t of encrypted SE credential data 662) along with any other suitable data associated with the transaction (e.g., the merchant's purchase price and currency for the product or service, unique transaction identifier 666, merchant identifier 167, and the like).

As described with respect to step 510 of process 500, merchant payment data 673 to be received by financial institution subsystem 350 at step 623 of process 600 may include any suitable data that may be used by financial institution subsystem 350 to derive transaction key 667k for enabling financial institution subsystem 350 to access commercial payment data 668 (e.g., at step 624). Such merchant payment data 673 may also include any suitable data that may be used by financial institution subsystem 350 to validate the funding of a transaction in combination with such commercial payment data 668 and any data otherwise accessible to financial institution subsystem 350 (e.g., one or more shared secrets of financial institution subsystem 350). In some embodiments, merchant payment data 673 received by financial institution subsystem 350 at step 623 may include, but is not limited to, one or more of (i) a unique transaction identifier (e.g., unique transaction identifier 666 as accessed at step 616), (ii) specific merchant information (e.g., identification of a merchant identifier, such as merchant identifier 167), (iii) specific transaction information (e.g., identification of a specific currency to be used to pay for the transaction and/or identification of a specific amount of a currency to be paid for the transaction), and (iv) a specific portion of payment card data (e.g., token data 662*t* (e.g., a DPAN, DPAN expiry date, etc. of SSD 154*a*)). Therefore, in some embodiments, merchant payment data 673 received by financial institution subsystem 350 at step 623 may include at least the same data that was used by commercial entity subsystem 400 at step 617 as transaction key data 667*d*, such as unique transaction identifier 666, a specific merchant identifier, a specific currency to be used to pay for the transaction, and token data 662*t* provided by secure element 145 (e.g., a DPAN and a DPAN expiry date). Upon receiving such merchant payment data 673 at step 623, financial institution subsystem 350 may be operative to independently derive the same transaction key 667*k* as derived by commercial entity subsystem 400 (e.g., at step 617) by using that merchant payment data 673 in combination with any suitable derivation technique.

In some particular embodiments, merchant payment data 671 that may be communicated from device 100 to merchant subsystem 200 at step 621 (e.g., to server 210 as an online communication or to terminal 220 as a contactless proximity-based communication) and/or merchant payment data 671*a* that may be communicated from commercial entity subsystem 400 to merchant subsystem 200 at step 621*a* may include data that may be handled by merchant subsystem 200 similarly to a conventional e-commerce transaction. For example, such merchant payment data 671 may be provided to or received by merchant subsystem 200 with (i) token data 662*t* (e.g., a DPAN and a DPAN expiry date) as if it were conventional PAN and PAN expiry date data, (ii) unique transaction identifier 666 as if it were a CVV (e.g., per data field 53 of ISO 8583), and (iii) currency and amount information for the transaction.

In some embodiments, some portion of merchant payment data 670 or data 671*a* communicated by commercial entity subsystem 400 at step 620 or step 621*a* may be supplemented or altered before being received as merchant payment data 673 by financial institution subsystem 350 at step 623. For example, electronic device 100 may in some manner alter merchant payment data 670 at step 621 for communicating merchant payment data 671, and/or merchant subsystem 200 may in some manner alter merchant payment data 671 or data 671*a* at step 622 for communicating merchant payment data 672, and/or acquiring bank subsystem 300 may in some manner alter merchant payment data 672 at step 623 for communicating merchant payment data 673. As just one example, merchant payment data 670, 671, 671*a*, and/or 672 may include (i) a unique transaction identifier (e.g., unique transaction identifier 666 as accessed at step 616), (ii) specific transaction information (e.g., identification of a specific currency to be used to pay for the transaction and/or identification of a specific amount of a currency to be paid for the transaction), and (iii) a specific portion of payment card data (e.g., token data 626*t* (e.g., a DPAN, DPAN expiry date, etc. of SSD 154*a*)), but not an acquiring bank merchant identifier, and acquiring bank subsystem 300 may supplement such merchant payment data 672 as received at step 622 with specific merchant information (e.g., identification of a merchant identifier, such as acquiring bank merchant identifier 167) before communicating such supplemented merchant payment data to financial institution subsystem 350 as merchant payment data 673 at step 623, whereby such merchant payment data 673 may include at least the same information as included in transaction key data 667*d* used by commercial entity subsystem 400 to derive particular transaction key 667*k* at step 617, such that financial institution subsystem 350 may be operative to leverage at least a portion of such merchant payment data 673 to independently derive that same particular transaction key.

At step 624, which may at least be initiated prior to step 619 and/or prior to step 620 and/or prior to step 621 and/or prior to step 622 and/or prior to step 623, or which may at least be initiated after step 619 and/or after step 620 and/or after step 621 and/or after step 622 and/or after step 623, commercial payment data 668 may be communicated between commercial entity subsystem 400 and financial institution subsystem 350 (e.g., via communications path 55 using any suitable communications protocol or protocols). In some embodiments, as described with respect to step 512 of process 500, step 624 of process 600 may include commercial entity subsystem 400 communicating commercial payment data 668 to an appropriate target financial institution subsystem 350 in response to receiving a pull request from that appropriate target financial institution subsystem 350, where such a pull request for commercial payment data 668 may be generated and communicated by the appropriate target financial institution subsystem 350 at a first portion of step 624, and where such a pull request may include an identification of the particular transaction key 667*k* associated with the particular commercial payment data 668 being requested. For example, in response to receiving particular merchant payment data 673 at step 623, a particular financial institution subsystem 350 may be operative to leverage at least a portion of that particular merchant payment data 673 to derive a particular transaction key 667*k* and then to generate and transmit a pull request to commercial entity subsystem 400 at step 624, where such a pull request may include that particular derived transaction key 667*k*. In response to receiving new merchant payment data, financial institution subsystem 350 may be configured to automatically attempt to derive such a key and attempt to use that key to pull commercial payment data (e.g., data portion 662*c* and/or any suitable enhancer data 662*e*) associated with that new merchant payment data (e.g., from commercial entity subsystem 350 and/or from device 100) to attempt to enhance the security and/or functionality of the transaction being processed. Commercial entity subsystem 400 may be identified by financial institution subsystem 350 as the proper recipient of such a pull request based on any suitable information available to financial institution subsystem 350 (e.g., DPAN bin information associated with merchant payment data 673 received at step 623 (e.g., in combination with financial institution subsystem 350 identifying that merchant payment data 673 needs to be associated with crypto data)). In response to receiving such a pull request with such a particular transaction key 667*k*, commercial entity subsystem 400 may be operative to identify the particular commercial payment data 668 associated with that particular transaction key 667k (e.g., server 410 may be operative to leverage that received particular transaction key 667k to identify particular commercial payment data 668 stored against that particular transaction key 667k (e.g., at sub-step 618)), and then commercial entity subsystem 400 may be operative to communicate that identified particular commercial payment data 668 to the particular financial institution subsystem 350 that had communicated the pull request at a second portion of step 624. Similarly, device 100 may be operative to communicate such commercial payment data 668 to financial institution subsystem 350, where device 100 may be identified by financial institution subsystem 350 as the proper recipient of such a pull request based on any suitable information available to financial institution subsystem 350 (e.g., any suitable device identifier data of merchant payment data 673 received at step 623 (e.g., in combination with financial institution subsystem 350 identifying that merchant payment data 673 needs to be associated with crypto data)). In response to receiving such a pull request with such a particular transaction key 667k, device 100 may be operative to identify the particular commercial payment data 668 associated with that particular transaction key 667k (e.g., device 100 may be operative to leverage that received particular transaction key 667k to identify particular commercial payment data 668 stored against that particular transaction key 667k (e.g., in a data structure accessible to device 100)), and then device 100 may be operative to communicate that identified particular commercial payment data 668 to the particular financial institution subsystem 350 that had communicated the pull request at a second portion of step 624.

Alternatively, as also described with respect to step 512 of process 500, step 624 of process 600 may include commercial entity subsystem 400 pushing commercial payment data 668 and its associated transaction key 667k to an appropriate target financial institution subsystem 350 (e.g., immediately after deriving transaction key 667k at step 617). For example, commercial entity subsystem 400 may be operative at step 624 to identify an appropriate target financial institution subsystem 350 for such commercial payment data 668 using any suitable data that may be available to commercial entity subsystem 400 and then sending such commercial payment data 668 to that identified target financial institution subsystem 350. Such data that may be available to commercial entity subsystem 400 for use in identifying the appropriate target financial institution subsystem 350 may include a URL from the SSD of device 100 generating the credential data (e.g., a URL that may be defined by the subsystem that provisioned the SSD credential on device 100) and/or a URL stored in a pass available to processor 102 associated with the credential and/or a URL stored at commercial entity subsystem 400 and/or token data 662t of device transaction data 664 that may be received by commercial entity subsystem 400 at step 614 and/or that may be utilized by commercial entity subsystem 400 as at least a portion of transaction key data 667d of step 617 and/or as at least a portion of merchant payment data 670/671a of step 620/621a. For example, such token data 662t may include a DPAN, DPAN expiry date, and/or CVV of credential information 161a of SSD 154a, whereby at least a portion of such a DPAN may be operative to identify to commercial entity subsystem 400 the appropriate target financial institution subsystem 350 (e.g., an appropriate payment network subsystem 360 associated with that DPAN (e.g., a certain subset of alphanumeric characters of a DPAN may be associated with a particular payment network that may be identifiable by commercial entity subsystem 400 (e.g., using a look-up table))). In such embodiments, once a transaction key 667k has been derived at step 617 and the appropriate target financial institution subsystem 350 has been identified, commercial entity subsystem 400 may be operative to communicate any suitable commercial payment data 668 along with its associated derived transaction key 667k to the identified appropriate target financial institution subsystem 350 at step 624 (e.g., via communications path 55 using any suitable communications protocol). Such communication of commercial payment data 668 and its associated transaction key 667k by commercial entity subsystem 400 to an appropriate target financial institution subsystem 350 as identified by commercial entity subsystem 400 based on device transaction data 664 received by commercial entity subsystem 400 from device 100 at step 614 (e.g., token data 662t) may be a push communication as commercial entity subsystem 400 may be initiating the communication. Alternatively, if device 100 at least partially generated or otherwise has access to commercial payment data 668, step 624 of process 600 may include device 100 pushing commercial payment data 668 and its associated transaction key 667k to an appropriate target financial institution subsystem 350 (e.g., immediately after deriving transaction key 667k at step 617). For example, device 100 may be operative at step 624 to identify an appropriate target financial institution subsystem 350 for such commercial payment data 668 using any suitable data that may be available to device 100 and then sending such commercial payment data 668 to that identified target financial institution subsystem 350. Such data that may be available to device 100 for use in identifying the appropriate target financial institution subsystem 350 may include a URL from the SSD of device 100 generating the credential data (e.g., a URL that may be defined by the subsystem that provisioned the SSD credential on device 100) and/or a URL stored in a pass available to processor 102 associated with the credential and/or a URL stored at commercial entity subsystem 400 and/or token data 662t of device transaction data 664. For example, such token data 662t may include a DPAN, DPAN expiry date, and/or CVV of credential information 161a of SSD 154a, whereby at least a portion of such a DPAN may be operative to identify to device 100 the appropriate target financial institution subsystem 350 (e.g., an appropriate payment network subsystem 360 associated with that DPAN (e.g., a certain subset of alphanumeric characters of a DPAN may be associated with a particular payment network that may be identifiable by commercial entity subsystem 400 (e.g., using a look-up table))). In such embodiments, once a transaction key 667k has been derived at step 617 and the appropriate target financial institution subsystem 350 has been identified, device 100 may be operative to communicate any suitable commercial payment data 668 along using its associated derived transaction key 667k to the identified appropriate target financial institution subsystem 350 at step 624 (e.g., via communications path 75 using any suitable communications protocol). Such communication of commercial payment data 668 using its associated transaction key 667k by device 100 to an appropriate target financial institution subsystem 350 as identified by device 100 may be a push communication as device 100 may be initiating the communication. As mentioned, financial institution subsystem 350 may be operative to derive a transaction key 667k based on merchant payment data 673 received at step 623, such that financial institution subsystem 350 may be operative to leverage that derived transaction key 667k in order to identify a particular push communication received at step 624 from commercial entity subsystem 400 and/or device 100 that includes that same transaction key 667k and then to access the commercial payment data 668 of that identified particular push communication. Any data that may be communicated from device 100 to financial institution subsystem 350 may be encrypted using a key associated with financial institution subsystem 350 (e.g., using a key 155a' and/or key 155b' on device 100) such that the communicated data may only be decrypted and used by financial institution subsystem 350.

Therefore, whether commercial payment data 668 is communicated at step 624 from commercial entity subsystem 400 or device 100 to financial institution subsystem 350 as a push communication or as a response to a received pull request, step 624 may include financial institution subsystem 350 leveraging particular merchant payment data 673 received at step 623 for deriving a particular transaction key 667k for accessing particular commercial payment data 668 associated with that particular transaction key 667k from commercial entity subsystem 400 or from device 100. Once financial institution subsystem 350 has received particular merchant payment data 673 through a first communication channel at step 623 and has received associated particular commercial payment data 668 through a second communication channel at step 624 (e.g., by leveraging a transaction key 667k that may be both derived from such merchant payment data 673 by financial institution subsystem 350 and associated with such commercial payment data 668 by commercial entity subsystem 400 or device 100), financial institution subsystem 350 may be operative at step 625 to independently generate crypto data based on the token data of the particular merchant payment data received at step 623, compare that generated crypto data to the crypto data of the particular commercial payment data received at step 624, and either validate or reject the transaction based on the comparison. For example, financial institution subsystem 350 may be operative to independently generate crypto data 662c based on particular merchant payment data 673 received at step 623, where such merchant payment data 673 may include token data 662t (e.g., a DPAN, DPAN expiry date, and/or CVV of credential information 161a of SSD 154a) and any other suitable data associated with the transaction (e.g., merchant identification information, currency and/or amount information, etc.), and where financial institution subsystem 350 may be operative to leverage such received merchant payment data 673 in conjunction with a shared secret of both financial institution subsystem 350 and electronic device 100 to independently generate crypto data 662c (e.g., in a similar manner as device 100 may have generated crypto data 662c of device transaction data 660 at step 610). Then, such crypto data 662c as generated by financial institution subsystem 350 at a first portion of step 625 based on merchant payment data 673 received by financial institution subsystem 350 at step 623 may be compared by financial institution subsystem 350 at a second portion of step 625 to crypto data 662c of commercial payment data 668 received by financial institution subsystem 350 at step 624. If such a comparison reveals that the two instances of crypto data 662c are the same, then financial institution subsystem 350 may validate crypto data 662c at a third portion of step 625 for enabling the transaction to be funded using a funding account associated with the validated crypto data (e.g., a funding account that may be associated with the DPAN of token data 662t associated with crypto data 662c) at step 626. Additionally or alternatively, at step 625, financial institution subsystem 350 may be operative to use at least a portion of merchant payment data 673 received at step 623 (e.g., DPAN, DPAN expiry date, etc.) in combination with at least a portion of commercial payment data 668 received at step 624 (e.g., any suitable counter values, nonce, etc.) and in combination with at least some data securely stored by financial institution subsystem 350 (e.g., a cryptogram master key that may also be used to generate a shared secret and/or a credential key (e.g., key 155a') on secure element 145) to reconstruct the cryptogram and then to compare that reconstructed cryptogram with the cryptogram of commercial payment data 668 received at step 624 for validating the crypto data based on such a comparison.

In some embodiments, if crypto data 662c is validated at a portion of step 625, financial institution subsystem 350 may process at another portion of step 625 any transaction-enhancer information 662e that may also be provided along with crypto data 662c by commercial payment data 668 received by financial institution subsystem 350 at step 624 in order to make a determination as to whether or not to enable the transaction to be funded at step 626. Therefore, not only must crypto data 662c of particular received commercial payment data 668 be validated at step 625 but any transaction-enhancer information 662e of that particular received commercial payment data 668 must also be processed in order to confirm that any requirements of such transaction-enhancer information 662e are satisfied before enabling the transaction to be funded at step 626. Such transaction-enhancer information 662e may include (i) specific merchant-based transaction-enhancer information (e.g., one or more elements or rules that may be generated by and provided from merchant subsystem 200 to device 100 as a portion of potential transaction data 660 of step 610 and that may then be provided from device 100 to commercial entity subsystem 400 as a portion of device transaction data 664 of step 614), (ii) specific device-based transaction-enhancer information (e.g., one or more elements or rules that may be generated by and provided from device 100 to commercial entity subsystem 400 as a portion of device transaction data 664 of step 614), and/or (iii) specific commercial-based transaction-enhancer information (e.g., one or more elements or rules that may be generated by commercial entity subsystem 400 prior to step 624). In some embodiments, commercial entity subsystem 400 may instead include the crypto data of portion 662c of data 662 in merchant payment data 670/671a along with the token data of portion 662t of data 662 and transaction key data 667d as sent to device 100 and merchant subsystem 200 at steps 620/621/621a, such that the crypto data may be verified by financial institution subsystem 350 in response to receiving merchant payment data 673 and without requiring any commercial payment data from commercial entity subsystem 400, but commercial payment data 668 of commercial entity subsystem 400 as may be accessed by financial institution subsystem 350 at step 624 using a transaction key may still include any suitable transaction-enhancer information 662e to be associated with the transaction and leveraged by financial institution subsystem 350.

Transaction-enhancer information 662e may include any suitable rule or other data that may be generated and associated with a transaction (e.g., by merchant subsystem 200 for data 660 at step 610, by electronic device 100 for data 664 at step 614, and/or by commercial entity subsystem 400 for data 668) for later analysis prior to funding the transaction in order to determine at least one attribute of the transaction (e.g., to enable better assessment of risk associated with the transaction before funding the transaction). Some transaction-enhancer information may be generated in order to provide an additional layer of security to a transaction, for example, by defining one or more limits or requirements that must be satisfied in order for the associated transaction to be validated or otherwise enabled for finding. Such transaction-enhancer information may be generated by merchant subsystem 200 (e.g., as merchant-based transaction-enhancer information) and leveraged during a transaction process (e.g., process 600) in order for the merchant to get better rates for such a transaction (e.g., financial institution subsystem 350 may incentivize merchant subsystem 200 to use such transaction-enhancer information by providing better transaction rates while fostering more secure transactions).

As one example, transaction-enhancer information 662e may include time-based transaction-enhancer information, such as a time-stamp or a time period that may be defined and associated with a transaction prior to the transaction being validated at step 625, whereby financial institution subsystem 350 may then analyze that time-based transaction-enhancer information at step 625 to determine whether the transaction ought to be funded based on that time-based transaction-enhancer information. For example, time-based transaction-enhancer information may be operative to identify any suitable time frame (e.g., 2 hours or 2 days or 2 weeks) that may start from the time when such time-based transaction-enhancer information may be defined (e.g., by merchant subsystem 200 for data 660 at step 610, by electronic device 100 for data 664 at step 614, or by commercial entity subsystem 400 for data 668 at step 618), and whereby financial institution subsystem 350 may be operative to process such time-based transaction-enhancer information in order to enable an associated transaction to be funded at step 626 only if step 625 is being conducted during the time frame identified by that time-based transaction-enhancer information being processed. Such time-based transaction-enhancer information may prevent financial institution subsystem 350 from enabling a transaction to be funded that was initiated more than a particular duration of time in the past or that was initiated with the intent of only being funded with respect to a particular time (e.g., time-based transaction-enhancer information may be operative to define a time frame during which or before which or after which a transaction is valid and able to be funded).

As another example, transaction-enhancer information 662e may include recurring billing transaction-enhancer information, such as an indication as to whether or not the transaction may be utilized multiple times (e.g., as a monthly recurring billing transaction), whereby financial institution subsystem 350 may then analyze that recurring billing transaction-enhancer information at step 625 to determine whether the transaction ought to be funded based on that recurring billing transaction-enhancer information. For example, recurring billing transaction-enhancer information may be operative to identify whether or not the associated transaction may be funded only a single time or multiple times according to any suitable recurring format (e.g., once a month indefinitely, once a week for 4 weeks, eight times per year, etc.), and whereby financial institution subsystem 350 may be operative to process such recurring billing transaction-enhancer information in order to enable an associated transaction to be funded at step 626 only if doing so would meet the recurring billing limitations identified by that recurring billing transaction-enhancer information being processed (e.g., financial institution subsystem 350 may be operative to keep track of how many times or how often a particular transaction has been enabled by prior iterations of step 625 for a particular transaction (e.g., as may be identified by the unique transaction identifier or any other suitable information)) and then to enable or not enable future funding of the transaction accordingly.

As yet another example, transaction-enhancer information 662e may include merchant identification transaction-enhancer information, such as an indication of the particular merchant associated with the transaction (e.g., any suitable merchant identifier, such as merchant identifier 167), whereby financial institution subsystem 350 may then analyze that merchant identification transaction-enhancer information at step 625 to determine whether the transaction ought to be funded based on that merchant identification transaction-enhancer information. For example, merchant identification transaction-enhancer information may be operative to identify the particular merchant associated with the transaction as determinable by commercial entity subsystem 400 (e.g., at step 618 based on any suitable information), and whereby financial institution subsystem 350 may be operative to process such merchant identification transaction-enhancer information in order to confirm that the merchant payment data 673 received at step 623 is associated with the same merchant as identified by that merchant identification transaction-enhancer information being processed (e.g., to prevent a different merchant subsystem 200 from communicating a transaction to financial institution subsystem 350 (e.g., at step 622 and step 623 via an acquiring bank) than the merchant subsystem 200 that initiated the transaction with device 100 at step 610).

As yet another example, transaction-enhancer information 662e may include partial shipment transaction-enhancer information, such as an indication as to whether or not the transaction may be funded after only partial shipment of the goods associated with the transaction, whereby financial institution subsystem 350 may then analyze that partial shipment transaction-enhancer information at step 625 to determine whether the transaction ought to be funded based on that partial shipment transaction-enhancer information. For example, partial shipment transaction-enhancer information may be operative to identify whether or not the associated transaction may be funded prior to complete shipment of the associated goods, and whereby financial institution subsystem 350 may be operative to process such partial shipment transaction-enhancer information in order to enable an associated transaction to be funded at step 626 only if doing so would meet the partial shipment limitations identified by that partial shipment transaction-enhancer information being processed and then to enable or not enable future funding of the transaction accordingly. If financial institution subsystem 350 is securely made aware that partial shipment and/or additional funding is approved for particular commercial payment data/merchant payment data (e.g., based on partial shipment transaction-enhancer information of transaction-enhancer information 662e), financial institution subsystem 350 may be able to handle more appropriately (e.g., with less risk) any suitable partial shipment/ additional funding transaction requests from a merchant that may be associated with the particular commercial payment data/merchant payment data and/or may be able to apply heavier risk policies only for partial shipment/additional fielding transaction requests that are not associated with appropriate partial shipment transaction-enhancer information of transaction-enhancer information 662e.

As yet another example, transaction-enhancer information 662e may include amount-based transaction-enhancer information, such as an indication of a particular amount or a maximum amount of a particular currency that may be defined and associated with a transaction prior to the transaction being validated at step 625, whereby financial institution subsystem 350 may then analyze that amount-based transaction-enhancer information at step 625 to determine whether the transaction ought to be funded based on that amount-based transaction-enhancer information. For example, amount-based transaction-enhancer information may be operative to identify any suitable currency amount or any suitable currency limit or any suitable range of currency amounts (e.g., 25 U.S. Dollars, no more than 75 Yen, any amount between 50 Pounds and 100 Pounds, etc.) that may be defined prior to evaluating a transaction for funding (e.g., by merchant subsystem 200 for data 660 at step 610, by electronic device 100 for data 664 at step 614, or by commercial entity subsystem 400 for data 668 at step 618, as may be based on currency amount data from potential transaction data 660), and whereby financial institution subsystem 350 may be operative to process such amount-based transaction-enhancer information at step 625 in order to enable an associated transaction to be funded at step 626 only if the amount of the transaction identified by the merchant payment data 673 received at step 623 satisfies the limitation(s) of that amount-based transaction-enhancer information being processed. Such amount-based transaction-enhancer information may prevent financial institution subsystem 350 from enabling a transaction to be funded for an amount that differs from the amount(s) satisfying the limitation(s) initially associated with the transaction by such amount-based transaction-enhancer information (e.g., to prevent merchant subsystem 200 and/or acquiring bank subsystem 300 from communicating a transaction to financial institution subsystem 350 (e.g., at step 622 and step 623) requesting an amount of currency to be funded that differs in any suitable way from the currency amount indicated by merchant subsystem 200 at the initiation of the transaction).

As yet another example, transaction-enhancer information 662e may include device-situation transaction-enhancer information, such as an indication of a particular location of device 100 at the time device 100 is interacting with merchant subsystem 200 for initiating a transaction (e.g., at step 614), whereby financial institution subsystem 350 may then analyze that device-situation transaction-enhancer information at step 625 to determine whether the transaction ought to be funded based on that device-situation transaction-enhancer information. For example, device-situation transaction-enhancer information may be operative to identify any current environmental information with respect to device 100 at a particular time (e.g., the location of device 100 through leveraging any suitable location-based service enabled by device 100 or sensor(s) of device 100) that may be defined prior to evaluating a transaction for funding (e.g., by electronic device 100 for data 664 at step 614), and whereby financial institution subsystem 350 may be operative to process such device-situation transaction-enhancer information at step 625 in order to enable an associated transaction to be funded at step 626 only if the environmental information of that device-situation transaction-enhancer information being processed meets any suitable risk analysis (e.g., common fraud indicators) available to financial institution subsystem 350 (e.g., account information associated with a transaction being evaluated by financial institution subsystem 350 that may be accessible to financial institution subsystem 350 (e.g., address information associated with a funding account owner) may be analyzed in combination with such device-situation transaction-enhancer information to determine if any risk exists that may warrant the funding of the transaction to be denied or flagged for further review (e.g., if the address of the funding account owner is determined by financial institution subsystem 350 to be in New York but the location of device 100 identified by device-situation transaction-enhancer information is in China, the transaction may be flagged for further risk analysis prior to enabling the transaction to be funded)). Other suitable device-situation transaction-enhancer information may include geo-location of device 100 (e.g., country location or more specific location such as state or city or street), internet protocol ("IP") address of device 100, and/or the like.

As yet another example, transaction-enhancer information 662e may include any suitable funder trust score and/or any suitable data that may be used by system 1 to determine such a funder trust score. Any suitable data indicative of any suitable characteristic of device 100, which may be collected on device 100 or by commercial entity subsystem 400 based on information known by commercial entity subsystem 400 about device 100 and/or about user(s) of device 100, may be provided as funder trust score transaction-enhancer information 662e and/or may be used (e.g., by device 100 and/or commercial entity subsystem 400) to generate a combined funder trust score (e.g., using any suitable algorithm(s) or weighting procedures) that may then be provided as funder trust score transaction-enhancer information 662e. For example, such characteristics for which indicative data may be used as funder trust score transaction-enhancer information 662e or to determine a funder trust score to be used as funder trust score transaction-enhancer information 662e may include any suitable characteristic, including, but not limited to, name of primary account holder of the device and/or of the credential, money transfer amount, currency type or numeric currency code (e.g., per ISO 4217), secure element ID ("SEID") of secure element 145, device name (e.g., a name of device 100 that may be recognizable to its user (e.g., "John's iPhone"), which may later be used by financial entity subsystem 350 for risk assessment and/or validation of the transaction and/or for use in any communications with device 100 and/or its user (e.g., a receipt that says "a credential provisioned on John's iPhone was recently used to make a purchase")), device accepted language (e.g., a selected language setting on device 100, which may be used to compare to a known preferred language of a customer associated with the credential), device type (e.g., the type of device 100 used to make the transaction (e.g., iPhone, iPad, Apple Watch, etc.)), device location (e.g., as mentioned above, such as coarse location with latitude and longitude at two decimal points of precision, or GPS country, IP country, IP address, and/or the like), motion of device (e.g., data from one or more motion sensors of device 100 indicative of the motion of device 100 (e.g., within a particular time frame), which may indicate whether or not device 100 is being used in a manner expected of an everyday purchaser or a device being used fraudulently), charge status and/or frequency of charging of device 100 (e.g., data indicative of the amount of power available to the device and/or data indicative of how often the device is charged, which may indicate whether or not device 100 is being used in a manner expected of an everyday purchaser or a device being used fraudulently), accepted language of device (e.g., a selected language setting on device 100, which may be used to compare to a known preferred language of a customer associated with the credential), type and/or strength and/or tenure of intent and/or authentication mechanism used on device 100 to release credential data (e.g., whether a PIN code and/or biometric sensor data was used (e.g., at step 611) to enable credential data to be generated by and/or released from device 100, and/or the length of a PIN code used and/or the resolution of the biometric sensor data used, and/or the tenure of the security mechanism used (e.g., how long ago had the PIN code or biometric data been defined), etc., which may indicate the security with which the credential data is protected on device 100), a unique ID representing the device user's e-mail address or the e-mail address itself (e.g., a hashed version or clear version of one or more authenticated e-mail addresses associated with one or more e-mail applications on device 100 and/or with a known user of device 100 (e.g., e-mail address associated with the user's account of commercial entity subsystem 400)), e-mail tenure (e.g., tenure of e-mail address' association with user's account of commercial entity subsystem 400), billing address or billing address ZIP code or billing address country (e.g., if credential being used is also known by commercial entity subsystem 400 (e.g., a credential stored in association with a user account of commercial entity subsystem 400)), billing address tenure (e.g., tenure of billing address' association with user's account of commercial entity subsystem 400), a unique ID representing a device user's telephone number or the telephone number itself (e.g., a hashed version or clear version of one or more telephone numbers linked to device 100 and/or to a known user of device 100 (e.g., telephone number associated with the user's account of commercial entity subsystem 400)), telephone number tenure (e.g., tenure of telephone number's association with user's account of commercial entity subsystem 400), PAN tenure (e.g., tenure of PAN of credential data on device 100), user's commercial entity account tenure (e.g., tenure of device user's account with commercial entity subsystem 400), user's commercial entity account trust level, tenure of any other suitable component of device 100 (e.g., tenure of a SIM card on device 100), and/or the like. Device 100 and/or commercial entity subsystem 400 may be operative to determine data indicative of one, some, or all such characteristics and either use such data to define funder trust score transaction-enhancer information 662*e* and/or use such data to define one or more funder trust scores that may then be used to define funder trust score transaction-enhancer information 662*e*. For example, a data indicative of any suitable tenure characteristic may be ranked a "1" if the tenure is less than 7 days, ranked a "2" if the tenure is within a range of 7-30 days, ranked a "3" if the tenure is within a range of 1-6 months, ranked a "4" if the tenure is within a range of 6-12 months, and ranked a "5" if the tenure is greater than 12 months, and such a ranking may be used to at least partially determine one or more funder trust scores that may then be used to define funder trust score transaction-enhancer information 662*e*. For example, a funder trust score of any type may be presented as an integer ranging from 1 to 5 and may be interpreted by system 1 (e.g., by financial institution subsystem 350) such that a score of "5" may be indicative of a long history of activity and no suspicious activity (e.g., highest trust level), a score of "4" may be indicative of a short history of activity and no suspicious activity, a score of "3" may be indicative of little or no history, a score of "2" may be indicative of irregular activity noted, and a score of "1" may be indicative of improper activity noted (e.g., lowest trust level), whereby the lower the trust score of funder trust score transaction-enhancer information 662*e* accessed by financial institution subsystem 350 in conjunction with a particular transaction, the more likely financial institution subsystem 350 may be to determine that the transaction is too risky to authorize or too risky to allow associated risk to be passed on to financial institution subsystem 350. In some embodiments, device 100 and/or commercial entity subsystem 400 may be configured to generate one or more trust scores (e.g., a device data trust score and/or a commercial entity account trust score) that may be operative to provide a summary of transaction and experience information concerning the specific device and/or the specific commercial entity account associated with the transaction. In some embodiments, such a score may be calculated based on behavior across multiple devices and/or accounts, which may provide meaningful additional information, speed up processing, and/or deliver a consistently great customer experience. Many factors may be included in the score or other suitable summary, including historic and recent transactions, anomalous behavior, and linkages to known bad actors or activity. Such funder trust score transaction-enhancer information 662*e* and/or any other suitable transaction-enhancer information 662*e* may be used by system 1 to shift the liability for fraudulent transactions by improving the amount and type of data that may be relied upon to make a transaction risk assessment.

The present disclosure recognizes that the use of such personal information data, in the present technology, such as current location of user device 100, can be used to the benefit of users. For example, the personal information data can be used to provide better security and risk assessment for a financial transaction being conducted. Accordingly, use of such personal information data enables calculated security of a financial transaction. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of financial transaction services, the present technology can be configured to allow users to select to "opt in" or "opt out" of participation in the collection of personal information data during registration for such services. In another example, users can select not to provide location information for financial transaction services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, financial transaction services can be provided by inferring preferences or situations based on non-personal information data or a bare minimum amount of personal information, such as the financial transaction being conducted by the device associated with a user, other non-personal information available to the financial transaction services, or publically available information.

Therefore, use of transaction-enhancer information 662e may be operative to enable financial institution subsystem 350 to provide a validation check after receiving merchant payment data 673 at step 623 and after receiving commercial payment data 668 with such transaction-enhancer information 662e at step 624 but before enabling a transaction to be funded at step 626. Financial institution subsystem 350 may be operative to process any suitable transaction-enhancer information 662e at step 625 in combination with any other suitable information accessible by financial institution subsystem 350 in order to determine whether a transaction ought to be enabled for funding. Such transaction-enhancer information 662e may be generated by any suitable entity associated with the transaction, such as merchant subsystem 200, electronic device 100, and/or commercial entity subsystem 400, and such transaction-enhancer information 662e may be communicated to financial institution subsystem 350 outside of a main communication channel for e-commerce transaction data (e.g., such transaction-enhancer information 662e may be communicated as at least a portion of commercial payment data 668 to financial institution subsystem 350 from commercial entity subsystem 400 rather than from merchant subsystem 200 and/or acquiring bank subsystem 300, thereby obviating the need for merchant subsystem 200 and/or acquiring bank subsystem 300 to handle such transaction-enhancer information 662e yet enabling such transaction-enhancer information 662e to be processed by in association with an appropriate transaction being requested for funding). Therefore, if financial institution subsystem 350 determines that a particular transaction is no longer viable, financial institution subsystem 350 may prevent it from being funded and may update or delete any data associated with the transaction (e.g., financial institution subsystem 350 may delete commercial payment data 668 and/or edit at least a portion of transaction-enhancer information 662e associated therewith). However, if step 625 is able to enable a transaction for funding, not only may commercial entity subsystem 400 be satisfied that the financial transaction is between a known device 100 and a known merchant subsystem 200 and/or meets any suitable requirements of any suitable transaction-enhancer information 662e, but financial institution subsystem 350 may also be satisfied that the financial transaction is being conducted in accordance with trusted independently verified data.

If the transaction is enabled to be funded, then step 626 may include accessing a funding account of financial institution subsystem 350 using the validation results of step 625. As just one example, a particular payment network subsystem 360 associated with a particular payment network may be operative at steps 623-625 to receive and leverage particular merchant payment data 673 and particular commercial payment data 668 for validating crypto data 662c and then passing any suitable validation result data that may be indicative of that validated crypto data 662c along with any suitable transaction data (e.g., transaction cost, transaction currency, etc.) to an appropriate issuing bank subsystem 370 that may be associated with the DPAN of token data 662t of merchant payment data 673, such that such an issuing bank subsystem 370 may utilize such validation result data at step 626 to identify or otherwise access an appropriate funding account to determine if there are sufficient funds in that account to fund the transaction being executed between electronic device 100 and merchant subsystem 200 (e.g., using a virtual-linking table 312 (e.g., as shown in FIG. 1A)). If sufficient funds are not present, financial institution subsystem 350 (e.g., issuing bank subsystem 370) may decline the requested transaction by transmitting a negative authorization response to acquiring bank subsystem 300. However, if sufficient funds are present, financial institution subsystem 350 (e.g., issuing bank subsystem 370) may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 677 at step 627 of process 600 (e.g., directly from issuing bank subsystem 370 to acquiring bank subsystem 300 via communication path 35, or from payment network subsystem 360 to acquiring bank subsystem 300 based on authorization response data 415 that may be provided to payment network subsystem 360 from issuing bank subsystem 370 via communication path 45 of FIG. 1A). Next, in response to receiving authorization response data 677 at step 627, process 600 may also include acquiring bank subsystem 300 or any other suitable subsystem sharing such authorization response data with merchant subsystem 200 as authorization response data 678 at step 628 via communication path 25, which may then be shared with electronic device 100 as authorization response data 680 at step 630 via communication path 15. In some embodiments, such a particular payment network subsystem 360 may be operative to share certain transaction-enhancer data 662e with the appropriate issuing bank subsystem 370 for use by the appropriate issuing bank subsystem 370. Alternatively or additionally, such a particular payment network subsystem 360 may be operative to share transaction key data 667d or transaction key 667k with the appropriate issuing bank subsystem 370 for use by the appropriate issuing bank subsystem 370 to independently access certain transaction-enhancer data 662e directly from commercial entity subsystem 400 using that key (e.g., at another iteration of step 624).

In some embodiments, the payment card data (e.g., token data 662t and/or crypto data 662d) of SSD 154a that may be encrypted by electronic device 100 may first be encrypted by a credential key (e.g., credential key 155a' of secure element 145). Such a credential key may not be accessible by commercial entity subsystem 400, such that encrypted SE credential data 662 of not only the decrypted device transaction data of step 615 (e.g., as decrypted using a commercial entity key) but also the re-encrypted merchant credential data 669 of steps 619-621a (e.g., as re-encrypted with a merchant key) may remain encrypted by that credential key. Acquiring bank 300 and/or financial institution subsystem 350 may have access to such a credential key (e.g., credential key 155a' of financial institution subsystem 350), such that when merchant payment data is forwarded to acquiring bank 300 at step 622 and/or financial institution subsystem 350 at step 623, acquiring bank 300 and/or financial institution subsystem 350 may decrypt the payment card data of the merchant payment data using the credential key before being able to identify the funding account associated with that merchant payment data (e.g., the DPAN of token data 662t). Therefore, process 600 may utilize a commercial entity subsystem 400 to add a layer of security to an online financial transaction between an electronic device and a merchant. Commercial entity subsystem 400 may be privy not only to a commercial entity key available at a secure element of device 100 but also to a merchant key available to merchant subsystem 200. Therefore, commercial entity subsystem 400 may be in a unique position to manage any online transactions between the secure element of device 100 and merchant subsystem 200, while at the same time not being privy to the payment card data being used to identify an account for funding that transaction (e.g., as commercial entity subsystem 400 may not have access to a credential key with which at least a portion of the payment card data (e.g., token data and/or crypto data) may be initially encrypted by the secure element). Moreover, commercial entity subsystem 400 may be in a unique position to process device transaction data 664 received from device 100 at step 614 in order to enable at least two distinct portions of transaction payment data (e.g., at least two distinct portions of the payment card data or credential data of the device transaction data) to be communicated to financial institution subsystem 350 via at least two different communication paths for achieving a more secure and/or more efficient validation of the payment card data of the transaction. For example, commercial entity subsystem 400 may be operative to securely and/or efficiently communicate a first portion of payment card data (e.g., token data 662t originating from device 100 and received by commercial entity subsystem 400 as a portion of device transaction data 664 at step 614) to financial institution subsystem 350 via a first communication path (e.g., as a portion of merchant payment data 673 communicated from commercial entity subsystem 400 to financial institution subsystem 350 via electronic device 100 and/or merchant subsystem 200 and/or acquiring bank subsystem 300 (e.g., at steps 620-623)) and to securely and/or efficiently communicate a second portion of payment card data (e.g., crypto data 662c originating from device 100 and received by commercial entity subsystem 400 as a portion of device transaction data 664 at step 614) to financial institution subsystem 350 via a second communication path (e.g., as a portion of commercial payment data 668 communicated from commercial entity subsystem 400 to financial institution subsystem 350 not via electronic device 100 and/or merchant subsystem 200 and/or acquiring bank subsystem 300 (e.g., at step 624)).

Process 600 may ensure that system 1 may leverage security keys accessible to a security element of device 100 so as to securely communicate credential data to merchant subsystem 200 for use by financial institution subsystem 350 while enabling certain keys to be properly managed by commercial entity subsystem 400. That is, secure element 145 of device 100 (e.g., NFC component 120) may contain credential key 155a' and access information (e.g., 155a, 155b, 156k, 151k, and/or 158k), commercial entity subsystem 400 may contain access information (e.g., 155a, 155b, 156k, 151k, and/or 158k) and merchant key 157, merchant subsystem 200 may contain merchant key 157, and financial institution subsystem 350 may contain credential key 155a'. Due to the fact that device 100 and commercial entity subsystem 400 may each contain or have access to access information (e.g., 155a, 155b, 156k, 151k, and/or 158k), device 100 may securely share encrypted credential data with commercial entity subsystem 400 (e.g., as data 664 at step 614). Similarly, due to the fact that commercial entity subsystem 400 and merchant subsystem 200 may each contain or have access to merchant key 157, commercial entity subsystem 400 may securely share encrypted credential data with merchant subsystem 200 (e.g., as data 671a at step 621a or via device 100 as data 671 at step 621). Then, merchant subsystem 200, via acquiring bank subsystem 300, may share first encrypted credential data (e.g., token data 662t) with financial institution subsystem 350 that may finally decrypt the encrypted credential data with credential key 155a' (e.g., in combination with second credential data 662c via data 668). However, in some embodiments, none of the credential data of the secure element of device 100 (e.g., SE credential data 661 of applet 153a of SSD 154a) may be shared with a non-secure element of device 100 (e.g., processor 102 and/or communications component 106) in a decrypted state, nor may credential key 155a' be made available to such a non-secure element of device 100. Credential key 155a' may be managed by financial institution subsystem 350, while certain access information (e.g., 155a, 155b, 156k, 151k, and/or 158k) may be managed by or otherwise accessible to commercial entity subsystem 400, while merchant key 157 may be managed by commercial entity subsystem 400 and/or merchant subsystem 200, such that each of these keys may be maintained and/or updated and/or deleted as needed to maintain their effectiveness. Therefore, merchant key 157 may never be stored on or otherwise accessible to device 100. For example, merchant key 157 may not even be stored on a secure element of device 100. Merchant key 157 can be revocable or may expire after a certain amount of time, which may require merchant subsystem 200 and commercial entity subsystem 400 to communicate every so often to manage and/or update merchant key 157. This may enable commercial entity subsystem 400 to dictate which merchant subsystems 200 may be able to conduct online transactions using secure credentials of device 100. Moreover, certain access information (e.g., 155a, 155b, 156k, 151k, and/or 158k) may never be stored on or otherwise accessible to merchant subsystem 200. For example, certain access information can be revocable or may expire after a certain amount of time, which may require device 100 and commercial entity subsystem 400 to communicate every so often to manage and/or update such access information. This may enable commercial entity subsystem 400 to dictate which devices 100 may be able to conduct online transactions using secure credentials of device 100 with a merchant subsystem 200 via commercial entity subsystem 400.

Therefore, process 600 may enable at least one credential provisioned on a secure element of device 100 to be securely used for an online payment transaction with merchant subsystem 200. By only trusting data within the secure element of device 100 and not any data or components of device 100 off of such a secure element (e.g., processor 102 or application 113 local to device 100), process 600 may require that any credential data transmitted out of the secure element (e.g., SE credential data 661 of applet 153a) be encrypted with a credential key 155a' that may only be known by the secure element and financial institution subsystem 350 (e.g., as encrypted SE credential data 662 at step 612), and, in some embodiments, then encrypted with access information (e.g., 155a, 155b, 156k, 151k, and/or 158k) that may only be known by secure element 145 and commercial entity subsystem 400 (e.g., as encrypted commercial entity credential data 663 at step 613). Commercial entity subsystem 400 may then leverage this data 663 (e.g., as part of received device transaction data 664) and its knowledge of such access information (e.g., 155a, 155b, 156k, 151k, and/or 158k) and merchant key 157 to decrypt/re-encrypt (e.g., at steps 615/619) a first portion of the credential data transmitted by device 100 (e.g., token data 662t) for communication to merchant subsystem 200 as data 671/671a and eventually to financial institution subsystem 350 as data 673 via a first communication path, while also communicating a second portion of the credential data transmitted by device 100 (e.g., crypto data 662c) to financial institution subsystem 350 as data 668 via a second communication path. By providing commercial entity subsystem 400 in the middle of process 600, an extra layer of security is realized and enables crypto data 662c to be communicated to financial institution subsystem 350 without having to first be communicated to merchant subsystem 200 or acquiring bank subsystem 300 (e.g., to obviate the need for merchant subsystem 200 or acquiring bank subsystem 300 to process and/or forward such data). Commercial entity subsystem 400 may be privy not only to certain access information (e.g., 155a, 155b, 156k, 151k, and/or 158k) shared by secure element 145 of device 100 but also to merchant key 157 shared by merchant subsystem 200. Therefore, commercial entity subsystem 400 may be in a unique position to manage any online transactions between the secure element of device 100 and merchant subsystem 200, while at the same time not being privy to the credential data being used (e.g., not being privy to SE credential data 661 of applet 153a that may be encrypted as encrypted SE credential data 662 at step 612 by credential key 155a', for example, because commercial entity subsystem 400 may not have access to credential key 155a').

Commercial entity subsystem 400 may be configured to provide a validation check after receiving commercial entity transaction data 664 but before providing merchant payment data 670 and/or commercial payment data 668. For example, commercial entity subsystem 400 may determine that received commercial entity transaction data 664 identifies a merchant whose merchant key 157 has expired or has otherwise been terminated or not recognized (e.g., by table 430). Therefore, if commercial entity subsystem 400 at some point before step 620/621a determines that a particular merchant is no longer trustworthy, commercial entity subsystem 400 may remove or otherwise disable its merchant key 157 from table 430, such that, when a merchant associated with that key 157 is later identified by commercial entity subsystem 400 from a received commercial entity transaction data 664 provided by an electronic device 100, commercial entity subsystem 400 may not provide any associated merchant payment data 670/671a, thereby preventing the desired financial transaction. Alternatively, a merchant identified in commercial entity transaction data 664 received from an electronic device 100 may never have had a merchant key 157 associated with table 430, such that commercial entity subsystem 400 may realize that commercial entity transaction data 664 may be an attempt to conduct a financial transaction with a merchant that is not recognized by commercial entity subsystem 400 and, thus, commercial entity subsystem 400 may prevent the transaction from being carried out. However, if process 600 is able to be completed, not only may commercial entity subsystem 400 be satisfied that the financial transaction is between a known device 100 (e.g., due to shared access information (e.g., 155a, 155b, 156k, 151k, and/or 158k)) and a known merchant subsystem 200 (e.g., due to a known merchant key 157), but merchant subsystem 200 may also be satisfied that the financial transaction is being conducted with a trusted device 100 (e.g., due to the received communication data 670/671a being encrypted with a merchant key 157 from a trusted commercial entity subsystem 400).

Before or after ruling on a transaction (e.g., before or after authorizing or declining the transaction and sending data 677 at step 627), financial institution subsystem 350 may be operative to communicate any suitable user data 682 with device 100 at step 632. For example, financial institution subsystem 350 may determine prior to step 632 (e.g., at step 625 and/or step 626) that financial institution subsystem 350 needs more information from the user of device 100 before it can authorize the transaction, financial institution subsystem 350 may establish a line of communication between financial institution subsystem 350 and device 100 (e.g., directly through communication path 75 based on any suitable identification information associated with device 100 that may be accessible to financial institution subsystem 350 (e.g., based on any device contact information that may be communicated to financial institution subsystem 350 at step 623 and/or step 624 and/or that otherwise may be accessible to financial institution subsystem 350 (e.g., based on information already known by financial institution subsystem 350 about the user of the credential)) and/or indirectly through paths 55 and 65 via commercial entity subsystem 400 and/or through paths 35, 25, and 15 via merchant subsystem 200) and use that communication path to communicate with data 682 a request for more information to device 100 (e.g., a request for a password or other security information associated with the account at financial institution subsystem 350 for the credential being used). Alternatively, financial institution subsystem 350 may determine after authorizing or declining the transaction and sending data 677 at step 627 that financial institution subsystem 350 wants to send certain data 682 to the user of device 100, using such a communication path, that may be operative to provide the user with any suitable options, including, but not limited to, present flexible payment options (e.g., installments) for the user to choose to utilize rather than a complete payment as may have been initially intended by the credential data already communicated, present points or rewards earned by the funded transaction (e.g., frequent flier points), present current balance or open to buy information associated with the account recently used to fund the transaction, present purchase protection or other payment features that the user may choose to utilize, present any suitable pay with points option for the user to choose to utilize rather than a complete payment as may have been initially intended by the credential data already communicated, present any suitable offers related to the recent transaction and/or related to the next future transaction, present any suitable receipt or summary of transaction status, and/or the like. Such data 682 may be received by device 100 and operative to present any suitable user interface to the user of device 100 (e.g., via display output component 112a) that may enable a user to view the relevant information of data 682 and/or to select one or more options or enter any suitable response data that may be communicated back to financial institution subsystem 350 via the same or similar communication path as the one on which data 682 was received. Such an interface may be managed via a device application, such as device application 103 (e.g., a card management application (e.g., wallet application)) or a specific application that may be associated with financial institution subsystem 350 that may be accessible to device 100 (e.g., as may be provisioned on device 100 as an online resource of financial institution subsystem 350 (e.g., at step 608)). Therefore, this facilitation of communication between financial institution subsystem 350 and device 100 involved in the attempted or completed transaction may enhance the user experience for the customer of financial institution subsystem 350 and/or enhance the risk resolution of financial institution subsystem 350.

It is understood that the steps shown in process 600 of FIG. 6 are only illustrative and that existing steps may be modified or omitted, additional steps may be added, and the order of certain steps may be altered. For example, it is to be understood that some shared keys may be public keys while other shared keys may be private or secret keys (e.g., a mathematically linked key pair that includes a public key and a private key). A public key of a key pair may be used to encrypt data while a private key of that key pair may be used to decrypt the encrypted data. For example, access key 155*a* of SSD 154*a* and/or access key 155*b* of SSD 154*b*, which may be stored in secure element 145 of device 100, may be a public key while access key 155*a* and/or access key 155*b* available at commercial entity subsystem 400 may be an associated private key or vice versa. Additionally or alternatively, ISD key 156*k* of ISD 152 that may be stored in a secure element of device 100 may be a public key while ISD key 156*k* available at commercial entity subsystem 400 may be an associated private key or vice versa. Additionally or alternatively, CRS 151*k* that may be stored in a secure element of device 100 may be a public key while CRS 151*k* available at commercial entity subsystem 400 may be an associated private key or vice versa. Additionally or alternatively, CASD 158*k* that may be stored in a secure element of device 100 may be public while CASD 158*k* available at commercial entity subsystem 400 may be private or vice versa. Additionally or alternatively, merchant key 157 of table 430 or elsewhere at commercial entity subsystem 400 may be a public key while merchant key 157 available at merchant subsystem 200 may be an associated private key or vice versa. Moreover, certain data may be signed by a component transmitting that data. For example, device transaction data 664 may be signed by device 100 before being transmitted to commercial entity subsystem 400 at step 614 or encrypted commercial entity credential data 663 may be signed by the secure element at step 613 (e.g., by CASD 158*k*) before being transmitted as at least a portion of device transaction data 664 at step 614. Such a signature by device 100 may enable commercial entity subsystem 400 to more confidently determine that data 664 was generated by a trusted device 100. Additionally or alternatively, data 670 may be signed by commercial entity subsystem 400 before being transmitted to device 100 at step 620 and/or before being transmitted to merchant subsystem 200 at step 621*a*. Such a signature by commercial entity subsystem 400 may enable device 100 and/or merchant subsystem 200 to more confidently determine that data 670/671/671*a* was generated by a trusted commercial entity subsystem 400. It is to be understood that device 100 need not be configured to handle NFC communications or any other contactless proximity-based communications with another device (e.g., an NFC communication with a merchant terminal of merchant subsystem 200). Instead, device 100 may include a secure element for storing credential information that may be used for online transactions, as described with respect to process 600, while not being leveraged for NFC transactions. For example, device 100 may include a secure element (e.g., with controller module 140 and/or memory module 150, without device module 130). In some embodiments, a process similar to process 600 may be carried out without commercial entity subsystem 400. Instead, device 100 may be operative to access transaction identifier 666, derive transaction key 667*k* based on transaction key data 667*d*, and store commercial payment data 668 against transaction key 667*k* (e.g., device 100 may perform the operations of steps 616-618 of process 600), such that device 100 may then generate and communicate merchant payment data 671 to merchant subsystem 200 (e.g., device 100 may perform the operations of steps 620 and 621) and such that device 100 may also generate and communicate commercial payment data 668 using transaction key 667*k* to financial institution subsystem 350 (e.g., device 100 may perform the operations of step 624 (e.g., using communications path 75 with financial institution subsystem 350 (e.g., with an appropriate issuing bank subsystem 370 and/or with an appropriate payment network subsystem 360 (e.g., as may be identified by a financial institution subsystem URL that may be accessed by device 100 via the SSD of the credential being used)))), where any communication between device 100 and financial institution subsystem 350 may be encrypted using an appropriate shared secret between device 100 and subsystem 350 (e.g., using a public key of subsystem 350). In such embodiments, electronic device 100 may be operative to push such commercial payment data 668 to financial institution subsystem 350 more easily than it may be for financial institution subsystem 350 to rely on device 100 being always communicatively coupled to financial institution subsystem 350 for enabling smooth pulling of commercial payment data 668. In some embodiments, for example when the transaction may be facilitated as an online (e.g., in-app) transaction between device 100 and merchant subsystem 200 (e.g., using communications path 15 between communications component 106 and merchant server 210), a transaction key may be derived by using a particular key derivation function on particular data (e.g., an X9.63 key derivation function or any other suitable function may derive a transaction key 667*k* using a secure hash algorithm (e.g., a SHA-256 function) on any suitable token data (e.g., DPAN of device 100) and on any suitable crypto data (e.g., cryptogram generated by device 100)). In some other embodiments, for example when the transaction may be facilitated using a contactless Europay, MasterCard and Visa ("EMV") standard transaction between device 100 and merchant subsystem 200 (e.g., using a contactless proximity-based communication 5 between device 100 and merchant terminal 220), a transaction key may be derived by using a particular key derivation function on particular data (e.g., an X9.63 key derivation function or any other suitable function may derive a transaction key 667*k* using a secure hash algorithm (e.g., a SHA-256 function) on any suitable token data (e.g., DPAN of device 100), on any suitable counter data (e.g., value of an application transaction counter ("ATC") on device 100 that may provide a sequential reference to transactions), and on any suitable crypto data (e.g., cryptogram generated by device 100)). In some other embodiments, for example when the transaction may be facilitated using a contactless magnetic stripe data ("MSD") standard transaction between device 100 and merchant subsystem 200 (e.g., using a contactless proximity-based communication 5 between device 100 and merchant terminal 220), a transaction key may be derived by using a particular key derivation function on particular data (e.g., an X9.63 key derivation function or any other suitable function may derive a transaction key 667*k* using a 16-least significant bit ("LSB") algorithm on first data (e.g., data generated by a secure hash algorithm (e.g., a SHA-256 function) on any suitable first data (e.g., data portion 662*t* of data 662)) and using a 16-LSB algorithm on second data (e.g., data generated by a secure hash algorithm (e.g., a SHA-256 function) on any suitable second data (e.g., data portion 662*c* of data 662))). Although transaction key 667*k* may be derived in any suitable manner using any suitable data at financial institution subsystem 350 and/or at commercial entity subsystem 400 and/or at device 100. As mentioned, in some embodiments, first data portion 662*t* of SE credential data 662 may include crypto data of SE credential data 662 (e.g., a cryptogram generated at device 100 using a shared secret of SSD 154a and financial institution subsystem 350), while second data portion 662c of SE credential data 662 may include token data of SE credential data 662 (e.g., a DPAN, DPAN expiry date, etc. of SSD 154a), such that merchant payment data 670, 671, 671a, 672, and/or 673 may include crypto data of SE credential data 662 and/or such that commercial payment data 668 may include token data of SE credential data 662. Alternatively, in some embodiments, merchant payment data 670, 671, 671a, 672, and/or 673 may include not only token data of SE credential data 662 (e.g., a DPAN, DPAN expiry date, etc. of SSD 154a) but also crypto data of SE credential data 662 (e.g., a cryptogram generated at device 100 using a shared secret of SSD 154a and financial institution subsystem 350), while commercial payment data 668 may include any suitable enhancer data 662e but not any token data or any crypto data, such that both the token data and crypto data for the device credential of the transaction may be received by financial institution subsystem 350 via a first communications path (e.g., as merchant payment data) and any associated enhancer data of the transaction may be received by financial institution subsystem 350 via a second communications path (e.g., as commercial payment data 668 using a transaction key).

Description of FIG. 7

FIG. 7 is a flowchart of an illustrative process 700 for securely conducting online payments at a commercial entity subsystem (e.g., at commercial entity subsystem 400 of system 1). At step 702, process 700 may include receiving device transaction data from an electronic device, wherein the device transaction data may include token information indicative of a payment credential on the electronic device, crypto information indicative of the electronic device, and transaction information indicative of a transaction between the electronic device and a merchant subsystem. For example, commercial entity subsystem 400 may receive device transaction data 664 from electronic device 100, where such device transaction data may include token data portion 662t of credential data 661 of SSD 154a of device 100, crypto data portion 662c of credential data 661 of device 100, and at least a portion of potential transaction data 660 that may be indicative of a transaction between device 100 and merchant subsystem 200 (e.g., a currency for the transaction, an amount of the currency for the transaction, a merchant identifier, etc.). At step 704, process 700 may include deriving a transaction key based on transaction key data, wherein the transaction key data may include the token information and a first portion of the transaction information. For example, commercial entity subsystem 400 may derive transaction key 667k based on transaction key data 667d, which may include token data portion 662t and a portion of potential transaction data 660 (e.g., a currency for the transaction, and/or a merchant identifier, etc.). At step 706, process 700 may include transmitting merchant payment data to at least one of the merchant subsystem and the electronic device, wherein the merchant payment data may include the token information and a second portion of the transaction information. For example, commercial entity subsystem 400 may transmit merchant payment data 670 to electronic device 100 and/or merchant payment data 671a to merchant subsystem 200, where such merchant payment data may include token data portion 662t and a portion of potential transaction data 660 (e.g., a currency for the transaction, an amount of the currency for the transaction, a merchant identifier, etc.). At step 708, process 700 may include sharing commercial payment data with a financial institution subsystem using the transaction key, wherein the commercial payment data includes the crypto information. For example, commercial entity subsystem 400 may share commercial payment data 668 with financial institution subsystem 350 using transaction key 667k, where commercial payment data 668 may include crypto data portion 662c.

It is understood that the steps shown in process 700 of FIG. 7 are only illustrative and that existing steps may be modified or omitted, additional steps may be added, and the order of certain steps may be altered.

Description of FIG. 8

FIG. 8 is a flowchart of an illustrative process 800 for securely conducting online payments at a commercial entity subsystem (e.g., at commercial entity subsystem 400 of system 1). At step 802, process 800 may include receiving device transaction data from an electronic device, wherein the device transaction data may include credential data indicative of a payment credential on the electronic device to be used for funding a transaction with a merchant subsystem. For example, commercial entity subsystem 400 may receive device transaction data 664 from electronic device 100, where such device transaction data may include credential data 662 indicative of a payment credential on electronic device 100 for funding a transaction with merchant subsystem 200. At step 804, process 800 may include accessing a transaction identifier. For example, commercial entity subsystem 400 may access a transaction identifier 666. At step 806, process 800 may include deriving a transaction key based on transaction key data, wherein the transaction key data may include the accessed transaction identifier. For example, commercial entity subsystem 400 may derive transaction key 667k based on transaction key data 667d that may include accessed transaction identifier 666. At step 808, process 800 may include transmitting merchant payment data to at least one of the merchant subsystem and the electronic device, wherein the merchant payment data may include a first portion of the credential data and the accessed transaction identifier. For example, commercial entity subsystem 400 may transmit merchant payment data 670 to electronic device 100 and/or merchant payment data 671a to merchant subsystem 200, where such merchant payment data may include token data portion 662t of credential data 662 and accessed transaction identifier 666. At step 810, process 800 may include sharing commercial payment data with a financial institution subsystem using the transaction key, wherein the commercial payment data may include a second portion of the credential data that is different than the first portion of the credential data. For example, commercial entity subsystem 400 may share commercial payment data 668 with financial institution subsystem 350 using transaction key 667k, where commercial payment data 668 may include crypto data portion 662c of credential data 662 that may be different than token data portion 662t of credential data 662.

It is understood that the steps shown in process 800 of FIG. 8 are only illustrative and that existing steps may be modified or omitted, additional steps may be added, and the order of certain steps may be altered.

Description of FIG. 9

FIG. 9 is a flowchart of an illustrative process 900 for securely conducting online payments at a commercial entity subsystem (e.g., at commercial entity subsystem 400 of system 1). At step 902, process 900 may include receiving credential data from a user electronic device. For example, commercial entity subsystem 400 may receive credential data 662 as a portion of device transaction data 664 from electronic device 100. At step 904, process 900 may include transmitting a first portion of the credential data to a financial institution subsystem using a first communication path that includes a merchant subsystem. For example, commercial entity subsystem 400 may transmit token data portion 662t of credential data 662 to financial institution subsystem 350 using a first communication path that includes merchant subsystem 200 (e.g., as merchant payment data 670 via electronic device 100 and/or as merchant payment data 671a to merchant subsystem 200). At step 906, process 900 may include transmitting a second portion of the credential data to the financial institution subsystem using a second communication path that does not include the merchant subsystem. For example, commercial entity subsystem 400 may transmit crypto data portion 662c of credential data 662 to financial institution subsystem 350 using a second communication path that does not include merchant subsystem 200 (e.g., as commercial payment data 668 to financial institution subsystem 350).

It is understood that the steps shown in process 900 of FIG. 9 are only illustrative and that existing steps may be modified or omitted, additional steps may be added, and the order of certain steps may be altered.

Figure 10:
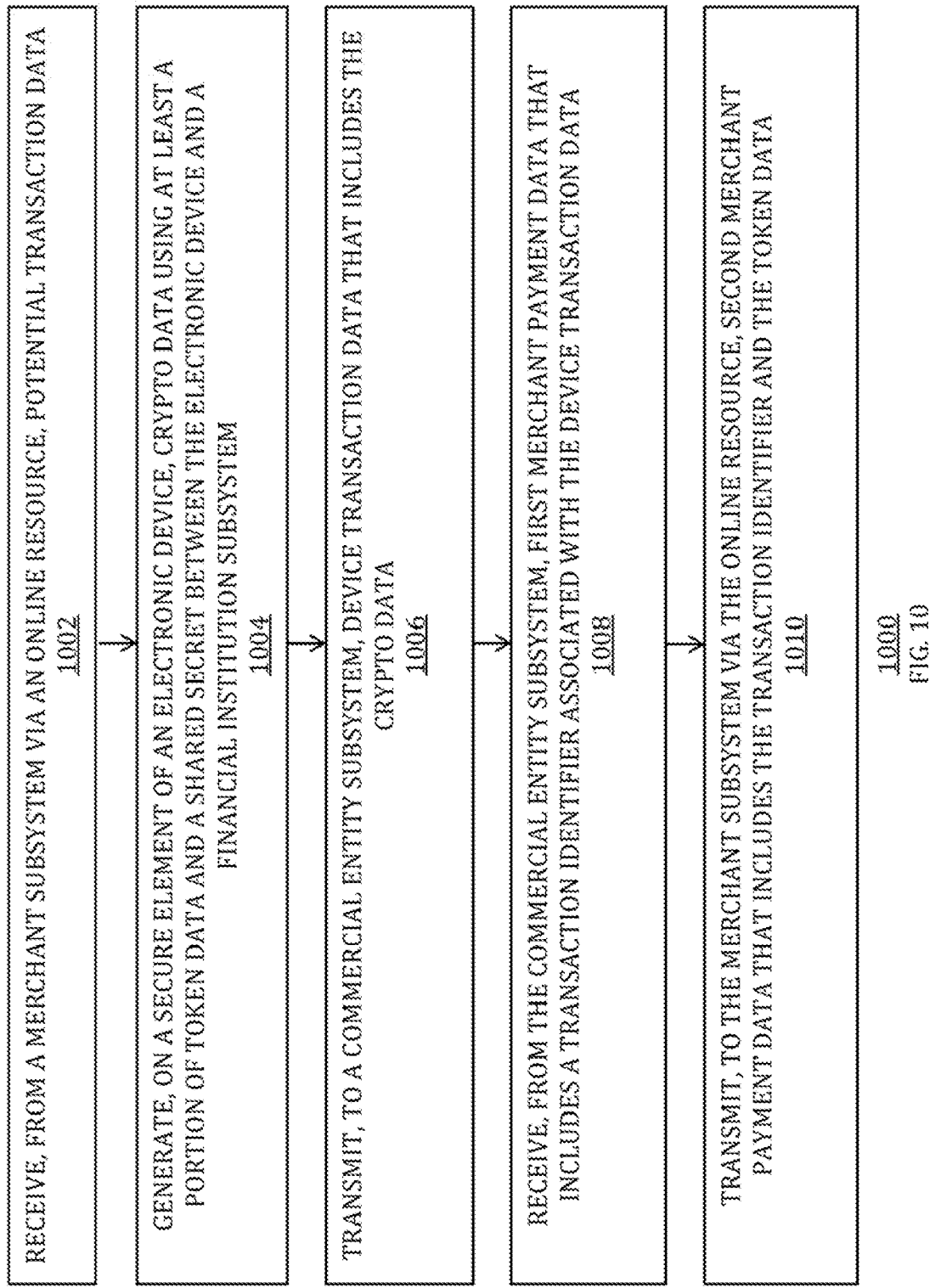

Description of FIG. 10

FIG. 10 is a flowchart of an illustrative process 1000 for securely conducting online payments at an electronic device (e.g., at electronic device 100 of system 1). At step 1002, process 1000 may include receiving, from a merchant subsystem via an online resource, potential transaction data. For example, electronic device 100 may receive potential transaction data 660 from merchant subsystem 200 via online merchant application 113. At step 1004, process 1000 may include generating, on a secure element of the electronic device, crypto data using at least a portion of token data and a shared secret between the electronic device and a financial institution subsystem. For example, electronic device 100 may generate on secure element 145 crypto data portion 662c of credential data 662 using at least a portion of token data portion 662t and a shared secret between electronic device 100 and financial institution subsystem 350 (e.g., key 155a'). At step 1006, process 1000 may include transmitting, to a commercial entity subsystem, device transaction data that may include the crypto data. For example, electronic device 100 may transmit device transaction data 664 that may include crypto data portion 662c of credential data 662 to commercial entity subsystem 400. At step 1008, process 1000 may include receiving, from the commercial entity subsystem, first merchant payment data that may include a transaction identifier associated with the device transaction data. For example, electronic device 100 may receive merchant payment data 670 that may include transaction identifier 666 from commercial entity subsystem 400. At step 1010, process 1000 may include transmitting, to the merchant subsystem via the online resource, second merchant payment data that may include the transaction identifier and the token data. For example, electronic device 100 may transmit merchant payment data 671 that may include transaction identifier 666 and token data portion 662c to merchant subsystem 200 via online merchant application 113.

It is understood that the steps shown in process 1000 of FIG. 10 are only illustrative and that existing steps may be modified or omitted, additional steps may be added, and the order of certain steps may be altered.

Description of FIG. 11

FIG. 11 is a flowchart of an illustrative process 1100 for securely conducting online payments at a financial institution subsystem (e.g., at financial institution subsystem 350 of system 1). At step 1102, process 1100 may include receiving, via a first communication path, merchant payment data that may include token data of an electronic device. For example, financial institution subsystem 350 may receive merchant payment data 673 that may include token data portion 662t of electronic device 100 from acquiring bank subsystem 300. At step 1104, process 1100 may include deriving first crypto data using the token data of the merchant payment data and a shared secret between the financial institution subsystem and the electronic device. For example, financial institution subsystem 350 may derive first crypto data using token data portion 662t from merchant payment data 673 and a shared secret between electronic device 100 and financial institution subsystem 350 (e.g., key 155a'). At step 1106, process 1100 may include accessing, via a second communication path that is different than the first communication path, commercial payment data that may include second crypto data. For example, financial institution subsystem 350 may receive commercial payment data 668 that may include crypto data portion 662c of electronic device 100 from commercial entity subsystem 400. At step 1108, process 1100 may include comparing the first crypto data to the second crypto data. For example, financial institution subsystem 350 may compare the crypto data derived by financial institution subsystem 350 to crypto data portion 662c of commercial payment data 668. At step 1110, process 1100 may include validating a transaction request based on the comparing. For example, financial institution subsystem 350 may enable a transaction to be funded using token data portion 662t and/or crypto data portion 662c if the crypto data derived by financial institution subsystem 350 is the same as crypto data portion 662c of commercial payment data 668.

It is understood that the steps shown in process 1100 of FIG. 11 are only illustrative and that existing steps may be modified or omitted, additional steps may be added, and the order of certain steps may be altered.

Description of FIG. 12

FIG. 12 is a flowchart of an illustrative process 1200 for securely conducting online payments at an electronic device (e.g., at electronic device 100 of system 1). At step 1202, process 1200 may include generating, on a secure element of the electronic device, crypto data using at least a portion of token data and a shared secret between the electronic device and a financial institution subsystem. For example, electronic device 100 may generate on secure element 145 crypto data portion 662c of credential data 662 using at least a portion of token data portion 662t and a shared secret between electronic device 100 and financial institution subsystem 350 (e.g., key 155a'). At step 1204, process 1200 may include accessing a transaction identifier. For example, electronic device 100 may access a transaction identifier 666 (e.g., as may be generated by device 100 or by merchant subsystem 200 and accessed by device 100 or by commercial entity subsystem 400 and accessed by device 100). At step 1206, process 1200 may include deriving a transaction key based on transaction key data, wherein the transaction key data may include the accessed transaction identifier. For example, electronic device 100 may derive transaction key 667*k* based on transaction key data 667*d* that may include accessed transaction identifier 666. At step 1208, process 1200 may include transmitting merchant payment data to a merchant subsystem, wherein the merchant payment data may include the token data and the accessed transaction identifier. For example, electronic device 100 may transmit merchant payment data 671 to merchant subsystem 200 (e.g., to server 210 via communications path 15 or to terminal 220 as contactless-proximity based communication 5), where such merchant payment data may include token data portion 662*t* of credential data 662 and accessed transaction identifier 666. At step 1210, process 1200 may include sharing commercial payment data with a financial institution subsystem using the transaction key, wherein the commercial payment data may include the crypto data. For example, electronic device 100 may share commercial payment data 668 with financial institution subsystem 350 using transaction key 667*k* (e.g., via communications path 75), where commercial payment data 668 may include crypto data portion 662*c* of credential data 662 that may be different than token data portion 662*t* of credential data 662.

It is understood that the steps shown in process 1200 of FIG. 12 are only illustrative and that existing steps may be modified or omitted, additional steps may be added, and the order of certain steps may be altered.

Description of FIG. 13

FIG. 13 is a flowchart of an illustrative process 1300 for conducting payments at an electronic device (e.g., at electronic device 100 of system 1). At step 1302, process 1300 may include generating, on a secure element of the electronic device, credential data operative to identify a funding account of a financial institution subsystem for funding a transaction between the electronic device and a merchant subsystem (e.g., device 100 may generate credential data 662/663). At step 1304, process 1300 may include the electronic device accessing transaction key data (e.g., device 100 may access transaction key data 667 (e.g., rather than commercial entity subsystem 400 doing so)). At step 1306, process 1300 may include the electronic device deriving a transaction key based on the transaction key data (e.g., device 100 may derive a transaction key 667*k* based on transaction key data 667 (e.g., rather than commercial entity subsystem 400 doing so)). At step 1308, process 1300 may include the electronic device transmitting merchant payment data to the merchant subsystem, wherein the merchant payment data includes at least a portion of the credential data and the accessed transaction key data (e.g., electronic device 100 may transmit merchant payment data 671 to merchant subsystem 200 (e.g., to server 210 via communications path 15 or to terminal 220 as contactless-proximity based communication 5), where such merchant payment data may include token data portion 662*t* of credential data 662 and accessed transaction identifier 666). At step 1310, process 1300 may include the electronic device sharing commercial payment data with the financial institution subsystem using the transaction key, wherein the commercial payment data includes at least one of another portion of the credential data and enhancer data (e.g., electronic device 100 may share commercial payment data 668 with financial institution subsystem 350 using transaction key 667*k* (e.g., via communications path 75), where commercial payment data 668 may include crypto data portion 662*c* of credential data 662 that may be different than token data portion 662*t* of credential data 662 and/or enhancer data 662*e*).

It is understood that the steps shown in process 1300 of FIG. 13 are only illustrative and that existing steps may be modified or omitted, additional steps may be added, and the order of certain steps may be altered.

Description of FIG. 14

FIG. 14 is a flowchart of an illustrative process 1400 for conducting payments at a financial institution subsystem (e.g., at financial institution subsystem 350 of system 1). At step 1402, process 1400 may include receiving at the financial institution subsystem, via a first communication path, merchant payment data that includes credential data of an electronic device and transaction key data (e.g., financial institution subsystem 350 may receive merchant payment data 673 with data portion 662*t* and transaction key data via a first communication path). At step 1404, process 1400 may include the financial institution subsystem deriving a transaction key using the transaction key data of the merchant payment data (e.g., financial institution subsystem 350 may derive key 667*k* from the transaction key data of merchant payment data 673). At step 1406, process 1400 may include the financial institution subsystem accessing, via a second communication path that is different than the first communication path, commercial payment data using the derived transaction key (e.g., financial institution subsystem 350 may receive commercial payment data 668 using key 667*k* via a second communication path). At step 1408, process 1400 may include the financial institution subsystem processing the credential data and the commercial payment data (e.g., financial institution subsystem 350 may process credential data of merchant payment data 673 and commercial payment data 668). At step 1410, process 1400 may include the financial institution subsystem validating a transaction request based on the processing (e.g., financial institution subsystem 350 may validate a transaction request at steps 625 and 626).

It is understood that the steps shown in process 1400 of FIG. 14 are only illustrative and that existing steps may be modified or omitted, additional steps may be added, and the order of certain steps may be altered.

Further Description of FIG. 1, FIG. 1A, FIG. 2. FIG. 3, and FIG. 4

Although not shown, commercial entity subsystem 400 of FIG. 1A may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out operations on device 100 in concert with financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1A and/or electronic device 100 via communications path 65 of FIG. 1A).

When a credential of a secure element of device 100 is appropriately enabled (e.g., commerce credential data associated with an enabled applet 153a of credential SSD 154a of NFC component 120) so as to be provided as a commerce credential data communication to merchant subsystem 200 (e.g., as merchant payment data 671 to merchant server 210), acquiring bank subsystem 300 may utilize such merchant payment data for completing a financial transaction with financial institution subsystem 350. For example, after a user of electronic device 100 has chosen a product for purchase and has appropriately enabled a specific credential of device 100 to be used for payment, merchant subsystem 200 may receive an appropriate merchant payment data communication indicative of commerce credential data for the specific credential. Merchant server 210 and/or a merchant terminal may be provided by any suitable merchant or merchant agent of merchant subsystem 200 that may provide a product or service to a user of device 100 in response to device 100 providing payment credentials via such a commerce credential data communication. Based on such a received commerce credential data communication (e.g., merchant payment data 671), merchant subsystem 200 may be configured to generate and transmit data 672 to acquiring bank subsystem 300 (e.g., via a communication path 25 between merchant subsystem 200 and acquiring bank subsystem 300), where data 672 may include payment information and an authorization request that may be indicative of at least a portion of a user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via a commerce credential data communication (e.g., via a contactless proximity-based communication and/or via an online-based communication) with merchant subsystem

200. Acquiring bank subsystem 300 may then forward the authorization request to financial institution subsystem 350 (e.g., via a communication path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of payment network subsystem 360 and issuing bank subsystem 370 being separate entities, payment network subsystem 360 may receive data 673 from acquiring bank subsystem 300 and may then forward a request to issuing bank subsystem 370 as data 405 (e.g., via a communication path 45 between payment network subsystem 360 and issuing bank subsystem 370 (e.g., at step 626)). In the case of payment network subsystem 360 and issuing bank subsystem 370 being the same entity, acquiring bank subsystem 300 may submit data 674 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 673 or indirectly via payment network subsystem 360 as data 405), the payment information (e.g., commerce credential information of device 100) and the purchase amount included in the authorization request may be analyzed to determine if the account associated with the commerce credential has enough credit to cover the purchase amount (e.g., in combination with data 668). If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 677 (e.g., authorization response data 677 may be provided directly from issuing bank subsystem 370 to acquiring bank subsystem 300 via communication path 35, or authorization response data 677 may be provided from payment network subsystem 360 to acquiring bank subsystem 300 based on authorization response data 415 that may be provided to payment network subsystem 360 from issuing bank subsystem 370 via communication path 45).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFD") circuitry. NFC component 120 may provide a manner of acquiring merchandise information, transferring payment information, and otherwise communicating with an external device (e.g., a merchant terminal of merchant subsystem 200).

NFC component 120 may include any suitable modules for enabling contactless proximity-based communication between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication.

NFC transceiver or NFC antenna 134 may be any suitable antenna or other suitable transceiver circuitry that may generally enable communication of communication from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication to subsystem 200. For example, shared antenna 116 may require amplification from booster 136 before antenna 116 (e.g., a non-loop antenna) may be properly enabled for communicating contactless proximity-based or NFC communication between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information from NFC tags (e.g., from merchant subsystem 200) to NFC data module 132, a peer-to-peer mode for exchanging data with another NFC enabled device (e.g., merchant subsystem 200), and a card emulation mode for allowing another NFC enabled device (e.g., merchant subsystem 200) to read information from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for first SSD 154a and applet 153a of first SSD 154a may be associated with a commerce credential managed by that first payment network subsystem 360, while a second payment network subsystem 360 (e.g., MasterCard) may be the TSM for another SSD 154.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

A merchant terminal of merchant subsystem 200 of FIG. 1A may include a reader for detecting, reading, or otherwise receiving an NFC communication from electronic device 100 (e.g., when electronic device 100 comes within a certain distance or proximity of such a merchant terminal). Accordingly, it is noted that an NFC communication between such a merchant terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a merchant terminal. For instance, a reader of such a merchant terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to such a merchant terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to such a merchant terminal as an NFC communication, rather than reflect radio frequency signals, as in the case of a passive NFC device module 130. A merchant terminal may be provided by a merchant of merchant subsystem 200 (e.g., in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication between electronic device 100 and such a merchant terminal. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 4, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific merchant application and may display screens of a specific user interface that may include one or more tools or features for interacting with device 100 in a specific manner. For each application, screens may be displayed on display output component 112a and may include various user interface elements (e.g., screens 190a-190d of FIGS. 4A-4D). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 4, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 4). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-14 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 110*f*) may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112*a*) with graphical data to display a graphical user interface ("GUI") 180. GUI 180 may be configured to receive touch input via a touch input component 110*f* Embodied as a touch screen (e.g., with display output component 112a as I/O component 114a), touch I/O component 110f may display GUI 180. Alternatively, GUI 180 may be displayed on a display (e.g., display output component 112a) separate from touch input component 110f. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for communicating electronic device secure element data over multiple paths for online payments, it is to be understood that many changes may be made therein without departing from the spirit and scope of the subject matter described herein in any way. For example, various processes described herein may be utilized for in-store contactless proximity-based communications between a user electronic device and a merchant subsystem rather than only for online payments, where communications between the device and merchant may occur using NFC or other suitable contactless proximity-based communications rather than using online communications. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
   receiving, by a commercial entity subsystem, device transaction data from an electronic device performing a transaction with a merchant subsystem, wherein the device transaction data comprises:
   token information indicative of a payment credential on the electronic device;
   crypto information indicative of the electronic device; and
   transaction information indicative of a transaction between the electronic device and a merchant subsystem;
   deriving, by the commercial entity subsystem, a transaction key based on transaction key data, wherein the transaction key data comprises:
   the token information; and
   a first portion of the transaction information;
   transmitting, by the commercial entity subsystem, merchant payment data via a first communication path that comprises the merchant subsystem, wherein the merchant payment data comprises:
   the token information; and
   a second portion of the transaction information; and
   communicating, by the commercial entity subsystem, commercial payment data to a financial institution subsystem based at least in part on an association between the commercial payment data and the transaction key and via a second communication path that bypasses the merchant subsystem, wherein the commercial payment data comprises the crypto information, the commercial payment data being different from the merchant payment data, and the commercial entity subsystem is separate from the financial institution subsystem, the electronic device, and the merchant subsystem.

2. The method of claim 1, wherein the token information comprises at least one of:
   a primary account number of the payment credential; or
   an expiry date of the payment credential.

3. The method of claim 1, wherein:
   the transaction information comprises merchant information indicative of the merchant subsystem; and
   the first portion of the transaction information comprises the merchant information.

4. The method of claim 3, wherein the second portion of the transaction information comprises the merchant information.

5. The method of claim 3, wherein the second portion of the transaction information does not comprise the merchant information.

6. The method of claim 3, wherein the merchant information comprises a merchant identification element associated with an acquiring bank of the merchant subsystem.

7. The method of claim 1, wherein the transaction information comprises at least one of:
   an amount of a cost of the transaction; or
   a currency of the transaction.

8. The method of claim 1, further comprising, at the commercial entity subsystem, generating a transaction identifier, wherein the transaction key data further comprises the generated transaction identifier.

9. The method of claim 8, wherein the merchant payment data further comprises the generated transaction identifier.

10. The method of claim 1, wherein the communicating comprises communicating the commercial payment data with the financial institution subsystem in response to receiving a key from the financial institution subsystem at the commercial entity subsystem that is the same as the transaction key.

11. The method of claim 1, wherein the communicating comprises communicating the commercial payment data and the transaction key with the financial institution subsystem.

12. The method of claim 1, wherein the commercial payment data further comprises transaction-enhancer information that comprises at least one of:
a partial shipment indicator; or
a recurring billing indicator.

13. The method of claim 1, wherein the commercial payment data further comprises transaction-enhancer information that comprises at least one of:
an amount restriction; or
a time restriction.

14. The method of claim 1, wherein the crypto information is based on a shared secret between the electronic device and the financial institution subsystem.

15. A non-transitory machine-readable medium comprising instructions that, when executed by one or more processors, cause the one or more processors to perform operations comprising:
receiving, by a commercial entity subsystem, device transaction data from an electronic device, wherein the device transaction data comprises credential data indicative of a payment credential on the electronic device to be used for funding a transaction with a merchant subsystem;
accessing, by the commercial entity subsystem, a transaction identifier;
deriving, by the commercial entity subsystem, a transaction key based on transaction key data, wherein the transaction key data comprises the accessed transaction identifier;
transmitting, by the commercial entity subsystem, merchant payment data via a first communication path that comprises the merchant subsystem, wherein the merchant payment data comprises:
a first portion of the credential data; and
the accessed transaction identifier; and
transmitting, by the commercial entity subsystem, commercial payment data to a financial institution subsystem based at least in part on an association between the commercial payment data and the transaction key, and via a second communication path that excludes the merchant subsystem, wherein the commercial payment data comprises a second portion of the credential data that is different than the first portion of the credential data, and the commercial entity subsystem is separate from the financial institution subsystem, the electronic device, and the merchant subsystem.

16. The non-transitory machine-readable medium of claim 15, wherein both the first portion of the credential data and the second portion of the credential data are required by the financial institution subsystem to validate the credential data for funding the transaction.

17. The non-transitory machine-readable medium of claim 15, wherein:
the first portion of the credential data comprises an account number of the payment credential; and
the second portion of the credential data comprises a cryptogram generated using a shared secret of the electronic device and the financial institution subsystem.

18. The non-transitory machine-readable medium of claim 15, wherein the second portion of the credential data links the first portion of the credential data to the electronic device and to the transaction.

19. The non-transitory machine-readable medium of claim 15, wherein:
the first portion of the credential data comprises a cryptogram generated using a shared secret of the electronic device and the financial institution subsystem; and
the second portion of the credential data comprises an account number of the payment credential.

20. The method of claim 1, wherein both the token information and the crypto information are required by the financial institution subsystem to validate the payment credential for funding the transaction.

21. The method of claim 1, wherein:
the token information comprises an account number of the payment credential; and
the crypto information comprises a cryptogram generated using a shared secret of the electronic device and the financial institution subsystem.

22. The method of claim 1, wherein the crypto information links the token information to the electronic device and to the transaction.

23. A commercial entity subsystem comprising:
a memory; and
at least one processor configured to:
receive device transaction data from an electronic device, wherein the device transaction data comprises:
token information indicative of a payment credential on the electronic device;
crypto information indicative of the electronic device; and
transaction information indicative of a transaction between the electronic device and a merchant subsystem;
derive a transaction key based on transaction key data, wherein the transaction key data comprises:
the token information; and
a first portion of the transaction information;
transmit merchant payment data via a first communication path that comprises the merchant subsystem, wherein the merchant payment data exclusively comprises:
the token information; and
a second portion of the transaction information; and
communicate commercial payment data to a financial institution subsystem based at least in part on an association between the commercial payment data and the transaction key, and via a second communication path that bypasses the merchant subsystem, wherein the commercial payment data comprises the crypto information, and the commercial entity subsystem is separate from the financial institution subsystem, the electronic device, and the merchant subsystem.

24. The commercial entity subsystem of claim 23, wherein the token information comprises at least one of:
a primary account number of the payment credential; or
an expiry date of the payment credential.

25. The commercial entity subsystem of claim 23, wherein:

the transaction information comprises merchant information indicative of the merchant subsystem; and the first portion of the transaction information comprises the merchant information.

26. The commercial entity subsystem of claim 25, wherein the second portion of the transaction information comprises the merchant information.

27. The commercial entity subsystem of claim 25, wherein the second portion of the transaction information does not comprise the merchant information.

28. The commercial entity subsystem of claim 25, wherein the merchant information comprises a merchant identification element associated with an acquiring bank of the merchant subsystem.

29. The commercial entity subsystem of claim 23, wherein the transaction information comprises at least one of:

an amount of a cost of the transaction; or a currency of the transaction.

* * * * *